(12) United States Patent
Tomigashi et al.

(10) Patent No.: US 7,504,797 B2
(45) Date of Patent: Mar. 17, 2009

(54) MOTOR CONTROL DEVICE

(75) Inventors: Yoshio Tomigashi, Hirakata (JP); Hajime Hida, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 178 days.

(21) Appl. No.: 11/508,899

(22) Filed: Aug. 24, 2006

(65) Prior Publication Data
US 2007/0046249 A1    Mar. 1, 2007

(30) Foreign Application Priority Data

| Aug. 26, 2005 | (JP) | ............................... 2005-246305 |
| Feb. 21, 2006 | (JP) | ............................... 2006-043398 |
| Jun. 28, 2006 | (JP) | ............................... 2006-177646 |

(51) Int. Cl.
*H02P 23/00* (2006.01)

(52) U.S. Cl. ...................... 318/807; 318/727; 318/254; 318/138; 318/439

(58) Field of Classification Search ................ 318/807, 318/727, 254, 138, 439; 375/260; 363/98; 701/209
See application file for complete search history.

(56) References Cited

U.S. PATENT DOCUMENTS

2003/0191561 A1* 10/2003 Vos ................................ 701/3

FOREIGN PATENT DOCUMENTS

| JP | 07-245981 | 9/1995 |
| JP | 10-094298 | 4/1998 |
| JP | 2001-251889 | 9/2001 |
| JP | 2002-051597 | 2/2002 |
| JP | 2003-153582 | 5/2003 |
| JP | 2003-219682 | 7/2003 |
| JP | 2003-309992 | 10/2003 |

OTHER PUBLICATIONS

"Position and Speed Sensorless Control for IPMSM Based on Estimation of Position Error", Sigeo Morimoto et al, T.IEE Japan, vol. 122-D, No. 7, 2002, pp. 722-729.

* cited by examiner

*Primary Examiner*—Karen Masih
(74) *Attorney, Agent, or Firm*—NDQ&M Watchstone LLP; S. Peter Konzel

(57) ABSTRACT

A motor control device includes an estimator for estimating a rotor position of a motor having a salient pole by using a value corresponding to a q-axis inductance of the motor as an operation parameter where an estimated axes for the control corresponding to d-q axes are γ-δ axes, and a controller for controlling the motor based on the estimated rotor position. The estimator generates a deviation between a d-axis and a γ-axis by performing the estimation of the rotor position based on a value between a real q-axis inductance and a real d-axis inductance of the motor adopted as the operation parameter. The controller controls the motor so that a γ-axis component of a motor current supplied to the motor is maintained to be a predetermined value of zero or close to zero regardless of a value of a δ-axis component of the motor current.

16 Claims, 22 Drawing Sheets

MOTOR CONTROL DEVICE

This nonprovisional application claims priority under 35 U.S.C. §119(a) on Patent Application No. 2005-246305 filed in Japan on Aug. 26, 2005, Patent Application No. 2006-043398 filed in Japan on Feb. 21, 2006, and Patent Application No. 2006-177646 filed in Japan on June 28, 2006, the entire contents of which are hereby incorporated by reference.

BACKGROUND OF THE INVENTION

1. Field of the Invention

The present invention relates to a motor control device for controlling an operation of a motor. The present invention also relates to a motor drive system including this motor control device.

2. Description of Related Art

Conventionally, a motor control device without a rotor position sensor (a position sensor-less motor control device) is developed. This a motor control device estimates a rotor position in a motor without a rotor position sensor and controls the motor base on the estimated rotor position. FIG. 21 shows an example of a block diagram for a motor control device 103 of this type. In the structure shown in FIG. 21, an estimated axis for the control corresponding to a d-axis in a vector control of a motor is a γ-axis, while an estimated axis for the control corresponding to a q-axis is a δ-axis. FIG. 23 shows a relationship among the d-axis, the q-axis, the γ-axis and the δ-axis. The reference numeral $E_{ex}$ in FIG. 23 represents a voltage vector that is usually called an extension induction voltage (an extended electromotive force).

A current detector 11 detects U-phase current $i_u$ and V-phase current $i_v$ of motor current supplied from a PWM inverter 2 to a motor 1 that is a salient pole machine. A coordinate converter 12 converts the U-phase current $i_u$ and the V-phase current $i_v$ into γ-axis current $i_γ$ and δ-axis current $i_δ$. A position/speed estimator 120 (hereinafter referred to as "estimator 120" simply) estimates and outputs an estimated rotor position $θ_e$ and an estimated motor speed $ω_e$.

A subtracter 19 subtracts the estimated motor speed $ω_e$ given by the estimator 120 from a specified motor speed value $ω^*$ and outputs the result. A speed controller 17 generates a specified δ-axis current value $i_δ^*$ to be followed by the δ-axis current $i_δ$ based on the subtraction result $(ω^* - ω_e)$ from the subtracter 19. A magnetic flux controller 116 outputs a specified γ-axis current value $i_γ^*$ to be followed by the γ-axis current $i_γ$ based on the specified δ-axis current value $i_δ^*$ and the like. A current controller 15 outputs a specified γ-axis voltage value $v_γ^*$ and a specified δ-axis voltage value $v_δ^*$ so that both a current error $(i_γ^* - i_γ)$ and a current error $(i_δ^* - i_δ)$ given by the subtracters 13 and 14 converge to zero.

A coordinate converter 18 performs inverse conversion of the specified γ-axis voltage value $v_γ^*$ and the specified δ-axis voltage value $v_δ^*$ based on the estimated rotor position $θ_e$ given by the estimator 120 and generates specified three-phase voltage values including a specified U-phase voltage value $v_u^*$, a specified V-phase voltage value $v_v^*$ and specified W-phase voltage value $v_w^*$, which are supplied to the PWM inverter 2. The PWM inverter 2 generates a signal modulated by pulse width based on the specified three-phase voltage values $(v_u^*, v_v^*$ and $v_w^*)$ and supplies the motor 1 with motor current corresponding to the specified three-phase voltage values for driving the motor 1.

FIG. 22 shows an inside structure of the estimator 120. The estimator 120 includes an axial error estimator 130, a proportional-plus-integral calculator 131 and an integrator 132. The axial error estimator 130 estimates an axial error $Δθ$ between the d-axis and the γ-axis. The axial error estimator 130 calculates the axial error $Δθ$ by using the equation (1) below, for example. Here, $L_d$ and $L_q$ represent a d-axis inductance and a q-axis inductance of the motor 1, respectively, and $R_a$ represents motor resistance of the motor 1. Furthermore, s is the Laplace operator. There are proposed various methods for estimating a rotor position. In many cases, a value of q-axis inductance of a motor is used as an operation parameter in a calculation equation for estimation as the equation (1) below.

$$\Delta\theta = \tan^{-1}\left(\frac{-E_{ex\gamma}}{E_{ex\delta}}\right) \qquad (1)$$
$$= \tan^{-1}\left(\frac{-(v_\gamma^* - (R_a + L_d s)i_\gamma + \omega_e L_q i_\delta)}{v_\delta^* - (R_a + L_d s)i_\delta + \omega_e L_q i_\gamma}\right)$$

The above equation (1) is a calculation equation for calculating the axial error $Δθ$ described in Japanese patent No. 3411878 (hereinafter referred to as a first patent document). Note that a difference between the d-axis and the γ-axis (dc-axis) with reference to the d-axis is defined as $Δθ$ in the first patent document while a difference between the d-axis and the γ-axis (dc-axis) with reference to the γ-axis is defined as $Δθ$, so the sign (negative or positive) is opposite between the calculation equation of the axial error $Δθ$ in the first patent document and the equation (1). Furthermore, in the equation (1), $E_{ex\gamma}$ and $E_{ex\delta}$ represent a γ-axis component and a δ-axis component of an extension induction voltage (an extended electromotive force) $E_{ex}$, respectively.

The proportional-plus-integral calculator 131 performs a proportional plus integral control in cooperation with each portion constituting the motor control device 103 for realizing a PLL (Phase Locked Loop), and it calculates the estimated motor speed $ω_e$ so that the axial error $Δθ$ calculated by the axial error estimator 130 converges to zero. The integrator 132 integrates the estimated motor speed $ω_e$ outputted by the proportional-plus-integral calculator 131 and calculates the estimated rotor position $θ_e$. The estimated motor speed $ω_e$ outputted by the proportional-plus-integral calculator 131 and the estimated rotor position $θ_e$ outputted by the integrator 132 are imparted as output values of the estimator 120 to each part of the motor control device 103 that needs the values.

Since the motor control device 103 is structured as described above, the axial error $Δθ$ between the d-axis and the γ-axis converges to zero so that a stable motor control can be realized. Note that if the axial error $Δθ$ is maintained at zero, the d-axis current $i_d$ follows the specified γ-axis current value $i_γ^*$ while the q-axis current $i_q$ follows the specified δ-axis current value $i_δ^*$.

The calculation equation for calculating the d-axis current $i_d$ for performing a maximum torque control utilizing a reluctance torque is known widely. When a maximum torque control is performed by the motor control device 103 having the structure described above, the magnetic flux controller 116 calculates the specified γ-axis current value $i_γ^*$ based on the equation (2) below. Here, $Φ_a$ represents armature flux linkage of the permanent magnet.

$$i_\gamma^* = \frac{\Phi_a}{2(L_q - L_d)} - \sqrt{\frac{\Phi_a^2}{4(L_q - L_d)^2} + i_\delta^{*2}} \qquad (2)$$

In addition, JP-A-2003-309992 (hereinafter referred to as a second patent document) discloses a position sensor-less control method, in which a phase of motor current is adjusted so that a value of motor current becomes a minimum value.

In addition, "Position and Speed Sensorless Control for IPMSM Based on Estimation of Position Error", Sigeo Morimoto et al, T.IEE Japan, Vol. 122-D, No. 7, 2002, pp. 722-729 (hereinafter referred to as a first non-patent document) discloses a relationship between an error of an operation parameter that is used for estimating a rotor position and a position estimation error (the axial error). In addition, Japanese patent No. 3312472 (hereinafter referred to as a third patent document), JP-A-2003-219682 (hereinafter referred to as a fourth patent document), JP-A-2002-51597 (hereinafter referred to as a fifth patent document) and JP-A-2003-153582 (hereinafter referred to as a sixth patent document) disclose motor control techniques utilizing injection of high frequency voltage or high frequency current. In addition, JP-A-H10-94298 discloses a technique concerning switching between a low speed sensor-less control and a high speed sensor-less control.

In order to realize the maximum torque control by using the above equation (2), it is required as a precondition that the axial error $\Delta\theta$ is maintained at zero. On the other hand, the calculation of the axial error $\Delta\theta$ using the above equation (1) needs a value of the q-axis inductance $L_q$ as an operation parameter (a motor parameter). Therefore, in a conventional method, a real value of the q-axis inductance $L_q$ of the motor 1 is studied for performing the maximum torque control so that the real value of the q-axis inductance $L_q$ is used as it is for obtaining the axial error $\Delta\theta$ (and therefore the estimated rotor position $\theta_e$).

In addition, in order to perform a high efficiency operation by the maximum torque control or the like utilizing the reluctance torque, it is necessary to supply the motor with the d-axis current $i_d$ corresponding to the q-axis current $i_q$ as understood from the above equation (2). Therefore, the specified $\gamma$-axis current value $i_\gamma^*$ must be calculated sequentially in order to perform the high efficiency operation.

In addition, the calculation equation for calculating the specified $\gamma$-axis current value $i_\gamma^*$ for performing the maximum torque control or the like includes a plurality of motor parameters whose true values are not known. Therefore, if there are errors between the motor parameters (the operation parameters) that are used for calculating the specified $\gamma$-axis current value $i_\gamma^*$ and true motor parameters, a desired motor control cannot be performed. For this reason, it is essential to perform an adjustment for decreasing the errors as much as possible. However, the adjustment for the plurality of motor parameters is not easy, and a lot of time is necessary for the adjustment.

When the maximum torque control is performed in the conventional motor control device as described above, it is the first thing to adjust the parameters for maintaining the axial error $\Delta\theta$ at zero (for estimating the rotor position).

Secondly, it is also required to adjust the parameters that are used in the calculation equation (2) for calculating the specified $\gamma$-axis current value $i_\gamma^*$.

Thirdly, it is necessary to perform the calculation of the specified $\gamma$-axis current value $i_\gamma^*$ sequentially that requires a complicated calculation.

The parameter adjustment for the rotor position estimation and the parameter adjustment for calculating the specified $\gamma$-axis current value $i_\gamma^*$ are performed independently, so more time for the adjustments is necessary. In addition, the error in the adjustment of the parameter for estimating the rotor position and the error in the adjustment of the parameter for calculating the specified $\gamma$-axis current value $i_\gamma^*$ are affected by each other so that the adjustments become more difficult.

In addition, when the adjustments become difficult, optimization of the parameters also becomes difficult resulting in difficulty in realizing an optimal drive of the motor.

Note that the techniques described in the first patent document, the second patent document and the first non-patent document which are described above cannot solve the problem described above. Furthermore, the second patent document utilizes an approximation of $\Delta\theta \approx 0$, so estimation accuracy becomes lower as a value of $\Delta\theta$ increases.

SUMMARY OF THE INVENTION

An object of the present invention is to provide a motor control device that can contribute to facilitation of adjustment of an operation parameter for obtaining a maximum torque control or the like, and/or reduction of quantity of calculations. Furthermore, it is another object to provide a motor drive system having the motor control device.

A first motor control device according to the present invention includes an estimator for estimating a rotor position of a motor having a salient pole by using a value corresponding to the q-axis inductance of the motor as an operation parameter, and a controller for controlling the motor based on the estimated rotor position, wherein the estimator generates a deviation between the d-axis and the $\gamma$-axis by performing the estimation of the rotor position based on a value between a real q-axis inductance and a real d-axis inductance of the motor adopted as the operation parameter, where the d-axis is an axis parallel to a magnetic flux generated by a permanent magnet that constitutes the rotor, the $\gamma$-axis is an estimated axis for the control corresponding to the d-axis, and the q-axis is an axis leading the d-axis by 90 degrees in electrical angle.

Specifically, for example, the controller controls the motor so that a $\gamma$-axis component of a motor current supplied to the motor is maintained to be a predetermined value of zero or close to zero.

As described above, when a rotor position is estimated, not the real q-axis inductance but a value between the real q-axis inductance and the real d-axis inductance is used as the operation parameter corresponding to the q-axis inductance so that a deviation is generated between the d-axis and the $\gamma$-axis purposely. In order to perform a maximum torque control or the like, it is necessary to supply the motor with q-axis current corresponding to the d-axis current. Since the above-mentioned deviation is generated, the d-axis current corresponding to the q-axis current flows actually even though the $\gamma$-axis component of the motor current is maintained to a predetermined value of zero or close to zero.

In other words, according to the structure described above, it is not required to calculate sequentially a value of the $\gamma$-axis component of the necessary motor current. It is sufficient to set the $\gamma$-axis component to a predetermined value of zero or close to zero for realizing the maximum torque control or the like required the d-axis current.

In addition, it was necessary in the conventional structure shown in FIGS. 21 and 22 to adjust an operation parameter for estimating a rotor position and an operation parameter for performing the maximum torque control. According to the structure described above, however, the adjustment of the operation parameters for performing the maximum torque control and the like can be integrated to the adjustment of the operation parameter corresponding to the q-axis inductance. In other words, the adjustment of the operation parameters for realizing the maximum torque control and the like can be facilitated, so that adjustment time can be reduced. In addition, since the sequential calculation of a value of the $\gamma$-axis component of the motor current becomes needless, quantity of calculation for the maximum torque control and the like can be reduced.

Specifically, for example, the estimator also estimates a rotation speed of the rotor corresponding to the estimation of the rotor position, and the controller includes a specified current calculator that generates a specified γ-axis current value and a specified δ-axis current value to be followed by the γ-axis component and a δ-axis component of the motor current so that the estimated rotation speed follows a specified motor speed value given externally, where the δ-axis is an axis leading the γ-axis by 90 degrees in electrical angle. Further, the specified current calculator maintains the specified γ-axis current value at the predetermined value regardless of a value of the specified δ-axis current value, so that the γ-axis component of the motor current is maintained at the predetermined value regardless of a value of the δ-axis component of the motor current.

In addition, for example, a value of the operation parameter is set to a value such that the motor current becomes a minimum value in the state where the γ-axis component of the motor current is the predetermined value and the motor is supplied with a predetermined load torque.

Thus, a maximum torque control or a control similar to the maximum torque control can be realized.

In addition, for example, a value of the operation parameter is set to a value such that a loss of the motor becomes a minimum value in the state where the γ-axis component of the motor current is the predetermined value and the motor is under a predetermined load condition.

Thus, a maximum efficiency control or a control similar to the maximum efficiency control can be realized.

In addition, for example, the estimator performs the estimation of the rotor position by using a q-axis inductance L as the operation parameter that satisfies the following expression $L_d \leq L < (L_d+L_q)/2$, where $L_q$ and $L_d$ are respectively the real q-axis inductance and the real d-axis inductance of the motor.

In addition, for example, the operation parameter may have a fixed value.

Thus, an adjustment of the operation parameter becomes easier.

In addition, a second motor control device according to the present invention controls the motor by decomposing a motor current that flows in the motor into a qm-axis component parallel to a qm-axis and a dm-axis component parallel to a dm-axis, where the qm-axis is a rotation axis having the same direction as a current vector for realizing a maximum torque control or a rotation axis leading said rotation axis in phase, and the dm-axis is a rotation axis that is orthogonal to the qm-axis.

According to the structure described above too, facilitation of an adjustment of the operation parameter and the like are expected.

More specifically, the second motor control device includes an estimator for estimating a rotor position of the motor and a controller for controlling the motor based on the estimated rotor position. The controller controls the motor so that a γ-axis and a δ-axis follow the dm-axis and the qm-axis, respectively, where the d-axis is an axis parallel to a magnetic flux generated by a permanent magnet that constitutes a rotor, the γ-axis is an estimated axis for the control corresponding to the d-axis, and the δ-axis is an axis leading the γ-axis by 90 degrees in electrical angle.

In addition, for example, in the second motor control device, the controller controls the motor so that a γ-axis component of the motor current is maintained to be a predetermined value of zero or close to zero.

Thus, a sequential calculation of a value of the γ-axis component of the motor current becomes needless, so quantity of calculation for the maximum torque control or the like can be reduced.

In addition, for example, in the second motor control device, the estimator estimates the rotor position by using an axial error between the qm-axis and the δ-axis.

In addition, for example, in the second motor control device, the estimator estimates the rotor position by using an induction voltage vector on the qm-axis in the case where a vector of an induction voltage on a q-axis generated in the motor is decomposed into the induction voltage vector on the qm-axis and an induction voltage vector on the dm-axis, where the q-axis is an axis leading the d-axis by 90 degrees in electrical angle.

Further, for example, in the second motor control device, the estimator estimates the rotor position by using a γ-axis component and a δ-axis component of the induction voltage vector on the qm-axis or by using the γ-axis component of the induction voltage vector on the qm-axis.

In addition, for example, in the second motor control device, the estimator estimates the rotor position by using a flux linkage vector on the dm-axis in the case where a vector of a flux linkage on the d-axis of the motor is decomposed into a flux linkage vector on the qm-axis and the flux linkage vector on the dm-axis.

Further, for example, in the second motor control device, the estimator estimates the rotor position by using a γ-axis component and a δ-axis component of the flux linkage vector on the dm-axis or by using the δ-axis component of the flux linkage vector on the dm-axis.

In addition, for example, in the second motor control device, the controller includes a coordinate converter for converting a predetermined fixed axis component of the motor current into a γ-axis component and a δ-axis component by using the rotor position estimated by the estimator, the estimator estimates a dm-axis component and a qm-axis component of the motor current based on the γ-axis component and the δ-axis component of the motor current obtained by the coordinate converter, the rotor position is estimated by using an error current between the dm-axis component of the motor current obtained by the estimation and the γ-axis component of the motor current obtained by the coordinate converter and also using an error current between the qm-axis component of the motor current obtained by the estimation and the δ-axis component of the motor current obtained by the coordinate converter.

In addition, for example, the second motor control device further includes a superposer for adding a superposed voltage to a drive voltage for driving the motor, the superposed voltage having a frequency different from the drive voltage. The estimator is capable of performing a first estimation process for estimating the rotor position based on a superposed current that flows in the motor corresponding to the superposed voltage.

When a superposed voltage such as a high frequency rotation voltage is added so that the rotor position can be estimated based on a superposed current generated by the superposed voltage, an appropriate sensor-less control can be realizes in particular at a low speed rotation or when the rotation is stopped.

Further, for example, in the second motor control device, the estimator is further capable of performing a second estimation process for estimating the rotor position based on a drive current corresponding to the drive voltage included in the motor current, and a estimation process that is performed actually is switched between the first estimation process and the second estimation process in accordance with speed information indicating a rotation speed of the rotor.

Thus, an appropriate sensor-less control can be realized over a wide speed range.

More specifically, the estimator includes a first candidate axial error calculator for calculating an axial error between the qm-axis and the δ-axis as a first candidate axial error based on the superposed current, and a second candidate axial error calculator for calculating an axial error between the qm-axis and the δ-axis as a second candidate axial error based on the drive current. The estimator switches information that is used for estimating the rotor position between the first candidate axial error and the second candidate axial error in accordance with the speed information, so as to switch between the first estimation process and the second estimation process.

More specifically, for example, the estimator includes a first candidate speed calculator for calculating a rotation speed of the rotor as a first candidate speed based on the superposed current, and a second candidate speed calculator for calculating a rotation speed of the rotor as a second candidate speed based on the drive current, and it switches information that is used for estimating the rotor position between the first candidate speed and the second candidate speed in accordance with the speed information so as to switch between the first estimation process and the second estimation process.

More specifically, for example, the estimator includes a first candidate position calculator for calculating a first candidate position as a candidate of the rotor position to be estimated based on the superposed current, and a second candidate position calculator for calculating a second candidate position as a candidate of the rotor position to be estimated based on the drive current, and it switches information that is used for estimating the rotor position between the first candidate position and the second candidate position based on the speed information so as to switch between the first estimation process and the second estimation process.

Further, for example, the estimator switches the estimation process that is performed actually from one of the first and the second estimation processes to the other via an estimation process in which the estimation results of both the estimation processes are considered in accordance with the speed information or an elapsed time from a start of the switching.

Thus, a smooth switching of the estimation process can be realized.

More specifically, for example, a voltage vector locus of the superposed voltage on a rotating coordinate axes describes a figure symmetric about the d-axis.

More specifically, for example, when the estimator estimates the rotor position in the first estimation process, it estimates the rotor position by using at least one-axis component of orthogonal two-axes components forming a vector of the superposed current.

More specifically, for example, the estimator includes a coordinate rotator that performs a coordinate rotation of a vector of the superposed current by a phase difference between the dm-axis and the d-axis, and when it estimates the rotor position in the first estimation process, it estimates an axial error between the qm-axis and the δ-axis by using at least one-axis component of orthogonal two-axes components forming a current vector obtained by the coordinate rotation and then estimates the rotor position by using the axial error.

In addition, a motor drive system according to the present invention includes a motor, an inverter for driving the motor, and a motor control device having any structure described above, which controls the motor by controlling the inverter.

As described above, according to the motor control device and the motor drive system of the present invention, an adjustment of an operation parameter for realizing a maximum torque control or the like can be facilitated. In addition, quantity of calculation can be reduced, too.

DESCRIPTION OF THE PREFERRED EMBODIMENTS

First Embodiment

Figure 1:
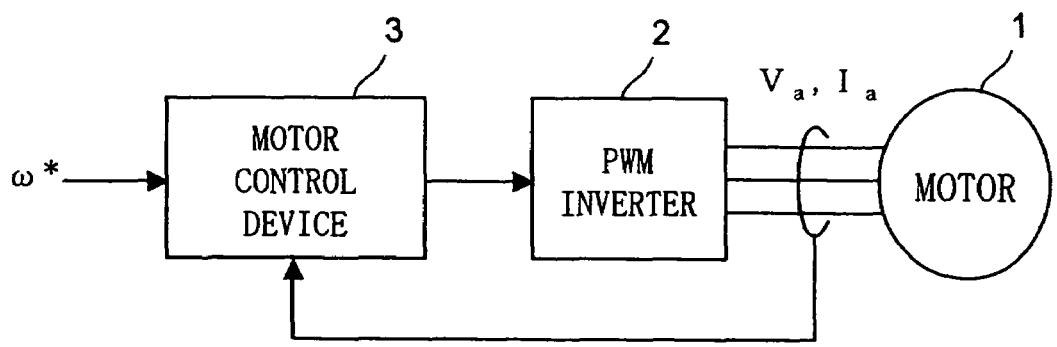
FIG. 1 is a block diagram showing a general structure of a motor drive system according to a first embodiment of the present invention.

Now, embodiments of the present invention will be described in detail. To begin with, a first embodiment of the present invention will be described. FIG. 1 is a block diagram showing a general structure of a motor drive system according to a first embodiment of the present invention. Reference numeral 1 denotes a three-phase permanent magnet synchronous motor (hereinafter referred to as "motor 1" simply) including a rotor (not shown) with a permanent magnet and a stator (not shown) with an armature winding. The motor 1 is a salient pole machine (a motor having a salient pole) such as an interior permanent magnet synchronous motor.

Reference numeral 2 denotes a PWM (Pulse Width Modulation) inverter, which supplies the motor 1 with three-phase alternating voltage consisting of U-phase, V-phase and W-phase in accordance with a rotor position of the motor 1. The voltage supplied to the motor 1 is referred to as a motor voltage (or an armature voltage) $V_a$, and current supplied from an inverter 2 to the motor 1 is referred to as a motor current (or an armature current) $I_a$.

Reference numeral 3 denotes a motor control device (a position sensor-less motor control device), which estimates a rotor position and the like of the motor 1 based on the motor current $I_a$ and supplies the PWM inverter 2 with a signal for driving the motor 1 in a desired rotation speed. This desired rotation speed is imparted from a CPU (Central Processing Unit, not shown) or the like to the motor control device 3 as a specified motor speed value ω*.

Figure 2:
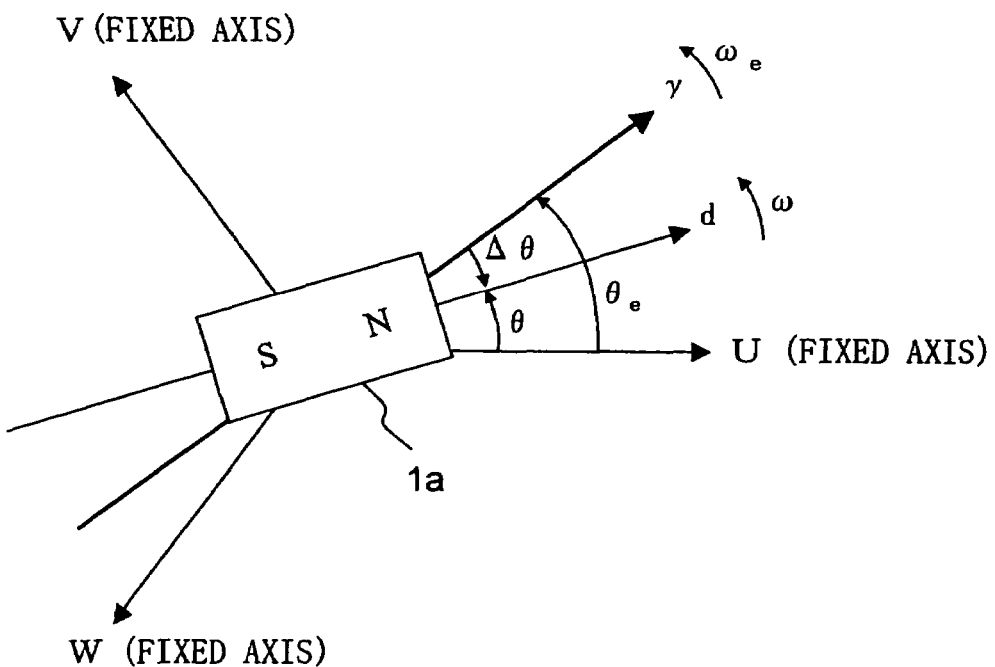
FIG. 2 is an analytic model diagram of a motor according to the first embodiment of the present invention.

FIG. 2 is an analytic model diagram of the motor 1. In the following description, the armature winding means what is provided to the motor 1. FIG. 2 shows armature winding fixed axes of the U-phase, the V-phase and the W-phase. Reference numeral 1a denotes a permanent magnet that constitutes the rotor of the motor 1. In a rotating coordinate system that rotates at a speed equal to that of a magnetic flux generated by the permanent magnet 1a, a direction of the magnetic flux generated by the permanent magnet 1a corresponds to a d-axis while an estimated axis for control corresponding to the d-axis corresponds to a γ-axis. Although not shown, a q-axis is adopted at a 90 degrees leading phase from the d-axis in the electrical angle, while a δ-axis that is the estimated axis is adopted at a 90 degrees leading phase from the γ-axis in the electrical angle. The rotating coordinate system corresponding to the real axis is a coordinate system in which the d-axis and the q-axis are chosen as the coordinate axes, which are called d-q axes. The rotating coordinate system for the control (an estimation rotating coordinate system) is a coordinate system in which the γ-axis and the δ-axis are chosen as coordinate axes, which are called γ-δ axes.

The d-q axes is rotating, and a rotation speed thereof is called a real motor speed ω. The γ-δ axes are also rotating, and a rotation speed thereof is called an estimated motor speed $ω_e$. Furthermore, in the rotating d-q axes at a certain moment, a phase of the d-axis is denoted by θ (a real rotor position θ) with reference to the armature winding fixed axis of the U-phase. Similarly, in the rotating γ-δ axes at a certain moment, a phase of the γ-axis is denoted by $θ_e$ (an estimated rotor position $θ_e$) with reference to the armature winding fixed axis of the U-phase. Then, an axial error Δθ between the d-axis and the γ-axis (an axial error Δθ between the d-q axes and the γ-δ axes) is expressed in $Δθ=θ−θ_e$.

In the following description, a γ-axis component, a δ-axis component, a d-axis component and a q-axis component of the motor voltage $V_a$ are represented by γ-axis voltage $v_γ$, δ-axis voltage $v_γ$, d-axis voltage $v_d$ and q-axis voltage $v_q$, respectively. A γ-axis component, a δ-axis component, a d-axis component and a q-axis component of the motor current $I_a$ are represented by γ-axis current $i_γ$, δ-axis current $i_δ$, d-axis current $i_d$ and q-axis current $i_q$, respectively.

Furthermore, in the following description, $R_a$ denotes a motor resistance (a resistance of the armature winding of the motor 1). $L_d$ and $L_q$ denote a d-axis inductance (a d-axis component of an inductance of the armature winding of the motor 1) and a q-axis inductance (a q-axis component of an inductance of the armature winding of the motor 1), respectively. $\Phi_a$ denotes an armature flux linkage attributable to the permanent magnet 1a. Note that $L_d$, $L_q$, $R_a$ and $\Phi_a$ are values that are determined when the motor drive system is manufactured, and the values are used for calculation by the motor control device. Furthermore, s denotes the Laplace operator in the equations that will be shown later.

Figure 3:
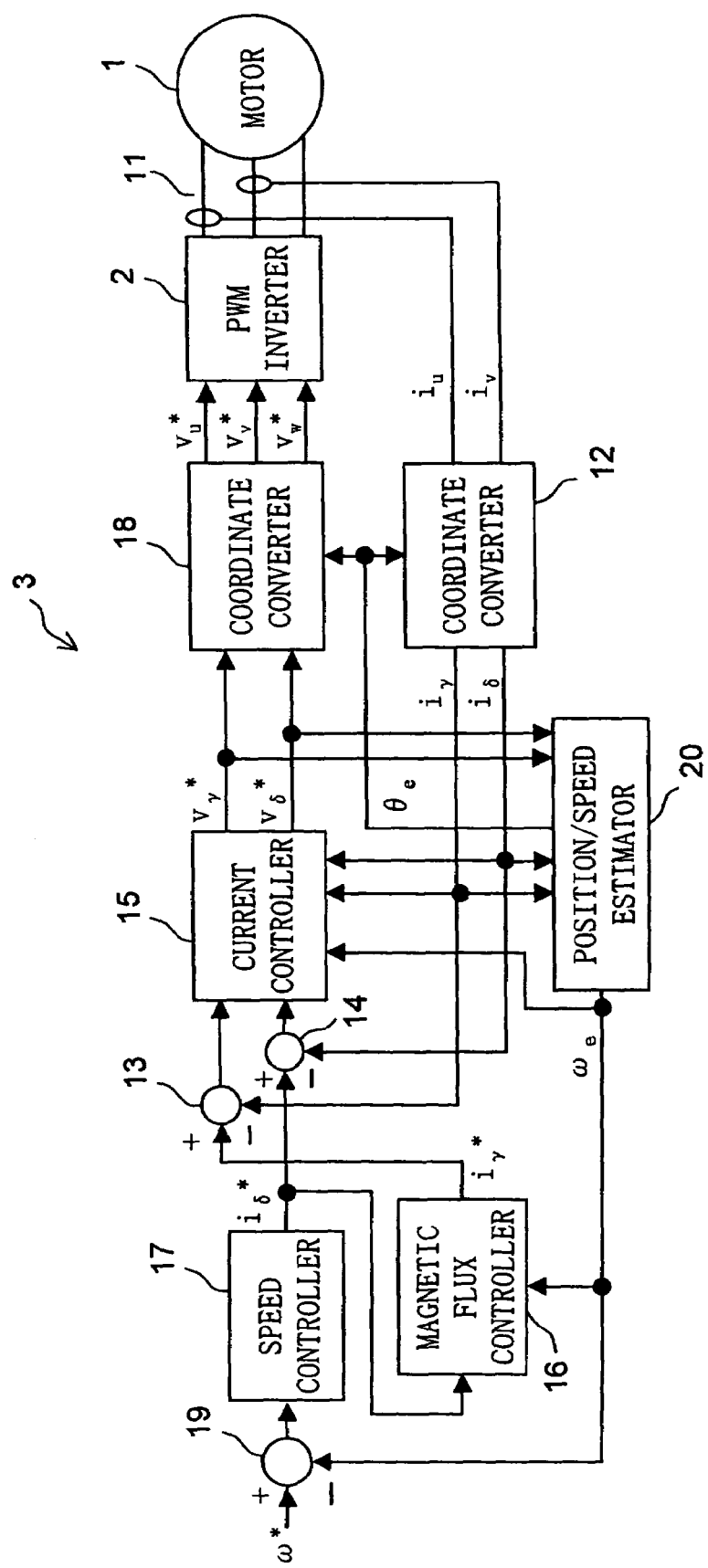
FIG. 3 is a block diagram showing a structure of the motor drive system shown in FIG. 1.

FIG. 3 is a block diagram of a motor drive system showing an inside structure of the motor control device 3 shown in FIG. 1. The motor control device 3 includes a current detector 11, a coordinate converter 12, a subtracter 13, a subtracter 14, a current controller 15, a magnetic flux controller 16, a speed controller 17, a coordinate converter 18, a subtracter 19 and a position/speed estimator 20 (hereinafter referred to as an "estimator 20" simply). Each portion constituting the motor control device 3 can use every value generated in the motor control device 3 freely, if necessary.

The current detector 11 is made up of a Hall device or the like, for example. The current detector 11 detects the U-phase current $i_u$ and the V-phase current $i_v$ that are fixed axis components of the motor current $I_a$ that is supplied from the PWM inverter 2 to the motor 1. The coordinate converter 12 receives detection results of the U-phase current $i_u$ and the V-phase current $i_v$ from the current detector 11 and converts them into the $\gamma$-axis current $i_\gamma$ and the $\delta$-axis current $i_\delta$ by using the estimated rotor position $\theta_e$ given by the estimator 20. This conversion process uses the following equation (3).

$$\begin{bmatrix} i_\gamma \\ i_\delta \end{bmatrix} = \sqrt{2} \begin{bmatrix} \sin(\theta_e + \pi/3) & \sin\theta_e \\ \cos(\theta_e + \pi/3) & \cos\theta_e \end{bmatrix} \begin{bmatrix} i_u \\ i_v \end{bmatrix} \quad (3)$$

The estimator 20 estimates the estimated rotor position $\theta_e$ and the estimated motor speed $\omega_e$ and outputs them. A method for estimating the estimated rotor position $\theta_e$ and the estimated motor speed $\omega_e$ will be described in detail later.

The subtracter 19 subtracts the estimated motor speed $\omega_e$ given by the estimator 20 from the specified motor speed value $\omega^*$, and the subtraction result (a speed error) is outputted. The speed controller 17 generates a specified $\delta$-axis current value $i_\delta^*$ based on the subtraction result ($\omega^* - \omega_e$) from the subtracter 19. This specified $\delta$-axis current value $i_\delta^*$ represents a value of the current to be followed by the $\delta$-axis current $i_\delta$ that is a $\delta$-axis component of the motor current $I_a$. The magnetic flux controller 16 outputs a specified $\gamma$-axis current value $i_\gamma^*$. This specified $\gamma$-axis current value $i_\gamma^*$ represents a value of current to be followed by the $\gamma$-axis current $i_\gamma$ that is a $\gamma$-axis component of the motor current $I_a$. Although a relationship between the position/speed estimator 20 and the specified $\gamma$-axis current value $i_\gamma^*$ will be described in detail later, the specified $\gamma$-axis current value $i_\gamma^*$ is maintained at zero in this embodiment.

The subtracter 13 subtracts the $\gamma$-axis current $i_\gamma$ outputted by the coordinate converter 12 from the specified $\gamma$-axis current value $i_\gamma^*$ outputted by the magnetic flux controller 16 so as to calculate a current error ($i_\gamma^* - i_\gamma$). The subtracter 14 subtracts the $\delta$-axis current $i_\delta$ outputted by the coordinate converter 12 from the specified $\delta$-axis current value $i_\delta^*$ outputted by the speed controller 17 so as to calculate a current error ($i_\delta^* - i_\delta$).

The current controller 15 receives current errors calculated by the subtracters 13 and 14, the $\gamma$-axis current $i_\gamma$ and the $\delta$-axis current $i_\delta$ from the coordinate converter 12 and the estimated motor speed $\omega_e$ from the estimator 20. Then, the current controller 15 outputs the specified $\gamma$-axis voltage value $v_\gamma^*$ and the specified $\delta$-axis voltage value $v_\delta^*$ so that the $\gamma$-axis current $i_\gamma$ follows the specified $\gamma$-axis current value $i_\gamma^*$ and that the $\delta$-axis current $i_\delta$ follows the specified $\delta$-axis current value $i_\delta^*$.

The coordinate converter 18 performs inverse conversions of the specified $\gamma$-axis voltage value $v_\gamma^*$ and the specified $\delta$-axis voltage value $v_\delta^*$ based on the estimated rotor position $\theta_e$ given by the estimator 20, and it generates specified three-phase voltage values consisting of a specified U-phase voltage value $v_u^*$, a specified V-phase voltage value $v_v^*$ and a specified W-phase voltage value $v_w^*$ indicating the a U-phase component, a V-phase component and a W-phase component of the motor voltage $V_a$ so as to output them to the PWM inverter 2. This inverse conversion uses the following equation (4) that includes two equations.

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* \\ v_\delta^* \end{bmatrix} \quad (4)$$

$$v_w^* = -(v_u^* + v_v^*)$$

The PWM inverter 2 generates a pulse width modulated signal that is modulated based on the specified three-phase voltage values ($v_u^*$, $v_v^*$ and $v_w^*$) indicating voltage values to be applied to the motor 1. Then, the PWM inverter 2 supplies the motor 1 with the motor current $I_a$ corresponding to the specified three-phase voltage values for driving the motor 1.

Figure 4:
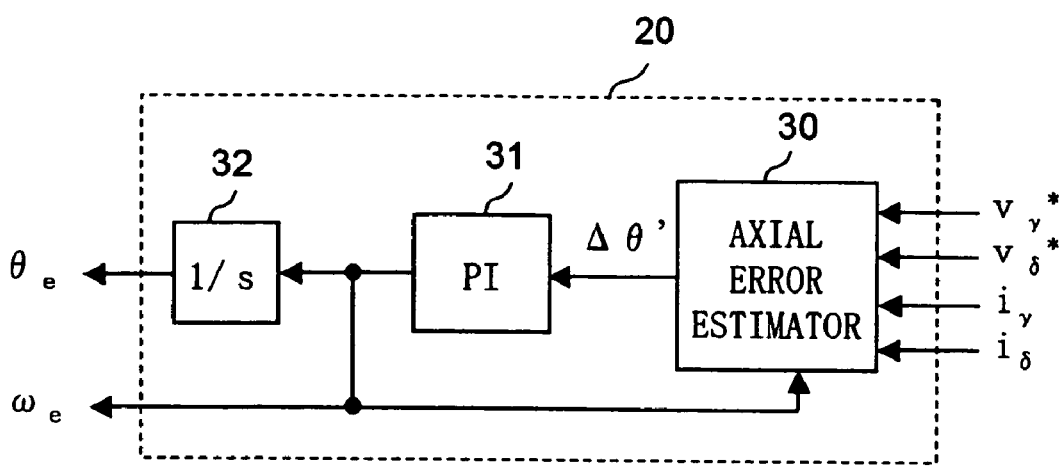
FIG. 4 is a block diagram showing an inside structure of a position/speed estimator shown in FIG. 3.

FIG. 4 shows an example of an inside structure of the estimator 20. The estimator 20 shown in FIG. 4 includes an axial error estimator 30, a proportional-plus-integral calculator 31 and an integrator 32.

The axial error estimator 30 calculates an axial error $\Delta\theta'$. This axial error $\Delta\theta'$ is different from the axial error $\Delta\theta$ as described clearly later. An axial error estimator 130 shown in FIG. 22 calculates the axial error $\Delta\theta$ by using the above equation (1), while the axial error estimator 30 shown in FIG. 4 calculates the axial error $\Delta\theta'$ by using the equation (5) below.

$$\Delta\theta' = \tan^{-1}\left(\frac{-(v_\gamma^* - (R_a + L_d s)i_\gamma + \omega_e L i_\delta)}{v_\delta^* - (R_a + L_d s)i_\delta - \omega_e L i_\gamma}\right) \quad (5)$$

The equation (5) corresponds what $\Delta\theta$ and $L_q$ in the above equation (1) are respectively replaced with $\Delta\theta'$ and L. Therefore, the axial error estimator 30 regards L as an operation parameter corresponding to the q-axis inductance when the rotor position is estimated so as to estimate the axial error $\Delta\theta'$. A method for setting a value of the operation parameter L and a meaning of the axial error $\Delta\theta'$ in connection with the method will be described later.

The proportional-plus-integral calculator 31 performs a proportional plus integral control in cooperation with each portion constituting the motor control device 3 for realizing a PLL (Phase Locked Loop), and it calculates the estimated motor speed $\omega_e$ so that the axial error $\Delta\theta'$ calculated by the axial error estimator 30 converges to zero. The integrator 32 integrates the estimated motor speed $\omega_e$ outputted by the proportional-plus-integral calculator 31 so as to calculate the estimated rotor position $\theta_e$. The estimated motor speed $\omega_e$ outputted by the proportional-plus-integral calculator 31 and the estimated rotor position $\theta_e$ outputted by the integrator 32 are imparted to each portion of the motor control device 3 that needs the values as output values of the estimator 20.

If a true value (a real value) of the q-axis inductance is used as L in the equation (5), i.e., $L=L_q$, $\Delta\theta'$ becomes equal to $\Delta\theta$. Therefore, the axial error $\Delta\theta'(=\Delta\theta)$ converges to zero (i.e., becomes the same control as the structure shown in FIG. 21) as a result of a PLL control performed by the proportional-plus-integral calculator 31 and the like. However, as a characterized point of this embodiment, the operation parameter L is set to a value that satisfies the inequality (6) below. More specifically, a value between a real q-axis inductance (i.e., $L_q$) and a real d-axis inductance (i.e., $L_d$) of the motor 1 is adopted as an operation parameter corresponding to the q-axis inductance for performing the calculation of the axial error. Note that $L_d < L_q$ is satisfied, of course.

$$L_d \leq L < L_q \tag{6}$$

In addition, it is desirable that the operation parameter L is determined so as to satisfy the inequality (7) below.

$$L_d \leq L < (L_d + L_q)/2 \tag{7}$$

The axial error $\Delta\theta'$ that is obtained by adopting the L that was set as described above as the operation parameter corresponding to the q-axis inductance is naturally different from the axial error $\Delta\theta$. For this reason, even if the PLL control is performed so that the axial error $\Delta\theta'$ converges to zero, a deviation (i.e., an axial error that is not zero) may occur between the d-axis and the γ-axis.

In this embodiment, this deviation is generated purposely, and the deviation is utilized for setting the specified γ-axis current value $i_\gamma^*$ outputted by the magnetic flux controller 16 to zero. Thus, a control similar to the maximum torque control is performed. This control will be examined as follows.

First, as disclosed in the first non-patent document mentioned above, a relationship between an error of the operation parameter that is used for estimation of a rotor position (i.e., calculation of the estimated rotor position $\theta_e$) and a position estimation error (an axial error) is expressed in the equation (8) below. Here, $R_a'$ represents a value of the motor resistance as the operation parameter that is used in the calculation equation for estimating the rotor position, and $(R_a - R_a')$ represents an error between the operation parameter and a true motor resistance $R_a$. $L_q'$ represents a value of the q-axis inductance as the operation parameter that is used in the calculation equation for estimating the rotor position, and $(L_q - L_q')$ represents an error between the operation parameter and a true q-axis inductance.

$$\frac{R_a - R_a'}{\omega} i_\gamma - (L_q - L_q') i_\delta = \sin\Delta\theta \{\Phi_a + (L_d - L_q)(i_\gamma \cos\Delta\theta + i_\delta \sin\Delta\theta)\} \tag{8}$$

It is supposed that $L_q' = L$. In other words, it is supposed that an error corresponding to $(L_q - L)$ is given for estimating the rotor position purposely. The estimation of the axial error $\Delta\theta'$ by using the above equation (5) means that the error corresponding to $(L_q - L)$ is given so as to estimate the axial error. In addition, it is supposed that $(R_a - R_a')$ is zero. Furthermore, it is supposed that the specified γ-axis current value $i_\gamma^*$ to be followed by the γ-axis current $i_\gamma$ is set to zero as described above. In other words, it is supposed that $i_\gamma = 0$ in the equation (8). Then, the equation (8) can be transformed to the equation (9) below.

$$\frac{i_d}{\sqrt{i_d^2 + i_q^2}} \{\Phi_a + (L_d - L_q) i_d\} + (L_q - L) \sqrt{i_d^2 + i_q^2} = 0 \tag{9}$$

Then, the equation (10) of the d-axis current $i_d$ matching the maximum torque control is substituted into the equation (9) so as to solve the equation for L. Thus, the following equation (11) is obtained. Note that the equation (10) is generally known and the maximum torque control can be obtained by supplying the motor 1 with the d-axis current $i_d$ that satisfied the equation (10) in accordance with the q-axis current $i_q$.

$$i_d = \frac{\Phi_a}{2(L_q - L_d)} - \sqrt{\frac{\Phi_a^2}{4(L_q - L_d)^2} + i_q^2} \tag{10}$$

$$L = L_q + \frac{-2(L_q - L_d)^3 i_q^2}{\Phi_a^2 - \Phi_a \sqrt{\Phi_a^2 + 4(L_d - L_q)^2 i_q^2} + 4(L_d - L_q)^2 i_q^2} \tag{11}$$

As understood from the method for deriving the equation (11), L in the equation (11) indicates a value of the q-axis inductance as the operation parameter to be adopted by the axial error estimator 30 for obtaining the maximum torque control in an ideal manner when the specified γ-axis current value $i_\gamma^*$ is set to zero.

Figure 5:
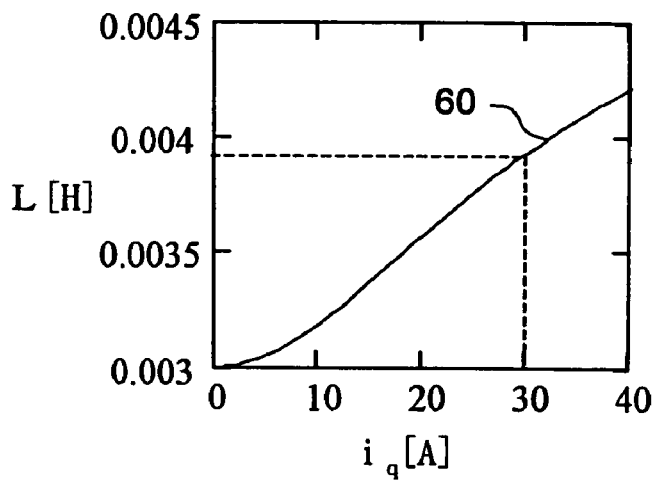
FIG. 5 is a graph showing a relationship between a q-axis inductance as an operation parameter and a q-axis current matching the maximum torque control under the condition that a γ-axis current is zero.

L in the equation (11) is a function of the q-axis current $i_q$. Hereinafter, for a specific description, some example values are used, which include $\Phi_a = 0.2411$ [Vs/rad], $L_d = 0.003$ [H] and $L_q = 0.008$ [H]. In this case, the relationship between $i_q$ and L is shown by the curve 60 in FIG. 5. When the specified γ-axis current value $i_\gamma^*$ is set to zero, a value of L matching the maximum torque control is approximately within the range of 0.003–0.0042 [H] under the condition of 1 [A] $\leq i_q \leq$ 40 [A]. More specifically, it is understood that when the specified γ-axis current value $i_\gamma^*$ is set to zero, a value of L matching the maximum torque control exists on the fairly $L_d$ (that is 0.003 [H] in this example) side from $L_q$ (that is 0.008 [H] in this example).

Noting this fact in this embodiment, the operation parameter L that satisfies the above inequality (6) or (7) is adopted, and the specified γ-axis current value $i_\gamma^*$ is set to zero, so that a control similar to the maximum torque control is realized. For example, the relationship between the q-axis current $i_q$ and the d-axis current $i_d$ that flows in the motor 1 when the operation parameter L is fixed as L=0.0039 [H] regardless of $i_q$ under the condition of the above example values is shown by the broken line 62 in FIG. 6. The solid line 61 is a curve showing the relationship between the d-axis current $i_d$ and the q-axis current $i_q$ when the maximum torque control is performed in an ideal manner. The broken line 62 and the solid line 61 show curved that are very similar to each other as understood from FIG. 6.

Despite of $i_\gamma^* = 0$, the d-axis current $i_d$ flows corresponding to the q-axis current $i_q$ because that a deviation is generated between the d-axis and the γ-axis when the operation parameter L that satisfies the above inequality (6) or (7) is adopted as the operation parameter corresponding to the q-axis inductance. Note that L=0.0039 [H] when $i_q=30$ [A] on the curve 60 in FIG. 5, so naturally the solid line 61 and the broken line 62 cross each other at $i_q=30$[A].

Although a value of the specified γ-axis current value $i_\gamma^*$ is set to zero in the example described above for a specific description, the value of the specified γ-axis current value $i_\gamma^*$ is not required to be precisely zero but can be a value of approximately zero (i.e., $i_\gamma^* \approx 0$). In other words, "zero" concerning a value of the specified γ-axis current value $i_\gamma^*$ should be interrupted to be "substantial zero" having a certain extent of range. If the $i_\gamma^*$ is not precisely zero, a control similar to the maximum torque control can be realized as long as the $i_\gamma^*$ can be regarded to be substantially zero.

Figure 7:
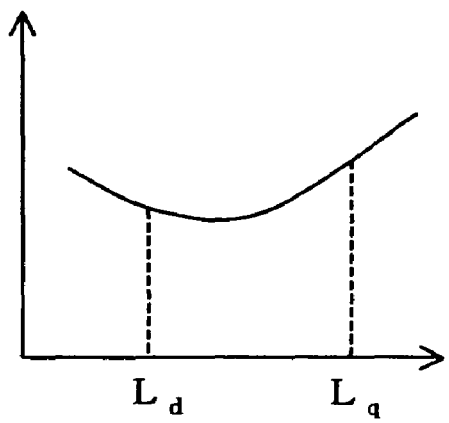
FIG. 7 is a graph showing a relationship between motor current and the q-axis inductance as an operation parameter under the condition that a γ-axis current is zero.

A value of the operation parameter L is selected from a range that satisfies the above inequality (6) or (7) so that a control similar to the maximum torque control is realized as described above. More specifically, the specified γ-axis current value $i_\gamma^*$ is set to a predetermined value of zero or close to zero so that the γ-axis current $i_\gamma$ is the predetermined value and the motor 1 is given a predetermined load torque. Then, in this state, a value of the operation parameter L such that the motor current $I_a$ becomes a minimum value is selected from the range satisfying the above inequality (6) or (7). A value of L that gives a minimum value to the motor current $I_a$ under the condition of $i_\gamma^* \approx 0$ exists between $L_d$ and $L_q$ as shown in FIG. 7. Even if various values are adopted as the values of $\Phi_a$, $L_d$ and $L_q$, such L satisfies the above inequality (7).

When a value of L that gives a minimum value to the motor current $I_a$ under the condition of $i_\gamma^* \approx 0$ is selected, the L becomes an operation parameter for realizing the maximum torque control in an ideal manner at the predetermined load torque. Note that such a value of the operation parameter L is examined and set in a designing stage.

Figure 21:
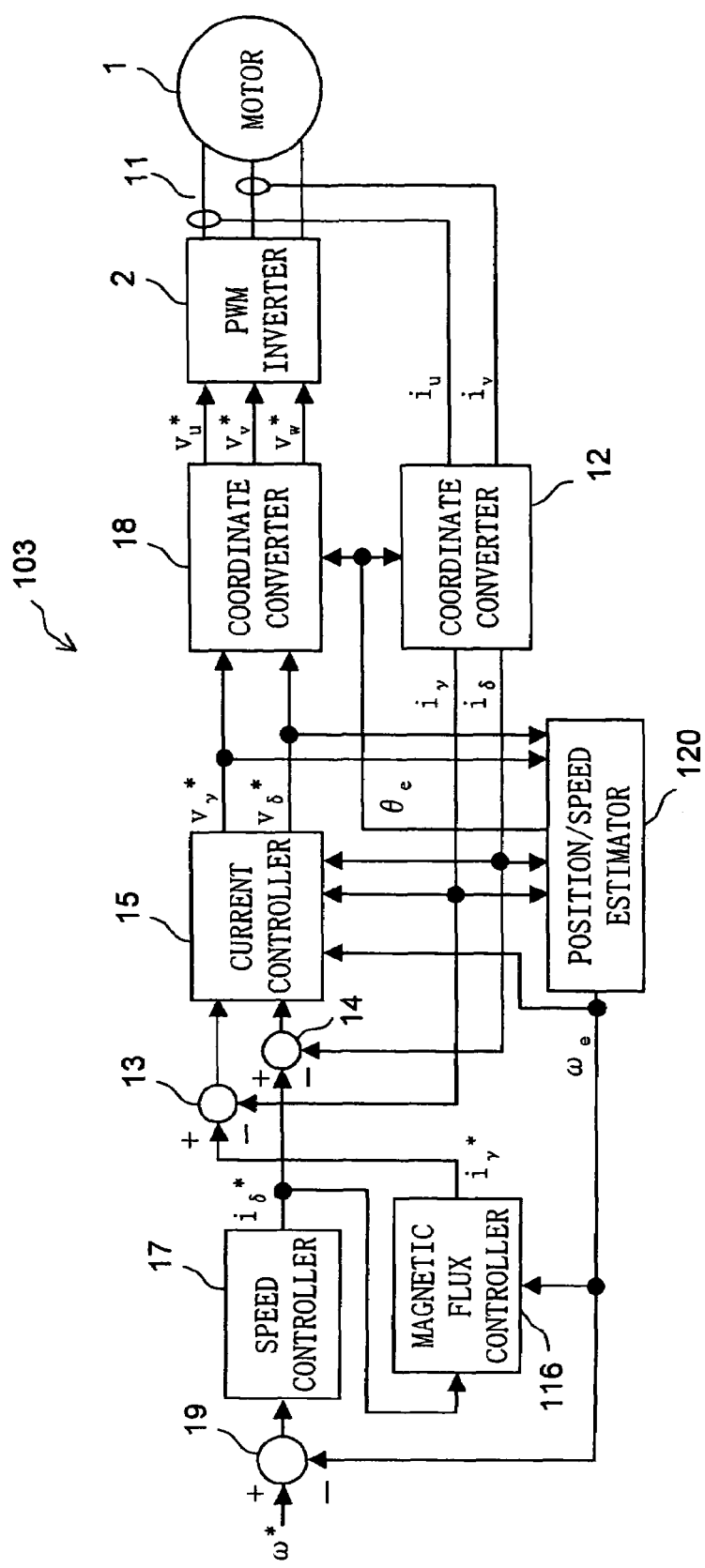
FIG. 21 is a block diagram showing a structure of a conventional motor control device.
Figure 22:
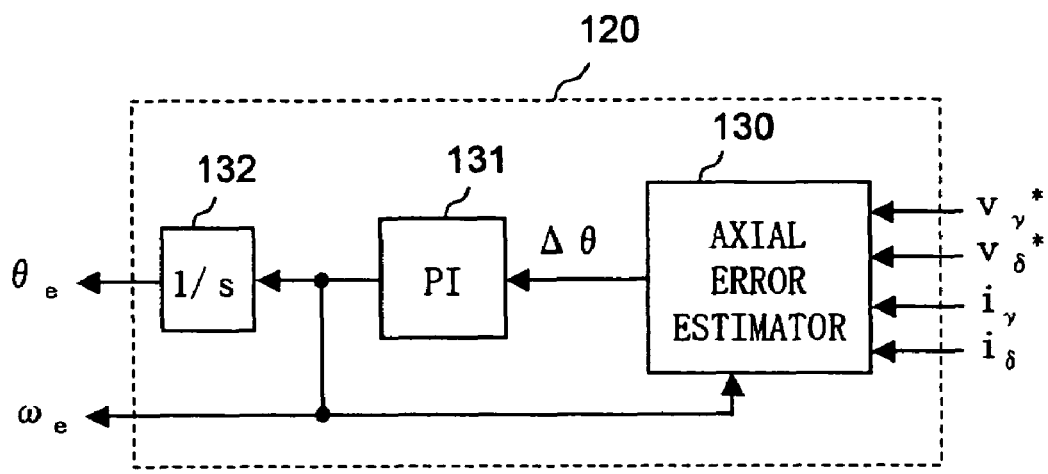
FIG. 22 is a block diagram showing an inside structure of the position/speed estimator shown in FIG. 21.
Figure 23:
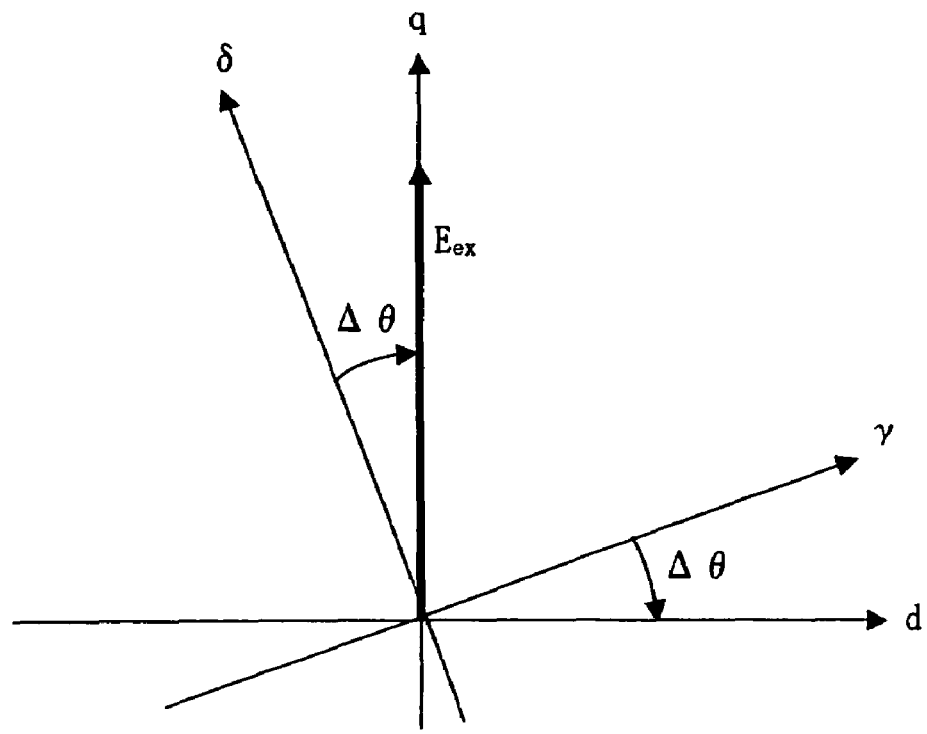
FIG. 23 is a vector diagram showing an operation of a motor shown in FIG. 21.

In this way, if a value of the q-axis inductance as an operation parameter that is used for estimating a rotor position is set appropriately, a control similar to the maximum torque control can be realized only by setting $i_\gamma^* \approx 0$ without calculating a value of $i_\gamma^*$ sequentially. As a result, a quantity of calculation for the maximum torque control can be reduced. In addition, although the adjustment of the operation parameter for estimating a rotor position and the adjustment of the operation parameter for performing the maximum torque control are necessary in the conventional structure as shown in FIGS. 21 and 22, this embodiment can realize a control similar to the maximum torque control only by adjusting the operation parameter L for estimating a rotor position. Thus, time necessary for adjustments can be reduced, and temporal efficiency is improved.

In addition, although the operation parameter L is set to a fixed value (L=0.0039 [H] in this example) regardless of a value of the q-axis current $i_q$ in the example described above, the operation parameter L may be altered in accordance with a value of the q-axis current $i_q$ (in accordance with a value of the specified δ-axis current value $i_\delta^*$). For example, the operation parameter L may be altered in accordance with a value of the q-axis current $i_q$ (in accordance with a value of the specified δ-axis current value $i_\delta^*$) along the curve 60 shown in FIG. 5. Then, even if $i_\gamma^* \approx 0$, an ideal maximum torque control can be realized (in this case, the solid line 61 and the broken line 62 match each other completely in FIG. 6). Note that it should be examined in advance in the designing stage how the operation parameter L is set in accordance with a value of the q-axis current $i_q$ (in accordance with a value of the specified δ-axis current value $i_\delta^*$).

In addition, although the method for realizing the maximum torque control or a control similar to the maximum torque control is described above, other control utilizing the reluctance torque may be realized depending on a method for setting the operation parameter L.

For example, the specified γ-axis current value $i_\gamma^*$ is set to a predetermined value of zero or close to zero so that the γ-axis current $i_\gamma$ becomes the predetermined value, and a predetermined load condition is given to the motor 1. Then, in this state, a value of the operation parameter L such that losses in the motor 1 (a copper loss and an iron loss) becomes a minimum value is selected from the range satisfying the above inequality (6) or (7). A value of L that gives a minimum value to the loss under the condition of $i_\gamma^* \approx 0$ exists between $L_d$ and $L_q$ similarly to the case of the maximum torque control. Even if various values are adopted as the values of $\Phi_a$, $L_d$ and $L_q$, such L satisfies the above inequality (7).

When a value of L that gives a minimum value to the loss under the condition of $i_\gamma^* \approx 0$ is selected, the L becomes an operation parameter for realizing the maximum efficiency control under the predetermined load condition. Note that such a value of the operation parameter L is examined and set in a designing stage. In addition, the above-mentioned "the predetermined load condition" means, for example, the condition of rotating the motor 1 at a predetermined rotation speed or the condition of giving the motor 1 a predetermined load torque.

In addition, the current controller 15 performs necessary calculations by using the following equations (12a) and (12b) including two equations. In addition, the speed controller 17 and the proportional-plus-integral calculator 31 perform necessary calculations by using the following equations (13) and (14).

$$v_\gamma^* = \left(K_{cp} + \frac{K_{ci}}{s}\right)(i_\gamma^* - i_\gamma) - \omega_e L_q i_\delta \tag{12a}$$

$$v_\delta^* = \left(K_{cp} + \frac{K_{ci}}{s}\right)(i_\delta^* - i_\delta) + \omega_e(L_d i_\gamma + \Phi_a) \tag{12b}$$

$$i_\delta^* = (K_{sp} + K_{si}/s) \cdot (\omega^* - \omega_e) \tag{13}$$

$$\omega_e = (K_p + K_i/s) \cdot \Delta\theta' \tag{14}$$

Here, $K_{cp}$, $K_{sp}$ and $K_p$ denote constants of proportionality (proportional gains), while $K_{ci}$, $K_{si}$ and $K_i$ denote constants of integration (integral gains), which are preset in a designing stage of the motor drive system.

[About Estimator]

The above-mentioned method for estimating a rotor position performed by the estimator 20 is merely an example, and various methods of estimation can be adopted. When the estimation of a rotor position (i.e., calculation of an estimated rotor position $\theta_e$) is performed, any estimation method can be adopted as long as it is an estimation method that uses an operation parameter corresponding to the q-axis inductance of the motor 1.

For example, a method described in the first non-patent document may be used for estimating a rotor position. In the first non-patent document mentioned above, it is understood that the axial error $\Delta\theta$ is calculated by using the following equation (15). If reference numerals and symbols in this embodiment are used, $e_\gamma$ and $e_\delta$ respectively represent the γ-axis component and the δ-axis component of the induction voltage generated by rotation of the motor 1 and an armature flux linkage $\Phi_a$ of the permanent magnet 1a. In addition, s represents the Laplace operator, and g represents a gain of a disturbance observer.

$$\Delta\theta = \tan^{-1}\left(\frac{-e_\gamma}{e_\delta}\right) \tag{15}$$

$$= \tan^{-1}\frac{-\frac{g}{s+g}(v_\gamma + \omega_e L_q i_\delta - (L_d s + R_a)i_\gamma)}{\frac{g}{s+g}(v_\delta - \omega_e L_q i_\gamma - (L_d s + R_a)i_\delta)}$$

If the method for estimating the axial error from the induction voltage as shown in equation (15) is adopted by the axial error estimator 30 shown in FIG. 4, the axial error estimator 30 should calculate the axial error $\Delta\theta'$ by using the following equation (16). The equation (16) is what $\Delta\theta$ and $L_q$ in the above equation (15) are replaced with $\Delta\theta'$ and L, respectively. Then, similarly to the structure shown in FIG. 4, the proportional-plus-integral calculator 31 calculates the estimated motor speed $\omega_e$, and the integrator 32 calculates the estimated rotor position $\theta_e$ so that the axial error $\Delta\theta'$ converges to zero. Thus, a deviation may occur between the d-axis and the γ-axis.

$$\Delta\theta' = \tan^{-1}\left(\frac{-e_\gamma}{e_\delta}\right) \quad (16)$$

$$= \tan^{-1}\frac{-\frac{g}{s+g}(v_\gamma + \omega_e L i_\delta - (L_d s + R_a) i_\gamma)}{\frac{g}{s+g}(v_\delta - \omega_e L i_\gamma - (L_d s + R_a) i_\delta)}$$

In addition, the method described in JP-A-2004-96979 or other method may be used for estimating a rotor position.

Furthermore, instead of the structure shown in FIG. 4, a structure for estimating an axial error (a rotor position) from the flux linkage to be basis of the induction voltage may be adopted. This method will be described as follows. First, an equation of the extension induction voltage (the extended electromotive force) on the real axis is usually expressed as the following equation (17). $E_{ex}$ in the equation (17) is expressed in the equation (18), which is called an extension induction voltage (an extended electromotive force). Note that p in the following equations denotes a differential operator.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (17)$$

$$E_{ex} = \omega((L_d - L_q)i_d + \Phi_a) - (L_d - L_q)(pi_q) \quad (18)$$

When the equation (17) on the real axis is converted into an equation on a control axis by coordinate conversion, the equation (19) is obtained.

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + \quad (19)$$

$$E_{ex}\begin{bmatrix} -\sin\Delta\theta \\ \cos\Delta\theta \end{bmatrix} + (\omega_e - \omega)L_d\begin{bmatrix} -i_\delta \\ i_\gamma \end{bmatrix}$$

In addition, the magnetic flux in the case where the transient term (the second term on the right-hand side) of the equation (18) indicating the extension induction voltage $E_{ex}$ is ignored is defined as an extension magnetic flux $\Phi_{ex}$ as shown in the following equation (20).

$$\Phi_{ex} = (L_d - L_q)i_d + \Phi_a \quad (20)$$

Since a value of the motor current and a variation of the phase is very small in the state of a constant motor speed and a constant load, the second term on the right-hand side of the equation (18) that is a differential term of the q-axis current is sufficiently smaller than $\omega\Phi_{ex}$ and can be regarded as zero. In addition, if the motor 1 is driven without stepping out, the real motor speed $\omega$ and the estimated motor speed $\omega_e$ have values that are similar to each other. Therefore, the third term on the right-hand side of the equation (19) is also smaller than $\omega\Phi_{ex}$ sufficiently and can be regarded as zero. Therefore, ignoring the second term on the right-hand side of the equation (18)

and the third term on the right-hand side of the equation (19), the equation (19) becomes the following equation (21).

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} \quad (21)$$

$$= \begin{bmatrix} R_a + pL_d & -\omega L_q \\ \omega L_q & R_a + pL_d \end{bmatrix} \begin{bmatrix} i_\gamma \\ i_\delta \end{bmatrix} + \omega\Phi_{ex}\begin{bmatrix} -\sin\Delta\theta \\ \cos\Delta\theta \end{bmatrix}$$

Figure 8:
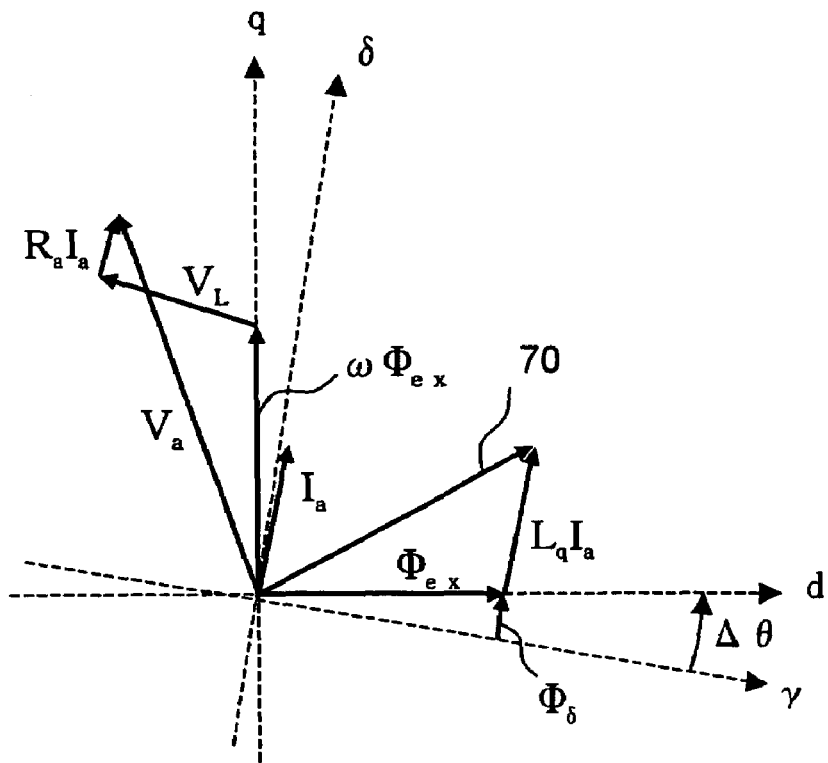
FIG. 8 is a vector diagram showing an operation of a motor shown in FIG. 1.

Here, FIG. 8 shows a vector diagram indicating the relationship among voltages of the portions of the motor 1, and so on. The voltage $V_a$ applied to the motor is shown as a sum of the extension induction voltage $E_{ex} = \omega\Phi_{ex}$, a voltage drop vector $R_a \cdot I_a$ by the motor resistance $R_a$ and a voltage drop vector $V_L$ by the inductance of the armature winding. The extension magnetic flux $\Phi_{ex}$ is a sum of a magnetic flux $\Phi_a$ generated by the permanent magnet and a magnetic flux $(L_d - L_q)i_d$ generated by the d-axis current, so the vector thereof has the same direction as the d-axis. The vector represented by $L_q \cdot I_a$ is a vector of the magnetic flux generated by the q-axis inductance and the motor current $I_a$, and the reference numeral 70 represents a composite magnetic flux vector of $\Phi_{ex}$ and $L_q \cdot I_a$.

In addition, $\Phi_\delta$ represents a δ-axis component of the extension magnetic flux $\Phi_{ex}$. Therefore, the equation $\Phi_\delta = \Phi_{ex} \cdot \sin\Delta\theta$ holds. Furthermore, when the first row of the matrix in the equation (21) is expanded and organized, the following equation (22) is derived.

$$\Phi_{ex}\sin\Delta\theta = -\left(\frac{v_\gamma - (L_d s + R_a)i_\gamma}{\omega} + L_q i_\delta\right) \quad (22)$$

Usually, the magnetic flux generated by the permanent magnet is sufficiently larger than the magnetic flux generated by the d-axis current, i.e., $\Phi_a$ is sufficiently larger than $(L_d - L_q)i_d$. Therefore, it is regarded that $\Phi_{ex}$ has a constant value, i.e., $\Phi_{ex} \approx \Phi_a$. Then, supposing that the axial error $\Delta\theta$ is so small that an approximation $\sin\Delta\theta \approx \Delta\theta$ is satisfied, the following equation (23) holds with reference to the equation (22).

$$\Phi_\delta = \Phi_{ex}\sin\Delta\theta = -\left(\frac{v_\gamma - (L_d s + R_a)i_\gamma}{\omega} + L_q i_\delta\right) \quad (23)$$

$$\approx \Phi_a \sin\Delta\theta$$

$$\approx \Phi_a \Delta\theta$$

As understood from the above equation (23), $\Phi_\delta$ can be approximated to equal to the δ-axis component of the armature flux linkage $\Phi_a$ (i.e., a δ-axis magnetic flux that is a magnetic flux component parallel to the δ-axis of the permanent magnet 1a of the motor 1 (see FIG. 2)). Therefore, it is approximated that $\Phi_\delta \approx$ (a constant value)$\times\Delta\theta$. For this reason, when this $\Phi_\delta$ is controlled to converge to zero, the axial error $\Delta\theta$ also converges to zero. In other words, a rotor position or a motor speed can be estimated based on $\Phi_\delta$.

Figure 9:
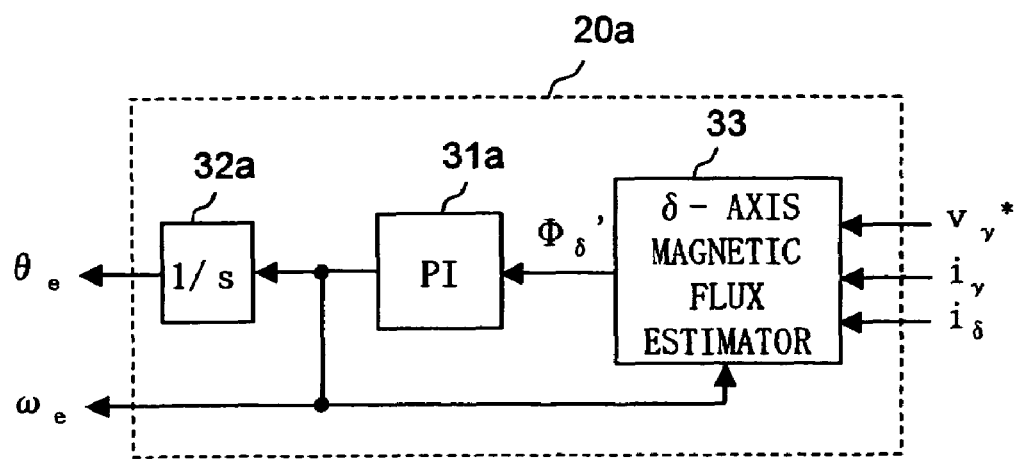
FIG. 9 is a block diagram showing a variation of a position/speed estimator shown in FIG. 3.

Therefore, the estimator 20 shown in FIGS. 3 and 4 can be replaced with an estimator 20a shown in FIG. 9. The estimator 20a includes a δ-axis magnetic flux estimator 33, a proportional-plus-integral calculator 31a and an integrator 32a. If the axial error $\Delta\theta$ is converged to zero, the δ-axis magnetic flux estimator 33 should estimate a δ-axis magnetic flux $\Phi_\delta$. However, similarly to the idea described above, in order to generate a deviation purposely between the d-axis and the γ-axis, the δ-axis magnetic flux estimator 33 estimates a δ-axis magnetic flux $\Phi_\delta'$ in accordance with the following equation (24). More specifically, it calculates the δ-axis magnetic flux $\Phi_\delta'$ by using L that satisfies the above inequality (6) or (7) instead of a real value of $L_q$ as an operation parameter corresponding to the q-axis inductance.

$$\Phi_\delta' = -\left(\frac{v_\gamma^* - (L_d s + R_a)i_\gamma}{\omega_e} + Li_\delta\right) \quad (24)$$

The proportional-plus-integral calculator 31*a* is similar to the proportional-plus-integral calculator 31 shown in FIG. 4, and it cooperate with each portion constituting the motor control device 3 so as to perform the proportional plus integral control. Thus, the proportional-plus-integral calculator 31*a* calculates the estimated motor speed $\omega_e$ so that the δ-axis magnetic flux $\Phi_\delta'$ calculated by the δ-axis magnetic flux estimator 33 converges to zero. The integrator 32*a* integrates the estimated motor speed $\omega_e$ outputted by the proportional-plus-integral calculator 31*a* so as to calculate the estimated rotor position $\theta_e$. The estimated motor speed $\omega_e$ outputted by the proportional-plus-integral calculator 31*a* and the estimated rotor position $\theta_e$ outputted by the integrator 32*a* are imparted to portions of the motor control device 3 that need the values as output values of the estimator 20*a*.

As understood from the equation (24), the term including $L_d$ is multiplied by $i_\gamma$, so a value of the term is relatively small. In other words, when a rotor position is estimated, influence of the d-axis inductance $L_d$ is small (because a value of $i_\gamma$ is much smaller than a value of $i_\delta$). Considering this fact, it is possible to use L as a value of $L_d$ in the equation (24) that is used for the estimation. In this case, a high efficiency operation of the salient pole machine can be realized by a control similar to a control that is used for a non-salient pole machine (such as a surface magnet synchronous motor) that does not utilize a reluctance torque. Therefore, it is unnecessary to change the control by distinguishing a difference of a structure for embedding a magnet, for example, resulting in a high flexibility. This high flexibility is also true in the case where the equations (5) and (16) and the others are used.

Although the approximation $\Phi_{ex} \approx \Phi_a$ is used in the equation (23), it is possible to estimate the δ-axis magnetic flux without using this approximation. In this case, the δ-axis magnetic flux $\Phi_\delta'$ may be estimated in accordance with the following equation (25). In this case too, L that satisfies the above inequality (6) or (7) is used as the operation parameter corresponding to the q-axis inductance instead of a real value of $L_q$.

$$\Phi_\delta' = -\frac{\Phi_a}{(L_d - L)i_\gamma + \Phi_a}\left(\frac{v_\gamma^* - (L_d s + R_a)i_\gamma}{\omega_e} + Li_\delta\right) \quad (25)$$

Second Embodiment

Next, a second embodiment of the present invention will be described. In the descriptions of the above first embodiment, this embodiment and the following other embodiments, the same elements are denoted by the same reference numeral or the same symbol (θ, ω or the like) as long as without a special description. Therefore, overlapping description about the element denoted by the same reference numeral or the same symbol may be omitted.

Figure 10:
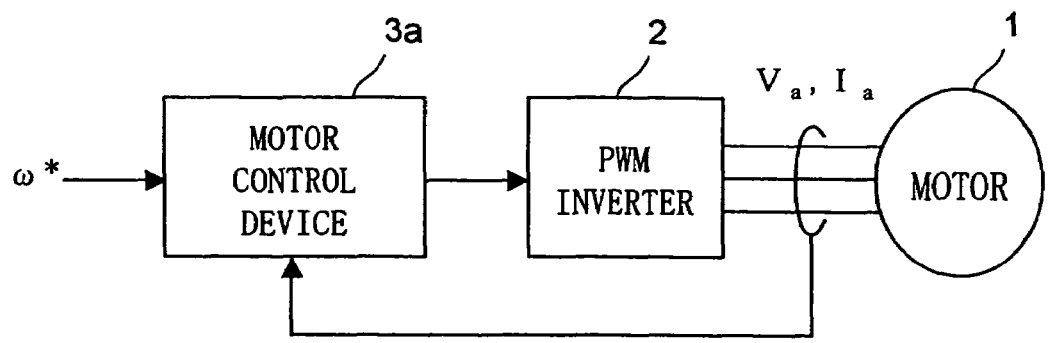
FIG. 10 is a block diagram showing a general structure of a motor drive system according to a second embodiment of the present invention.

FIG. 10 is a block diagram of a motor drive system according to the second embodiment. The motor drive system according to the second embodiment includes a motor 1, an inverter 2 and a motor control device 3*a*.

The motor control device 3*a* estimates a rotor position or the like of the motor 1 based on the motor current $I_a$, and it supplies the PWM inverter 2 with a signal for rotating the motor 1 at a desired rotation speed. This desired rotation speed is supplied from a CPU (Central Processing Unit) or the like (not shown) to the motor control device 3*a* as a specified motor speed value ω*.

Figure 11:
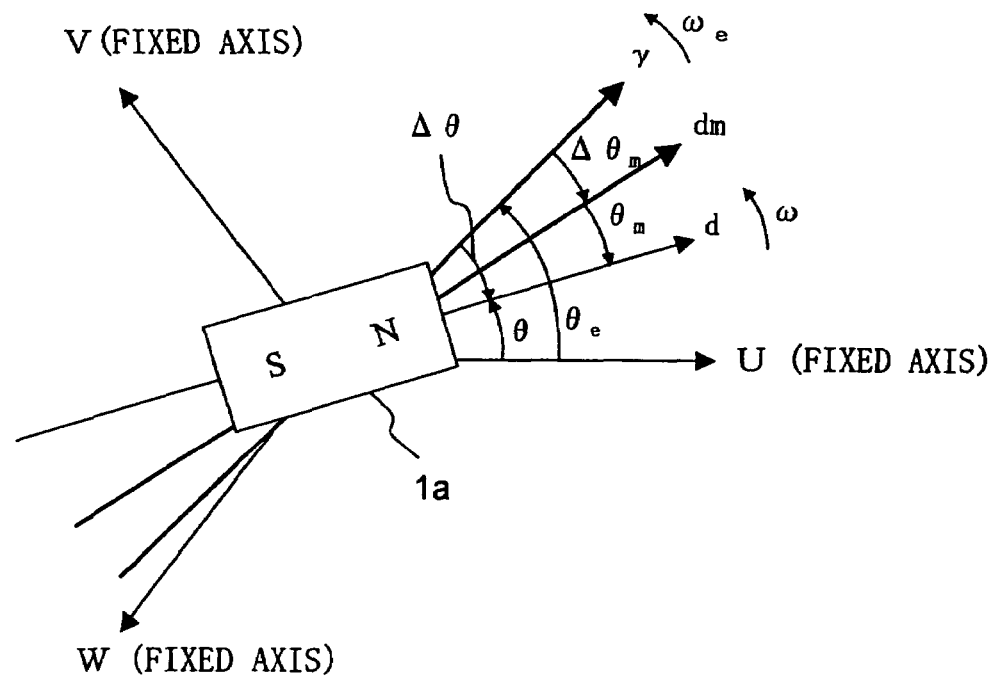
FIG. 11 is an analytic model diagram of a motor according to the second embodiment of the present invention.
Figure 12:
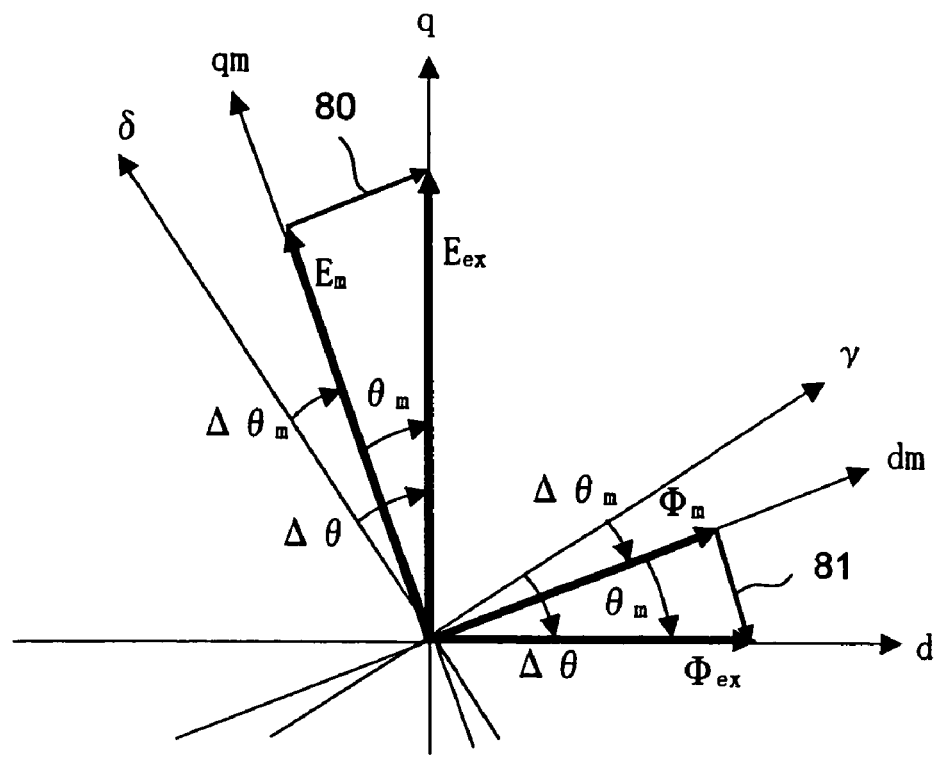
FIG. 12 is an analytic model diagram of the motor according to the second embodiment of the present invention.

FIGS. 11 and 12 are analytic model diagrams of the motor 1, which are applied to this embodiment. FIG. 11 shows armature winding fixed axes in the U-phase, the V-phase and the W-phase. In this embodiment too, a d-axis, a q-axis, a γ-axis, a δ-axis, a real rotor position θ, an estimated rotor position $\theta_e$, an axial error Δθ, a real motor speed ω and an estimated motor speed $\omega_e$ are defined in the same manner as in the first embodiment (see FIG. 2).

In addition, a rotation axis having the same direction as a vector of current to be supplied to the motor 1 when the maximum torque control is realized is defined as a qm-axis. Then, the axis lagging behind the qm-axis by 90 degrees in electrical angle is defined as dm-axis. Coordinate axes consisting of the dm-axis and the qm-axis are called as dm-qm axes.

Figure 6:
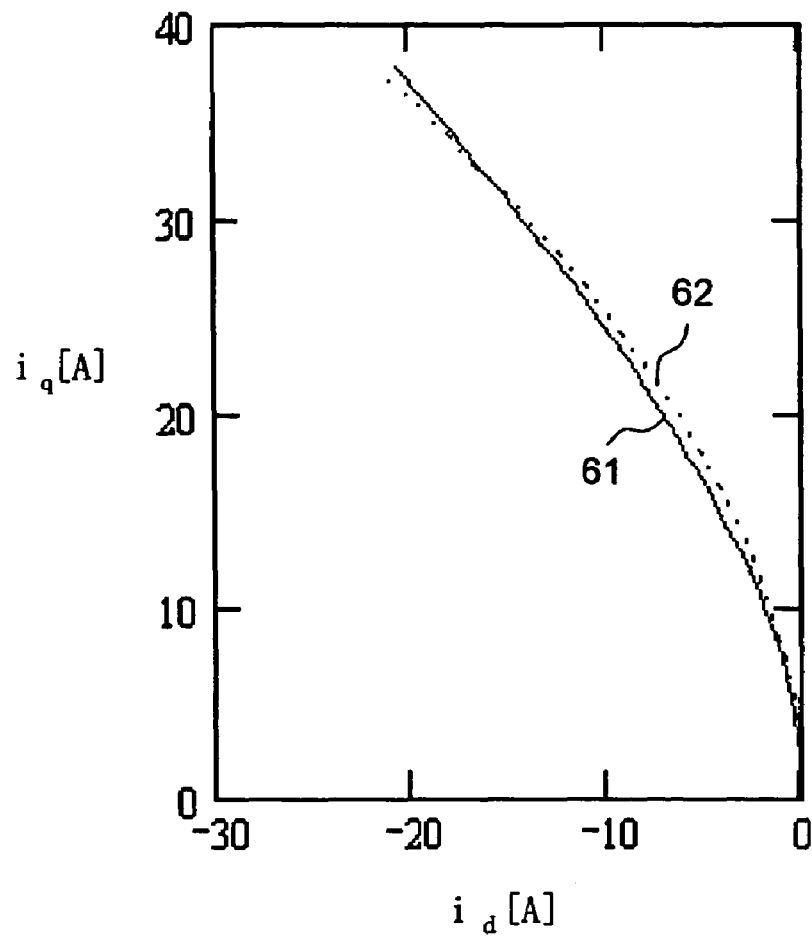
FIG. 6 is a graph showing a comparison between an ideal maximum torque control and a control by the motor drive system shown in FIG. 1.

As understood from the solid fine 61 in FIG. 6 indicating a current locus when the maximum torque control is realized, motor current for realizing the maximum torque control has a positive q-axis component and a negative d-axis component. For this reason, the qm-axis leads the q-axis in phase. In FIGS. 11 and 12, the anticlockwise direction is the leading direction in phase.

A phase (an angle) of the q-axis viewed from the qm-axis is denoted by $\theta_m$, and a phase (an angle) of the qm-axis viewed from the δ-axis is denoted by $\Delta\theta_m$. In this case, naturally, a phase of the d-axis viewed from the dm-axis is also denoted by $\theta_m$, and a phase of the dm-axis viewed from the γ-axis is also denoted by $\Delta\theta_m$. $\theta_m$ is a leading angle of the qm-axis (or the dm-axis) viewed from the q-axis (or the d-axis). $\Delta\theta_m$ denotes an axial error between the qm-axis and the δ-axis (or an axial error between the dm-qm axes and the γ-δ axes). Δθ that is an axial error between the d-axis and the γ-axis is denoted by $\Delta\theta = \Delta\theta_m + \theta_m$.

As described above, the dm-axis leads the d-axis in phase. In this case, it is supposed that $\theta_m$ has a negative value. Similarly, when the γ-axis leads the dm-axis in phase, $\Delta\theta_m$ has a negative value. The vectors ($E_m$ and the like) shown in FIG. 12 will be described later.

In addition, the dm-axis component and the qm-axis component of the motor current $I_a$ are represented by a dm-axis current $i_{dm}$ and a qm-axis current $i_{qm}$, respectively. The dm-axis component and the qm-axis component of the motor voltage $V_a$ are represented by a dm-axis voltage $v_{dm}$ and a qm-axis voltage $v_{qm}$, respectively.

In this embodiment, the axial error $\Delta\theta_m$ between the qm-axis (the dm-axis) and the δ-axis (the γ-axis) is estimated, and the γ-axis that is an estimated axis is converged to the dm-axis (i.e., the axial error $\Delta\theta_m$ is converged to zero). Then, the motor current $I_a$ is decomposed into the qm-axis current $i_{qm}$ that is parallel to the qm-axis and the dm-axis current $i_{dm}$ that is parallel to the dm-axis, so as to perform a vector control of the motor 1.

In this case too, it is necessary to adjust a parameter for estimate the axial error $\Delta\theta_m$ (so that the axial error $\Delta\theta_m$ is converged to zero). When this adjustment is performed, an adjustment of a parameter for realizing the maximum torque control is completed at the same time. In other words, the parameter adjustment for the axial error estimation is also the parameter adjustment for realizing the maximum torque control, so the adjustment can be performed very easily.

Figure 13:
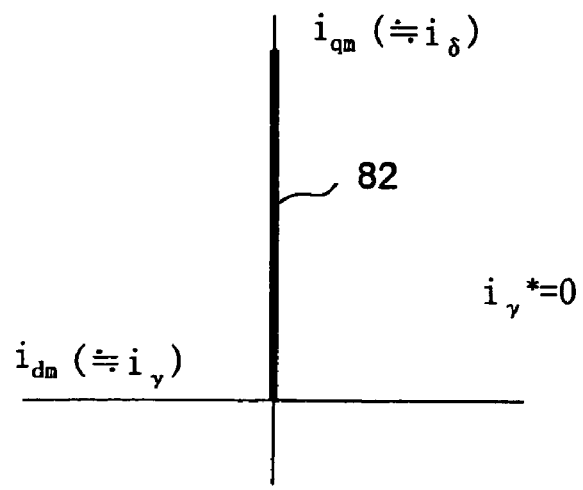
FIG. 13 is a diagram showing an example of a current vector locus of motor current that flows in the motor shown in FIG. 10.

In addition, as understood from the definition of the qm-axis, the current locus of the motor current $I_a$ when the maximum torque control is performed is located on the qm-axis as shown by the solid line 82 in FIG. 13. Therefore, when the maximum torque control is performed, the complicated calculation of the specified γ-axis current value $i_\gamma^*$ as shown in the above equation (2) is not necessary, so that the calculation load can be reduced. In this case, the specified γ-axis current value $i_\gamma^*$ is set similarly to the first embodiment. More specifically, for example, the specified γ-axis current value $i_\gamma^*$ is set to a predetermined value of zero or close to zero regardless of a value of $i_\delta$.

Next, meaning and a specific method for the control in this embodiment will be described with reference to a voltage equation. Firstly, an extension induction voltage equation on the real axis is expressed in the equation (26), and an extension induction voltage $E_{ex}$ is expressed in the equation (27). The equation (26) is similar to the above equation (17), and the equation (27) is similar to the above equation (18). Note that p in the following equations represents the differential operator.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (26)$$

$$E_{ex} = \omega((L_d - L_q)i_d + \Phi_a) - (L_d - L_q)(pi_q) \quad (27)$$

When the equation (26) on the real axis is converted into an equation on the γ-δ axes that is an estimated axis for the control by the coordinate conversion, the equation (28) is obtained. Then, the third term on the right-hand side of the equation (28) is ignored for simplification, so that the equation (29) is obtained.

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex} \begin{bmatrix} -\sin\Delta\theta \\ \cos\Delta\theta \end{bmatrix} - (p\Delta\theta)L_d \begin{bmatrix} -i_\delta \\ i_\gamma \end{bmatrix} \quad (28)$$

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex} \begin{bmatrix} -\sin\Delta\theta \\ \cos\Delta\theta \end{bmatrix} \quad (29)$$

Noting the dm-qm axes, the equation (29) is rewritten, and then the equation (30) is obtained.

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex} \begin{bmatrix} -\sin\theta_m \\ \cos\theta_m \end{bmatrix} \quad (30)$$

Here, it is defined that the equation (31) holds. In addition, it is considered that $i_d = i_{qm} \cdot \sin\theta_m$. Then, the equation (32) holds.

$$L_{q1} i_{qm} = \sin\theta_m \{\Phi_a + (L_d - L_q)i_d\} \quad (31)$$

$$L_{q1} i_{qm} = \sin\theta_m \{\Phi_a + (L_d - L_q)i_d\} = \sin\theta_m \{\Phi_a + (L_d - L_q)i_{qm} \sin\theta_m\} \quad (32)$$

When the equation (32) is used for modifying the equation (30), the equation (33) is obtained. Here, $E_m$ is expressed in the equation (34). $L_{q1}$ is a virtual inductance depending on $\theta_m$. $L_{q1}$ is determined for convenience so as to regard $E_{ex} \cdot \sin\theta_m$ on the second term on the right-hand side of the equation (30) as a voltage drop by the virtual inductance. Note that $L_{q1}$ has a negative value.

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (33)$$

$$E_m = (\omega((L_d - L_q)i_d + \Phi_a) - (L_d - L_q)(pi_q))\cos\theta_m \quad (34)$$
$$= E_{ex}\cos\theta_m$$

Here, it is approximated that the equation $L_m = L_q + L_{q1}$ holds (Since $\theta_m$ depends on $i_q$ and $i_{qm}$, $L_{q1}$ depends on $i_q$ and $i_{qm}$. In addition, $L_q$ also depends on $i_q$ and $i_{qm}$ because of an influence of a magnetic saturation. The dependence of $L_{q1}$ on $i_q$ and the dependence of $L_q$ on $i_q$ are unified to $L_m$, so as to consider the influence of $i_q$ and $i_{qm}$ when the estimation is performed). Then, the equation (33) is modified to the following equation (35). Note that this $L_m$ corresponds to the operation parameter L in the first embodiment as being described later.

$$\begin{bmatrix} v_{dm} \\ v_{qm} \end{bmatrix} = \begin{bmatrix} R_a + pL_d & -\omega L_m \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (35)$$

In addition, the equation (35) is modified so that the following equation (36) is obtained. Here, $E_{exm}$ is expressed in the following equation (37).

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m \end{bmatrix} + \omega(L_q - L_m) \begin{bmatrix} 0 & 0 \\ 1 & 0 \end{bmatrix} \begin{bmatrix} i_{dm} \\ i_{qm} \end{bmatrix} \quad (36)$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m + \omega(L_q - L_m)i_{dm} \end{bmatrix}$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_{exm} \end{bmatrix}$$

$$E_{exm} = (\omega((L_d - L_q)i_d + \Phi_a) - (L_d - L_q)(pi_q))\cos\theta_m + \omega(L_q - L_m)i_{dm} \quad (37)$$
$$= E_m + \omega(L_q - L_m)i_{dm}$$

If there is an axial error $\Delta\theta_m$ between the γ-δ axes and the dm-qm axes, the equation (36) is modified as the following equation (38). More specifically, similarly to the modification of the equation (26) into the equation (28), the equation (36) on the dm-qm axes is converted into the equation on the γ-δ axes by the coordinate conversion, so that the equation (38) is obtained.

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + E_{exm} \begin{bmatrix} -\sin\Delta\theta_m \\ \cos\Delta\theta_m \end{bmatrix} - (p\Delta\theta_m)L_q \begin{bmatrix} -i_\delta \\ i_\gamma \end{bmatrix} \quad (38)$$

In addition, when the approximation of "$p\Delta\theta_m \approx 0$, $i_{dm} \approx 0$" and "$(L_d - L_q)(pi_q) \approx 0$" hold, $E_{exm}$ expressed in the equation (37) is approximated as the following equation (39).

$$E_{exm} = (\omega((L_d - L_q)i_d + \Phi_a) - (L_d - L_q)(pi_q))\cos\theta_m + \omega(L_q - L_m)i_{dm} \quad (39)$$
$$\approx (\omega((L_d - L_q)i_\delta \sin\theta_m + \Phi_a) - (L_d - L_q)(pi_q))\cos\theta_m + \omega(L_q - L_m)i_{dm}$$
$$\approx \omega((L_d - L_q)i_\delta \sin\theta_m + \Phi_a)\cos\theta_m$$

In addition, when "$L_m = L_q + L_{q1}$" is substituted into the above equation (32) so that the obtained equation is solved for $\theta_m$. Further, it is supposed that $i_\delta \approx i_{qm}$, and then the following equation (40) is obtained. As expressed in the equation (40), $\theta_m$ is a function of $i_\delta$, so $E_{exm}$ is also a function of $i_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \quad (40)$$

The relationship among $E_{ex}$, $E_m$ and $E_{exm}$ will be described additionally with reference to FIG. 12. $E_{ex}$, $E_m$ and $E_{exm}$ are considered as voltage vectors in the rotating coordinate system. In this case, $E_{ex}$ can be called an extension induction voltage vector (an extended electromotive force vector). The extension induction voltage vector $E_{ex}$ is an induction voltage vector on the q-axis. For consideration, the extension induction voltage vector $E_{ex}$ is decomposed into an induction voltage vector on the qm-axis and an induction voltage vector on the dm-axis. As understood from the above equation (34), the induction voltage vector on the qm-axis obtained by this decomposition is $E_m$. In addition, an induction voltage vector ($E_{ex}\cdot\sin\theta_m$) on the dm-axis represented by the reference numeral 80 in FIG. 12 obtained by this decomposition is the voltage drop vector by the virtual inductance $L_{q1}$.

As understood from a comparison between the equations (34) and (37), $E_{exm}$ is what is obtained by adding $\omega(L_q - L_m)i_{dm}$ to $E_m$. Therefore, in the rotating coordinate system, $E_{exm}$ is an induction voltage vector on the qm-axis similarly to $E_m$. When the maximum torque control is performed, $E_{exm}$ matches $E_m$ substantially because $i_{dm} \approx 0$ as described above.

Next, magnetic fluxes corresponding to $E_{ex}$, $E_m$ and $E_{exm}$ will be described additionally with reference to FIG. 12. $E_{ex}$ is an induction voltage generated by $\Phi_{ex}$ that is a flux linkage of the motor 1 and a rotation of the motor 1 (see above equation (20)). On the contrary, $\Phi_{ex}$ can be calculated when $E_{ex}$ is divided by $\omega$ (however, the transient term (the second term on the right-hand side) of $E_{ex}$ of the equation (27) is ignored).

Supposing that $\Phi_{ex}$ is a flux linkage vector in the rotating coordinate system, the flux linkage vector $\Phi_{ex}$ is a flux linkage vector on the d-axis. For consideration, the flux linkage vector $\Phi_{ex}$ is decomposed into a flux linkage vector on the qm-axis and a flux linkage vector on the dm-axis. When the flux linkage vector on the dm-axis obtained by this decomposition is defined as $\Phi_m$, $\Phi_m = E_m/\omega$. In addition, a flux linkage vector ($\Phi_{ex}\cdot\sin\theta_m$) on the qm-axis represented by the reference numeral 81 in FIG. 12 obtained by this decomposition is the magnetic flux vector by the virtual inductance $L_{q1}$.

Under the condition of "$\Phi_{exm} = E_{exm}/\omega$", $\Phi_{exm}$ is what is obtained by adding $(L_q - L_m)i_{dm}$ to $\Phi_m$. Therefore, in the rotating coordinate system, $\Phi_{exm}$ is a flux linkage vector on the dm-axis similarly to $\Phi_m$. When the maximum torque control is performed, $\Phi_{exm}$ matches $\Phi_m$ substantially since $i_{dm} \approx 0$ as described above.

Figure 14:
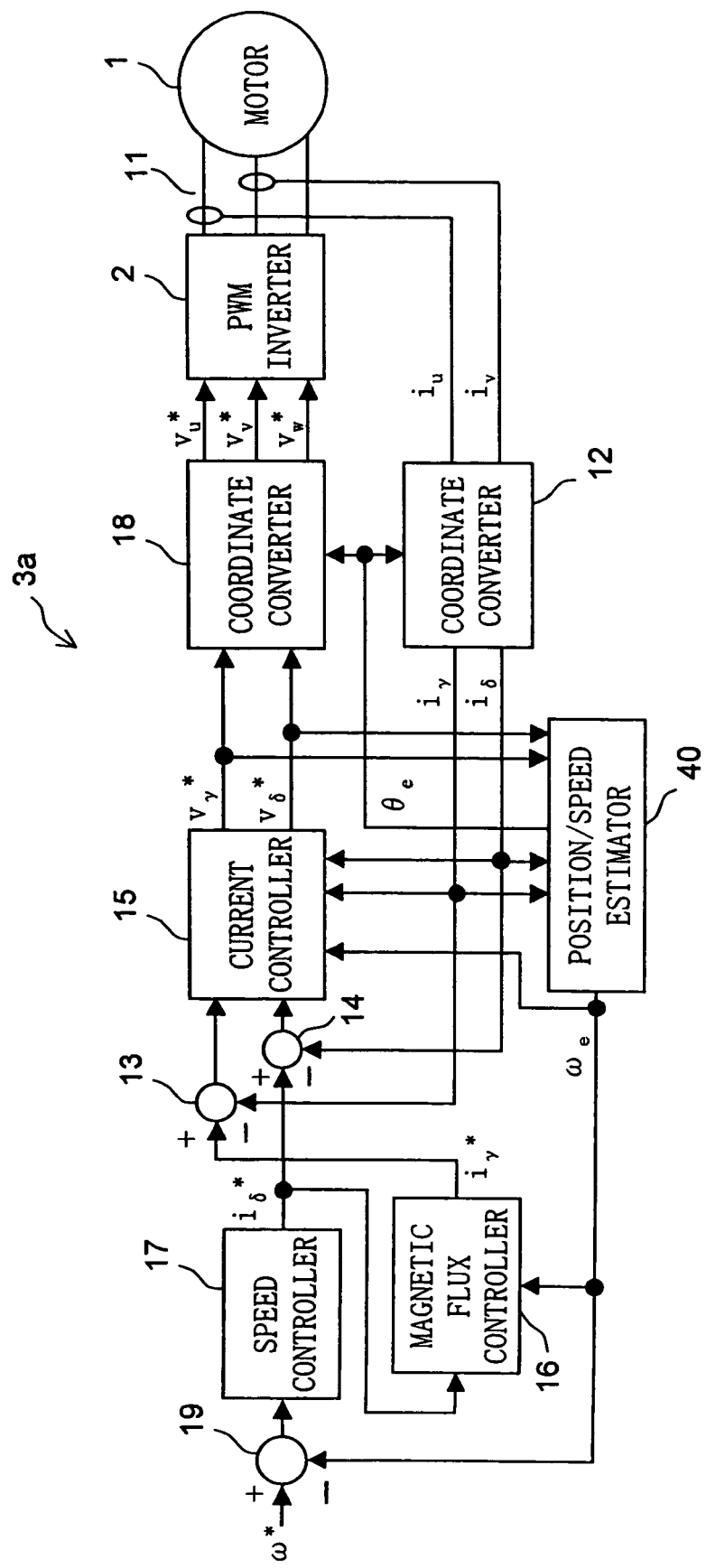
FIG. 14 is a block diagram showing a structure of the motor drive system shown in FIG. 10.

Next, an example of a specific motor drive system utilizing the above equations will be explained. FIG. 14 is a block diagram of the motor drive system showing an inside structure of the motor control device 3a shown in FIG. 10. The motor control device 3a includes a current detector 11, a coordinate converter 12, a subtracter 13, a subtracter 14, a current controller 15, a magnetic flux controller 16, a speed controller 17, a coordinate converter 18, a subtracter 19 and a position/speed estimator 40 (hereinafter referred to as an "estimator 40" simply). More specifically, the motor control device 3a shown in FIG. 14 has a structure in which the estimator 20 in the motor control device 3 shown in FIG. 3 is replaced with the estimator 40. Each portion constituting the motor control device 3a can use every value generated in the motor control device 3a freely, if necessary.

The current detector 11 detects the U-phase current $i_u$ and the V-phase current $i_v$ that are fixed axis components of the motor current $I_a$. The coordinate converter 12 receives detection results of the U-phase current $i_u$ and the V-phase current $i_v$ from the current detector 11 and converts them into the $\gamma$-axis current $i_\gamma$ and the $\delta$-axis current $i_\delta$ by using the estimated rotor position $\theta_e$ given by the estimator 40. This conversion process uses the above equation (3) similarly to the first embodiment.

The estimator 40 estimates the estimated rotor position $\theta_e$ and the estimated motor speed $\omega_e$ and outputs them. A method for specific estimation performed by the estimator 40 will be described later.

The subtracter 19 subtracts the estimated motor speed $\omega_e$ given by the estimator 40 from the specified motor speed value $\omega^*$, and the subtraction result (a speed error) is outputted. The speed controller 17 generates a specified $\delta$-axis current value $i_\delta^*$ based on the subtraction result $(\omega^* - \omega_e)$ from the subtracter 19. The magnetic flux controller 16 outputs a specified $\gamma$-axis current value $i_\gamma^*$. This specified $\gamma$-axis current value $i_\gamma^*$ is set in the same manner as in the first embodiment described above. For example, $i_\gamma^*$ is set to a predetermined value of zero or close to zero.

The subtracter 13 subtracts the $\gamma$-axis current $i_\gamma$ outputted by the coordinate converter 12 from the specified $\gamma$-axis current value $i_\gamma^*$ outputted by the magnetic flux controller 16 so as to calculate a current error $(i_\gamma^* - i_\gamma)$. The subtracter 14 subtracts the $\delta$-axis current $i_\delta$ outputted by the coordinate converter 12 from the specified $\delta$-axis current value $i_\delta^*$ outputted by the speed controller 17 so as to calculate a current error $(i_\delta^* - i_\delta)$.

The current controller 15 receives current errors calculated by the subtracters 13 and 14, the $\gamma$-axis current $i_\gamma$ and the $\delta$-axis current $i_\delta$ from the coordinate converter 12 and the estimated motor speed $\omega_e$ from the estimator 40. Then, the current controller 15 outputs the specified $\gamma$-axis voltage value $v_\gamma^*$ and the specified $\delta$-axis voltage value $v_\delta^*$ so that the $\gamma$-axis current $i_\gamma$ follows the specified $\gamma$-axis current value $i_\gamma^*$ and that the $\delta$-axis current $i_\delta$ follows the specified $\delta$-axis current value $i_\delta^*$.

The coordinate converter 18 performs inverse conversions of the specified $\gamma$-axis voltage value $v_\gamma^*$ and the specified $\delta$-axis voltage value $v_\delta^*$ based on the estimated rotor position $\theta_e$ given by the estimator 40, and it generates specified three-phase voltage values consisting of $v_u^*$, $v_v^*$ and $v_w^*$ so as to output them to the PWM inverter 2. This inverse conversion uses the above equation (4) similarly to the first embodiment. The PWM inverter 2 supplies the motor 1 with the motor current $I_a$ corresponding to the specified three-phase voltage values for driving the motor 1.

Figure 15:
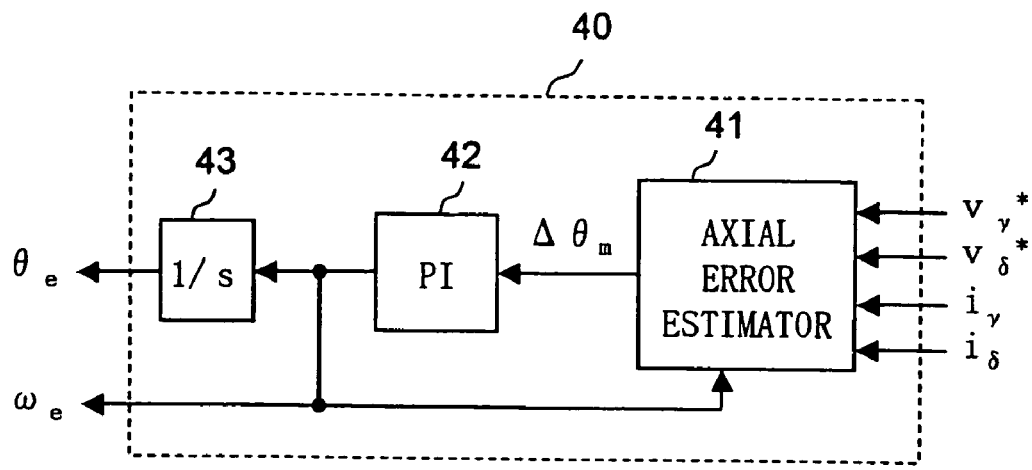
FIG. 15 is a block diagram showing an inside structure of the position/speed estimator shown in FIG. 14.

FIG. 15 shows an example of an inside structure of the estimator 40. The estimator 40 shown in FIG. 15 includes an axial error estimator 41, a proportional-plus-integral calculator 42 and an integrator 43. The proportional-plus-integral calculator 42 and the integrator 43 are respectively similar to the proportional-plus-integral calculator 31 and the integrator 32 shown in FIG. 4.

The axial error estimator 41 calculates an axial error $\Delta\theta_m$ by using a whole or a part of values of $v_\gamma{}^*$, $v_\delta{}^*$, $i_\gamma$ and $i_\delta$. The proportional-plus-integral calculator 42 performs a proportional plus integral control in cooperation with each portion constituting the motor control device 3a for realizing a PLL (Phase Locked Loop), and it calculates the estimated motor speed $\omega_e$ so that the axial error $\Delta\theta_m$ calculated by the axial error estimator 41 converges to zero. The integrator 43 integrates the estimated motor speed $\omega_e$ outputted by the proportional-plus-integral calculator 42 so as to calculate the estimated rotor position $\theta_e$. The estimated motor speed $\omega_e$ outputted by the proportional-plus-integral calculator 42 and the estimated rotor position $\theta_e$ outputted by the integrator 43 are imparted to each portion of the motor control device 3a that needs the values as output values of the estimator 40.

As a method for calculating the axial error $\Delta\theta_m$ by the axial error estimator 41, various calculation methods can be used. Hereinafter, as a method for calculating the axial error $\Delta\theta_m$ by the axial error estimator 41 (in other words, as a method for calculating $\theta_e$ by the estimator 40), a first, a second, a third, a fourth and a fifth calculation methods will be exemplified.

Note that, when the equations described in this specification are used, the axial error estimator 41 uses values of $v_\gamma{}^*$, $v_\delta{}^*$ and $\omega_e$ as values of $v_\gamma$, $v_\delta$ and $\omega$ in the equations, respectively. In addition, contents described in each calculation method (a method for determining a value of $L_m$ or the like) can be applied to every other calculation method and every other embodiment that will be described later.

[First Calculation Method]

To begin with, a first calculation method of the axial error $\Delta\theta_m$ will be described. In the first calculation method, the induction voltage $E_{ex}$ generated in the motor 1 is decomposed into an induction voltage vector on the qm-axis and an induction voltage vector on the dm-axis for consideration. Then, a induction voltage vector $E_{exm}$ that is the induction voltage vector on the qm-axis ($\approx E_m$, see FIG. 12) is used for calculating the axial error $\Delta\theta_m$, thereby a phase ($\theta_e$) of the γ-axis that is an estimated axis for the control is calculated (i.e., a rotor position is estimated).

When the γ-axis component and the δ-axis component of the induction voltage vector $E_{exm}$ are denoted by $E_{exm\gamma}$ and $E_{exm\delta}$ respectively, the equation "$\Delta\theta_m = \tan^{-1}(-E_{exm\gamma}/E_{exm\delta})$" holds as understood from FIG. 12. Then, using a result of deformation of the first and the second row of the above matrix equation (38), $\Delta\theta_m$ is expressed as the following equation (41) (here, the third term on the right-hand side of the matrix equation (38) is ignored). Note that, by supposing that $\Delta\theta_m$ is small, the approximation "$\tan^{-1}(-E_{exm\gamma}/E_{exm\delta}) \approx (-E_{exm\gamma}/E_{exm\delta})$" is finally used in the equation (41).

$$\Delta\theta_m = \tan^{-1}\frac{-E_{exm\gamma}}{E_{exm\delta}} \qquad (41)$$

$$= \tan^{-1}\frac{-(v_\gamma - (R_a + pL_d)i_\gamma + \omega L_m i_\delta)}{v_\delta - (R_a + pL_d)i_\delta - \omega L_m i_\gamma}$$

$$\approx -\frac{v_\gamma - (R_a + pL_d)i_\gamma + \omega L_m i_\delta}{v_\delta - (R_a + pL_d)i_\delta - \omega L_m i_\gamma}$$

The axial error estimator 41 can ignore differential terms $pL_d i_\gamma$ and $pL_d i_\delta$ when it calculates $\Delta\theta_m$ by using the equation (41). In addition, the following equation (42) is used for calculating a value of $L_m$ that is necessary for calculating $\Delta\theta_m$. The equation "$i_{dm} = 0$" and the following equations (43) and (44) are substituted into the above equation (32), and the obtained equation is solved for $L_{q1}$. The result is used for obtaining the equation (42).

$$L_m = L_q + L_{q1} \qquad (42)$$

$$= L_q + \frac{i_d\{\Phi_a + (L_d - L_q)i_d\}}{i_d^2 + i_q^2}$$

$$i_{qm} = \sqrt{i_d^2 + i_q^2} \qquad (43)$$

$$\sin\theta_m = \frac{i_d}{\sqrt{i_d^2 + i_q^2}} \qquad (44)$$

In addition, the equation (45) of the d-axis current $i_d$ matching the maximum torque control and the equation (43) that is a relationship equation (an approximated equation) among $i_d$, $i_q$ and $i_{qm}$ are used for deforming the above equation (42). Then, $L_m$ becomes a function of $i_{qm}$ (i.e., $i_d$ and $i_q$ are eliminated from the calculation equation of $L_m$). Therefore, the axial error estimator 41 can calculate a value of $L_m$ that is expressed in a function of $i_{qm}$ based on $i_\delta$ when the equation "$i_\delta \approx i_{qm}$" is supposed. Then, the calculated value of $L_m$ is used for calculating axial error $\Delta\theta_m$ from the equation (41).

$$i_d = \frac{\Phi_a}{2(L_q - L_d)} - \sqrt{\frac{\Phi_a^2}{4(L_q - L_d)^2} + i_q^2} \qquad (45)$$

It is possible to assume that $i_\delta \approx i_{qm}$ so that a value of $L_m$ is obtained by utilizing an approximate expression in which $L_m$ is expressed as a function of $i_\delta$. Alternatively, it is possible to prepare values of $L_m$ corresponding to $i_\delta$ as table data in advance, so that a value of $L_m$ is obtained by referring to the table data.

Figure 16:
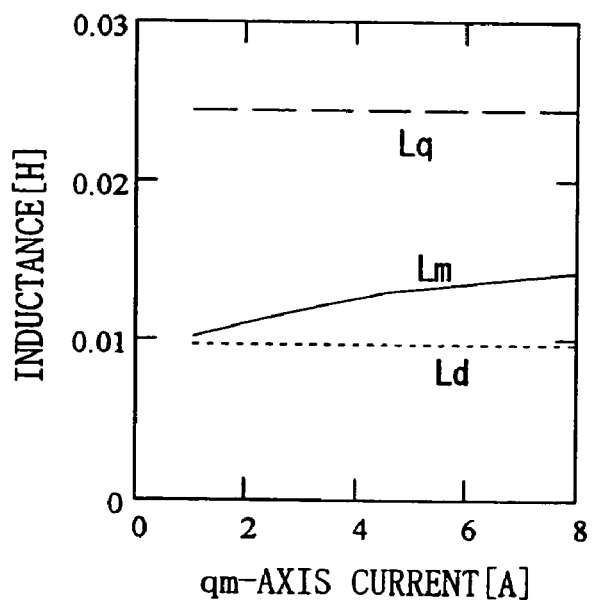
FIG. 16 is a graph showing a dependence of each inductance on the qm-axis current in the second embodiment of the present invention.

FIG. 16 shows a graph indicating dependence of $L_d$, $L_q$ and $L_m$ on $i_{qm}$ under an example of certain values (supposing $i_\gamma{}^* \approx 0$). As shown in FIG. 16, a value of $L_m$ depends on $i_{qm}$ in such a way that it increases as $i_{qm}$ increases. $L_m$ that is defined in this embodiment corresponds to the operation parameter L in the first embodiment. It is understood that a value of $L_m$ matching the maximum torque control exists on the fairly $L_d$ side from $L_q$ similarly to L (see FIGS. 5 and 7 and others).

A value of $L_m$ is determined so as to satisfy the following inequality (46) or (47) accordingly, in the same manner as in the first embodiment. Thus, the motor control device 3a in this embodiment can realize a control similar to the maximum torque control by generating a deviation purposely between the d-axis and the γ-axis similarly to the first embodiment and by setting $i_\gamma{}^* \approx 0$.

$$L_d \leq L_m < L_q \tag{46}$$

$$L_d \leq L_m < (L_d + L_q)/2 \tag{47}$$

Figure 17:
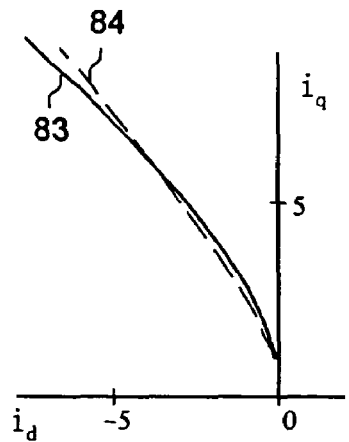
FIG. 17 is a graph showing a comparison between an ideal maximum torque control and the control by the motor drive system shown in FIG. 10.

In addition, $L_m$ may have a fixed value. More specifically, it is possible to adopt a fixed value regardless of a value of $i_\delta$ as a value of $L_m$. A relationship between the d-axis current $i_d$ and the q-axis current $i_q$ when $L_m$ is a predetermined fixed value is shown by the solid line 83 in FIG. 17. A broken line 84 is a curve showing the relationship between the d-axis current $i_d$ and the q-axis current $i_q$ when the maximum torque control is performed in an ideal manner. The solid line 83 and the broken line 84 shows curves that are very similar to each other as understood from FIG. 17.

[Second Calculation Method]

Next, a second calculation method of the axial error $\Delta\theta_m$ will be described. In the second calculation method too, similarly to the above first calculation method, the induction voltage vector $E_{exm}$ is used for calculating the axial error $\Delta\theta_m$, thereby a phase ($\theta_e$) of the γ-axis that is an estimated axis for the control is calculated (i.e., a rotor position is estimated). However, in the second calculation method, the δ-axis component $E_{exm\delta}$ of the induction voltage vector $E_{exm}$ is not used. More specifically, the following equation (48) is used for calculating the axial error $\Delta\theta_m$. Note that, by supposing that $\Delta\theta_m$ is small, the approximation "$\sin^{-1}(-E_{exm\gamma}/E_{exm}) \approx (-E_{exm\gamma}/E_{exm})$" is finally used in the equation (48).

$$\Delta\theta_m = \sin^{-1}\left(\frac{-E_{exm\gamma}}{E_{exm}}\right) \tag{48}$$
$$= \sin^{-1}\frac{-(v_\gamma - (R_a + pL_d)i_\gamma + \omega L_m i_\delta)}{E_{exm}}$$
$$\approx \frac{v_\gamma - (R_a + pL_d)i_\gamma + \omega L_m i_\delta}{E_{exm}}$$

The axial error estimator 41 can ignore the differential term $pL_d i_\gamma$ when calculating the $\Delta\theta_m$, by using the equation (48). In addition, a value of $L_m$ is determined by the method similar to the method in the first calculation method.

The above equation (39) is used for calculating $E_{exm}$ in the equation (48). As an approximate expression for calculating $E_{exm}$, the following equation (49), (50) or (51) can be used, for example. The equation (49) is an approximate expression of the equation (37) using an approximation "$p\Delta\theta_m \approx 0$, $i_{dm} \approx 0$, and $(L_d - L_q)(pi_q) \approx 0$", and the equation (50) is an approximate expression of the equation (49) further using an approximation "$\cos\theta_m \approx 1$", and the equation (51) is an approximate expression of the equation (50) further using an approximation "$(L_d - L_q)i_\delta \sin\theta_m << \Phi_a$". Note that $\omega_e$ is used as a value of $\omega$ when the equation (49), (50) or (51) is used.

$$E_{exm} \approx \omega((L_d - L_q)i_\delta \sin\theta_m + \Phi_a)\cos\theta_m \tag{49}$$

$$E_{exm} \approx \omega((L_d - L_q)i_\delta \sin\theta_m + \Phi_a) \tag{50}$$

$$E_{exm} \approx \omega\Phi_a \tag{51}$$

In order to calculate $\theta_m$ included in the equation (49) or the like, the above equation (40) is used. As understood from the equation (40), $\theta_m$ is a function of $i_\delta$, and $E_{exm}$ is also a function of $i_\delta$. Since the calculation of $E_{exm}$ is complicated, it is desirable to use an approximate expression for the calculation. In addition, it is also preferable to prepare values of $E_{exm}$ corresponding to $i_\delta$ as table data in advance so that a value of $E_{exm}$ can be obtained by referring to the table data.

[Third Calculation Method]

Next, a third calculation method of the axial error $\Delta\theta_m$ will be described. In the third calculation method, a flux linkage $\Phi_{ex}$ that has linkage with the armature winding of the motor 1 is decomposed into a flux linkage vector on the qm-axis and a flux linkage vector on the dm-axis for consideration. Then, a flux linkage vector $\Phi_{exm}$ ($\approx \Phi_m$, see FIG. 12) that is the flux linkage vector on the dm-axis is used for calculating the axial error $\Delta\theta_m$, thereby a phase ($\theta_e$) of the γ-axis that is an estimated axis for the control is calculated (i.e., a rotor position is estimated).

When the γ-axis component and the δ-axis component of the flux linkage vector $\Phi_{exm}$ are denoted by $\Phi_{exm\gamma}$ and $\Phi_{exm\delta}$ respectively, the equation "$\Delta\theta_m = \tan^{-1}(-\Phi_{exm\delta}/\Phi_{exm\gamma})$" holds as understood from FIG. 12. Since $\Phi_{exm}$ is obtained by dividing $E_{exm}$ by $\omega$, $\Delta\theta_m$ can be expressed as the following equation (52). Note that, by supposing that $\Delta\theta_m$ is small, the approximation "$\tan^{-1}(-\Phi_{exm\delta}/\Phi_{exm\gamma}) \approx (-\Phi_{exm\delta}/\Phi_{exm\gamma})$" is finally used in the equation (52).

$$\Delta\theta_m = \tan^{-1}\frac{-\Phi_{exm\delta}}{\Phi_{exm\gamma}} \tag{52}$$
$$= \tan^{-1}\frac{-\left(\frac{v_\gamma - (R_a + pL_d)i_\gamma}{\omega} + L_m i_\delta\right)}{\frac{v_\delta - (R_a + pL_d)i_\delta}{\omega} - L_m i_\gamma}$$
$$\approx -\frac{\frac{v_\gamma - (R_a + pL_d)i_\gamma}{\omega} + L_m i_\delta}{\frac{v_\delta - (R_a + pL_d)i_\delta}{\omega} - L_m i_\gamma}$$

The axial error estimator 41 can ignore differential terms $pL_d i_\gamma$ and $pL_d i_\delta$ when it calculates $\Delta\theta_m$ by using the equation (52). In addition, a value of $L_m$ is determined by the method similar to the method in the first calculation method.

[Fourth Calculation Method]

Next, a fourth calculation method of the axial error $\Delta\theta_m$ will be described. In the fourth calculation method too, similarly to the third calculation method, the flux linkage vector $\Phi_{exm}$ is used for calculating the axial error $\Delta\theta_m$, thereby a phase ($\theta_e$) of the γ-axis that is an estimated axis for the control is calculated (i.e., a rotor position is estimated). In the fourth calculation method, however, the γ-axis component $\Phi_{exm\gamma}$ of the flux linkage vector $\Phi_{exm}$ is not used. More specifically, the following equation (53) is used for calculating the axial error $\Delta\theta_m$. Note that, by supposing that $\Delta\theta_m$ is small, the approximation "$\sin^{-1}(-\Phi_{exm\delta}/\Phi_{exm}) \approx (-\Phi_{exm\delta}/\Phi_{exm})$" is finally used in the equation (53).

$$\Delta\theta_m = \sin^{-1}\left(\frac{-\Phi_{exm\delta}}{\Phi_{exm}}\right) \tag{53}$$
$$= \sin^{-1}\frac{-\left(\frac{v_\gamma - (R_a + pL_d)i_\gamma}{\omega} + L_m i_\delta\right)}{\Phi_{exm}}$$
$$\approx \frac{-\left(\frac{v_\gamma - (R_a + pL_d)i_\gamma}{\omega} + L_m i_\delta\right)}{\Phi_{exm}}$$

The axial error estimator 41 can ignore the differential term $pL_d i_\gamma$ when it calculates $\Delta\theta_m$ by using the equation (53). In addition, a value of $L_m$ is determined by the method similar to the method in the first calculation method.

In order to calculate $\Phi_{exm}$ in the equation (53), an equation obtained by dividing both sides of the above equation (39) by $\omega$ is used. As an approximate expression for calculating $\Phi_{exm}$, the following equation (54), (55) or (56) can be used, for example. The following equation (54), (55) and (56) are obtained by dividing both sides of the equation (49), (50) and

(51) by ω, respectively. Note that $\omega_e$ is used as a value of 0) when the equation (54), (55) or (56) is used.

$$\Phi_{exm} \approx ((L_d - L_q) i_\delta \sin \theta_m + \Phi_a) \cos \theta_m \quad (54)$$

$$\Phi_{exm} \approx ((L_d - L_q) i_\delta \sin \theta_m + \Phi_a) \quad (55)$$

$$\Phi_{exm} \approx \Phi_a \quad (56)$$

In order to calculate $\theta_m$ included in the equation (54) and others, the above equation (40) is used. As understood from the equation (40), $\theta_m$ is a function of $i_\delta$, so $\Phi_{exm}$ is also a function of $i_\delta$. Since the calculation of $\Phi_{exm}$ is complicated, it is desirable to use an appropriate approximate expression for the calculation. In addition, it is also preferable to prepare values of $\Phi_{exm}$ corresponding to $i_\delta$ as table data in advance so that a value of $\Phi_{exm}$ can be obtained by referring to the table data.

Figure 18:
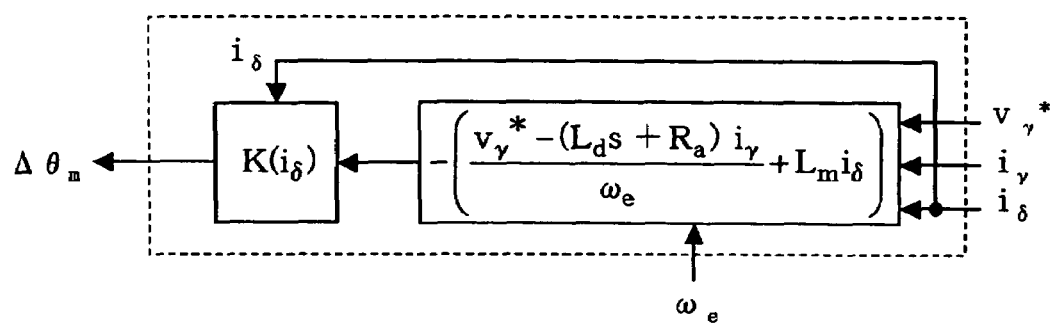
FIG. 18 is a block diagram showing an example of an inside structure of the axial error estimator shown in FIG. 15.

Setting $K(i_\delta) = 1/\Phi_{exm}$ while regarding $K(i_\delta)$ as a correction coefficient, the inside structure of the axial error estimator 41 in the fourth calculation method becomes as shown in FIG. 18. In addition, instead of using the correction coefficient $K(i_\delta)$, it is possible to change gains (constants of proportionality (proportional gains) or constants of integration (integral gains)) that are used in the proportional-plus-integral calculator 42 in accordance with a value of $i_\delta$.

[Fifth Calculation Method]

Next, a fifth calculation method of the axial error $\Delta\theta_m$ will be described. In the fifth calculation method, error current between current on the dm-qm axes (current in a motor model) and current on the γ-δ axes is used for calculating the axial error $\Delta\theta_m$, thereby a phase ($\theta_e$) of the γ-axis that is an estimated axis for the control is calculated (i.e., a rotor position is estimated).

This method will be described with reference to equations. First, the third term on the right-hand side of the above equation (38) is ignored. Then, the following equation (57) is obtained.

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + E_{exm} \begin{bmatrix} -\sin\Delta\theta_m \\ \cos\Delta\theta_m \end{bmatrix} \quad (57)$$

$$= \begin{bmatrix} R_a + pL_d & -\omega L_m \\ \omega L_m & R_a + pL_d \end{bmatrix} \begin{bmatrix} i_\gamma \\ i_\delta \end{bmatrix} + \begin{bmatrix} E_{exm\gamma} \\ E_{exm\delta} \end{bmatrix}$$

Performing discretization with a sampling period $T_s$, the equation (57) are expressed as the following equation (58).

$$\begin{bmatrix} i_\gamma(n) \\ i_\delta(n) \end{bmatrix} = \begin{bmatrix} 1 - \frac{R_a}{L_d} T_s & \omega(n-1) \frac{L_m}{L_d} T_s \\ -\omega(n-1) \frac{L_m}{L_d} T_s & 1 - \frac{R_a}{L_d} T_s \end{bmatrix} \begin{bmatrix} i_\gamma(n-1) \\ i_\delta(n-1) \end{bmatrix} + \quad (58)$$

$$\frac{T_s}{L_d} \begin{bmatrix} v_\gamma(n-1) \\ v_\delta(n-1) \end{bmatrix} - \frac{T_s}{L_d} \begin{bmatrix} E_{exm\gamma}(n-1) \\ E_{exm\delta}(n-1) \end{bmatrix}$$

On the other hand, the estimated currents $i_{M\gamma}$ and $i_{M\delta}$ obtained by calculation in the axial error estimator 41 are expressed as the following equation (59) by using the estimated induction voltages $E_{Mexm\gamma}$ and $E_{Mexm\delta}$ obtained by model calculation of $E_{exm\gamma}$ and $E_{exm\delta}$.

$$\begin{bmatrix} i_{M\gamma}(n) \\ i_{M\delta}(n) \end{bmatrix} = \begin{bmatrix} 1 - \frac{R_a}{L_d} T_s & \omega(n-1) \frac{L_m}{L_d} T_s \\ -\omega(n-1) \frac{L_m}{L_d} T_s & 1 - \frac{R_a}{L_d} T_s \end{bmatrix} \begin{bmatrix} i_\gamma(n-1) \\ i_\delta(n-1) \end{bmatrix} + \quad (59)$$

$$\frac{T_s}{L_d} \begin{bmatrix} v_\gamma(n-1) \\ v_\delta(n-1) \end{bmatrix} - \frac{T_s}{L_d} \begin{bmatrix} E_{Mexm\gamma}(n-1) \\ E_{Mexm\delta}(n-1) \end{bmatrix}$$

The axial error estimator 41 calculates estimated induction voltages $E_{Mexm\gamma}$ and $E_{Mexm\delta}$ as estimated values of $E_{exm\gamma}$ and $E_{exm\delta}$, respectively. In addition, since the estimated currents $i_{M\gamma}$ and $i_{M\delta}$ are calculated by using $L_m$ instead of $L_q$, the estimated currents $i_{M\gamma}$ and $i_{M\delta}$ can be regarded as currents obtained by estimating the dm-axis component and the qm-axis component of the motor current $I_a$, respectively.

The error current $\Delta i_\gamma$ (or $\Delta i_\delta$) that is a difference between the current $i_\gamma$ (or $i_\delta$) based on the fixed axis components ($i_u$ and $i_v$) of the motor current $I_a$ detected by the current detector 11 and the estimated current $i_{M\gamma}$ (or $i_{M\delta}$) obtained by calculation is expressed in the following equation (60) derived from the equation (58) and (59).

$$\begin{bmatrix} \Delta i_\gamma(n) \\ \Delta i_\delta(n) \end{bmatrix} = \begin{bmatrix} i_\gamma(n) \\ i_\delta(n) \end{bmatrix} - \begin{bmatrix} i_{M\gamma}(n) \\ i_{M\delta}(n) \end{bmatrix} \quad (60)$$

$$= -\frac{T_s}{L_d} \begin{bmatrix} E_{exm\gamma}(n-1) - E_{Mexm\gamma}(n-1) \\ E_{exm\delta}(n-1) - E_{Mexm\delta}(n-1) \end{bmatrix}$$

$$= -\frac{T_s}{L_d} \begin{bmatrix} \Delta E_{exm\gamma}(n-1) \\ \Delta E_{exm\delta}(n-1) \end{bmatrix}$$

Here, $\Delta E_{exm\gamma}$ is an error between an induction voltage $E_{exm\gamma}$ and an estimated induction voltage $E_{Mexm\gamma}$ that is an estimated value of the induction voltage $E_{exm\gamma}$, while $\Delta E_{exm\delta}$ is error between an induction voltage $E_{exm\delta}$ and an estimated induction voltage $E_{Mexm\delta}$ that is an estimated value of the induction voltage $E_{exm\delta}$.

As understood from the equation (60), an error of the estimated value of the induction voltage ($\Delta E_{exm\gamma}$ or the like) and the error current ($\Delta i_\gamma$ or the like) are proportional to each other. For this reason, the error of the estimated value of the induction voltage can be converged by using the error current. More specifically, it is possible to use the estimated induction voltages $E_{Mexm\gamma}$ and $E_{Mexm\delta}$ as those obtained by estimating the induction voltages $E_{exm\gamma}$ and $E_{exm\delta}$ correctly (the induction voltage can be estimated correctly).

Specifically, the estimated induction voltage of this time is calculated by using the previous estimated induction voltage and the previous estimation error. More specifically, the estimated induction voltages $E_{Mexm\gamma}$ and $E_{Mexm\delta}$ are calculated sequentially by using the following equation (61). Here, g is a feedback gain for converging the error of the estimated value of the induction voltage.

$$\begin{bmatrix} E_{Mexm\gamma}(n) \\ E_{Mexm\delta}(n) \end{bmatrix} = \begin{bmatrix} E_{Mexm\gamma}(n-1) \\ E_{Mexm\delta}(n-1) \end{bmatrix} + g \begin{bmatrix} \Delta E_{exm\gamma}(n-1) \\ \Delta E_{exm\delta}(n-1) \end{bmatrix} \quad (61)$$

$$= \begin{bmatrix} E_{Mexm\gamma}(n-1) \\ E_{Mexm\delta}(n-1) \end{bmatrix} - \frac{g \cdot L_d}{T_s} \begin{bmatrix} \Delta i_\gamma(n) \\ \Delta i_\delta(n) \end{bmatrix}$$

Then, similarly to the above first or second calculation method, the axial error estimator 41 calculates the axial error $\Delta\theta_m$ by using the following equation (62) or (63).

$$\Delta\theta_m = \tan^{-1}\frac{-E_{Mexm\gamma}(n)}{E_{Mexm\delta}(n)} \approx \frac{-E_{Mexm\gamma}(n)}{E_{Mexm\delta}(n)} \quad (62)$$

$$\Delta\theta_m = \sin^{-1}\frac{-E_{Mexm\gamma}(n)}{E_{exm}} \approx \frac{-E_{Mexm\gamma}(n)}{E_{exm}} \quad (63)$$

Note that in the equations (58) through (63), the symbol (n or n-1) in parentheses indicates a sampling timing when the discretization is performed at the sampling period $T_s$, and n denotes a natural number, which indicates a sampling timing after (n-1). Each portion constituting the motor control device 3a calculates and outputs each value sequentially every sampling period $T_s$. Specifically, for example, $i_\gamma(n)$ and $i_\delta(n)$ indicate $i_\gamma$ and $i_\delta$ at n-th sampling timing, while $i_\gamma(n-1)$ and $i_\delta(n-1)$ indicate $i_\gamma$ and $i_\delta$ at (n-1)th sampling timing. This is the same for other than $i_\gamma$ and $i_\delta$.

As described above, in this embodiment, the axial error $\Delta\theta_m$ is converged to zero so that the γ-axis follows the dm-axis. As a result, $i_\gamma$ and $i_\delta$ follows $i_{dm}$ and $i_{qm}$, respectively. In other words, the motor control device 3a performs drive and control of the motor 1 by decomposing the current flowing in the motor 1 into the qm-axis component and the dm-axis component. The effect obtained by this decomposition is as described above.

Third Embodiment

Figure 19:
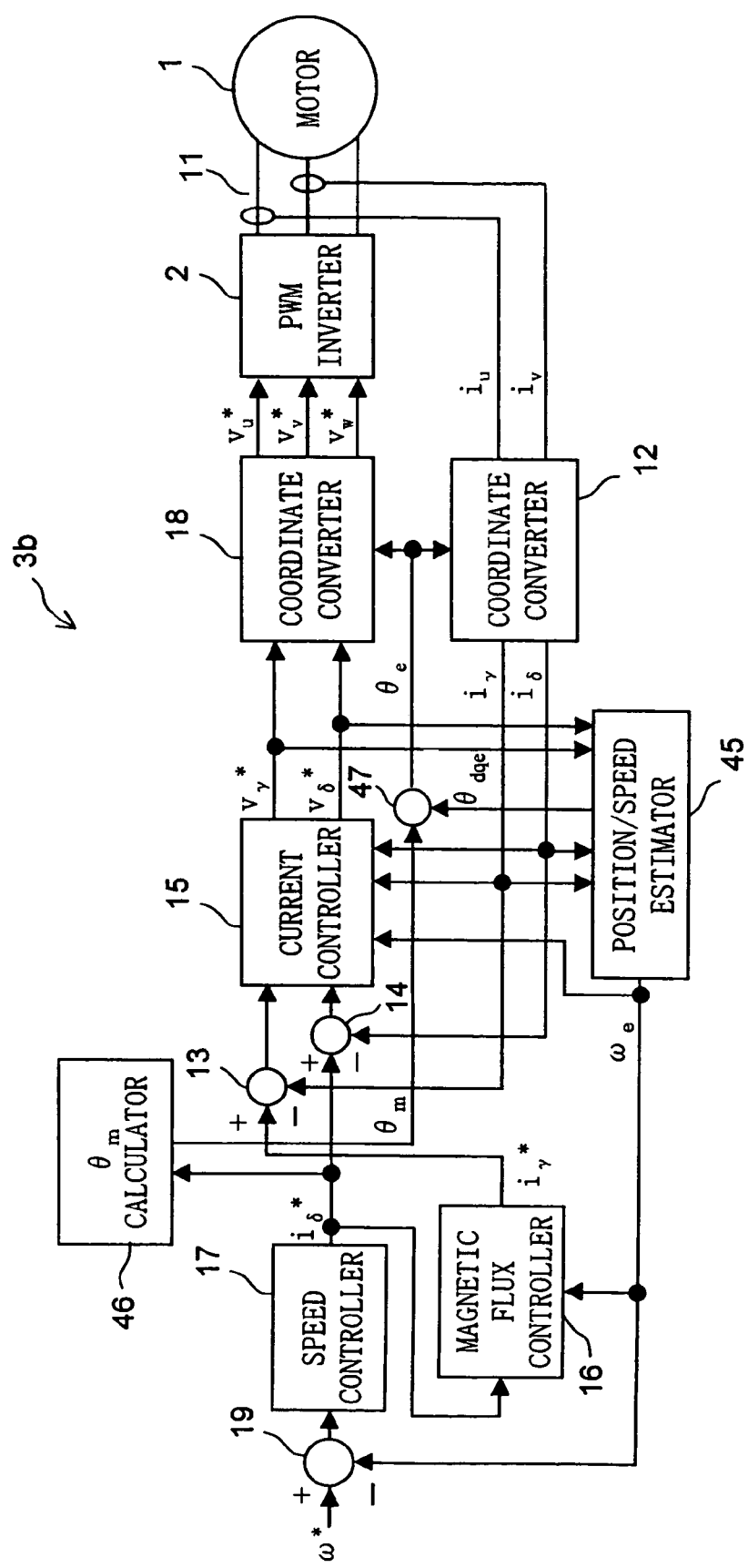
FIG. 19 is a block diagram showing a structure of a motor drive system according to a third embodiment of the present invention.

In addition, it is possible to modify the structure of the motor control device 3a shown in FIG. 14 like the motor control device 3b shown in FIG. 19. The embodiment after this modification is a third embodiment of the present invention. The motor control device 3b has a structure in which the estimator 40 of the motor control device 3a in FIG. 14 is replaced with a position/speed estimator 45 (hereinafter referred to as an estimator 45 simply), a $\theta_m$ calculator 46 and a computing unit 47. Except for this replacement, the motor control device 3b and the motor drive system in FIG. 19 are similar to the motor control device 3a and the motor drive system in FIG. 14. Description of structures and operations of the similar parts will be omitted.

The estimator 45 estimates a phase of the d-axis viewed from the U-phase by using the $i_\gamma$, $i_\delta$, $v_\gamma^*$ and $v_\delta^*$, and it outputs the estimated value as $\theta_{dqe}$. In addition, the estimator 45 calculates the estimated motor speed $\omega_e$ similarly to the estimator 40 in the second embodiment. If the estimated motor speed $\omega_e$ outputted by the estimator 45 is obtained by differentiating $\theta_{dqe}$, the obtained estimated motor speed $\omega_e$ should be actually called an estimated value of the rotation speed of the d-axis. However, in a steady state, the estimated value can be regarded to be the same as $\omega_e$ that is the rotation speed of the γ-axis.

A $\theta_m$ calculator 46 uses $i_\delta^*$ from the speed controller 17 as $i_\delta$ in the above equation (40) while it calculates $\theta_m$ by using the above equation (40). In this case, it is possible to prepare values of $\theta_m$ corresponding to $i_\delta^*$ as table data in advance, so that a value of $\theta_m$ is obtained by referring to the table data.

The computing unit 47 calculates $\theta_e$ by using $\theta_{dqe}$ outputted by the estimator 45 and $\theta_m$ outputted by the $\theta_m$ calculator 46, and the calculated $\theta_e$ is imparted to coordinate converters 12 and 18.

In this way, in the third embodiment, the portion including the estimator 45, the $\theta_m$ calculator 46 and the computing unit 47 calculates a phase ($\theta_e$) of the γ-axis that is an estimated axis for the control. The structure of the third embodiment can obtain the same action and effect as the second embodiment.

Fourth Embodiment

Although the first through the third embodiments adopt the method of estimating a rotor position by using the estimator, it is possible to detect a real rotor position. More specifically, it is possible to use a motor control device 3c shown in FIG. 20 instead of the motor control device shown in FIG. 3, 14 or 19.

Figure 20:
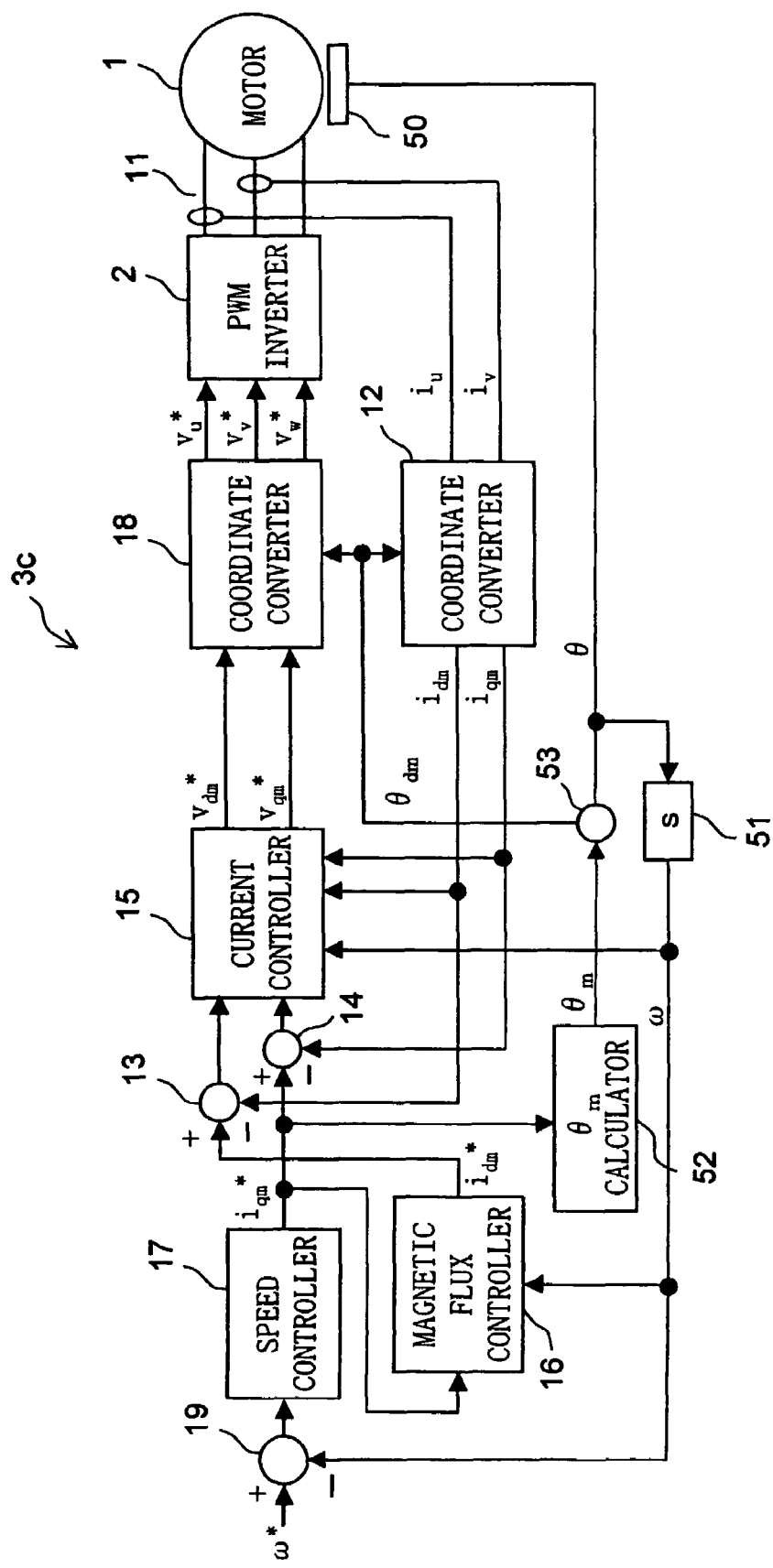
FIG. 20 is a block diagram showing a structure of a motor drive system according to a fourth embodiment of the present invention.

A motor drive system including the motor control device 3c shown in FIG. 20 will be described as a fourth embodiment of the present invention. FIG. 20 is a block diagram showing a structure of the motor drive system according to the fourth embodiment. The motor drive system includes a motor 1, an inverter 2 and a motor control device 3c.

The motor control device 3c includes a current detector 11, a coordinate converter 12, a subtracter 13, a subtracter 14, a current controller 15, a magnetic flux controller 16, a speed controller 17, a coordinate converter 18, a subtracter 19, a position detector 50, a differentiator 51, a $\theta_m$ calculator 52 and a computing unit 53. In other words, the motor control device 3c has a structure in which the estimator 40 shown in FIG. 14 is replaced with the position detector 50, the differentiator 51, the $\theta_m$ calculator 52 and the computing unit 53. Except for this replacement, the motor control device 3c and the motor drive system shown in FIG. 20 is similar to the motor control device 3a and the motor drive system shown in FIG. 14. Each portion of the motor control device 3c can use every value generated in the motor control device 3c freely, if necessary.

Each portion inside the motor control device 3c works not based on an estimated rotor position but based on a detected real rotor position, so γ and δ in the second embodiment are replaced with dm and qm in this embodiment for consideration.

The position detector 50 is made up of a rotary encoder or the like, which detects a real rotor position θ of the motor 1 and imparts the value to the differentiator 51 and the computing unit 53. The differentiator 51 differentiates the real rotor position θ so as to calculate the real motor speed ω and imparts the value to the subtracter 19, the magnetic flux controller 16 and the current controller 15.

Note that in the steady state the real motor speed ω and the rotation speed of the dm-qm axes can be considered to be the same as each other. Although an input value of the differentiator 51 is θ, it may be an output value $\theta_{dm}$ of the computing unit 53 instead of θ.

The speed controller 17 generates a specified qm-axis current value $i_{qm}^*$ to be followed by the qm-axis current $i_{qm}$ based on the subtraction result (ω*-ω) of the subtracter 19. The magnetic flux controller 16 outputs a specified dm-axis current value $i_{dm}^*$ to be followed by the dm-axis current $i_{dm}$. This specified dm-axis current value $i_{dm}^*$ is set similarly to the second embodiment. More specifically, $i_{dm}^*$ is set to be a predetermined value of zero or close to zero.

The subtracter 13 subtracts $i_{dm}$ outputted by the coordinate converter 12 from $i_{dm}^*$ outputted by the magnetic flux controller 16 so as to calculate the current error ($i_{dm}^*-i_{dm}$). The subtracter 14 subtracts $i_{qm}$ outputted by the coordinate converter 12 from $i_{qm}^*$ outputted by the speed controller 17 so as to calculate the current error ($i_{qm}^*-i_{qm}$).

The current controller 15 receives the current errors calculated by the subtracters 13 and 14, $i_{dm}$ and $i_{qm}$ from the coordinate converter 12 and the real motor speed ω from the differentiator 51. Then the current controller 15 outputs a specified dm-axis voltage value $v_{dm}^*$ to be followed by $v_{dm}$ and a specified qm-axis voltage value $v_{qm}^*$ to be followed by $v_{qm}$, so that $i_{dm}$ follows $i_{dm}^*$, and $i_{qm}$ follows $i_{qm}^*$.

The $\theta_m$ calculator 52 utilizes $i_{qm}^*$ from the speed controller 17 as $i_\delta$ in the above equation (40) and calculates $\theta_m$ by using the above equation (40). In this case, it is possible to prepare values of $\theta_m$ corresponding to $i_{qm}^*$ ($i_\delta^*$) as table data in advance, so that a value of $\theta_m$ is obtained by referring to the table data.

The computing unit 53 calculates a phase $\theta_{dm}$ of the dm-axis viewed from the U-phase by using θ detected by the position detector 50 and $\theta_m$ calculated by the $\theta_m$ calculator 52, and the calculated $\theta_{dm}$ is imparted to the coordinate converters 12 and 18.

The coordinate converter 18 converts $v_{dm}^*$ and $v_{qm}^*$ into the specified three-phase voltage values consisting of $v_u^*$, $v_v^*$ and $v_w^*$ based on the given $\theta_{dm}$, and the value obtained by the conversion is outputted to the PWM inverter 2. The PWM inverter 2 supplies the motor 1 with the motor current $I_a$ corresponding to the specified three-phase voltage values so as to drive the motor 1.

The structure of the fourth embodiment can obtain the same action and effect as the second embodiment.

Fifth Embodiment

Since the sensor-less controls described in the second and the third embodiments (FIGS. 14 and 19) are controls based on the generated induction voltage or the like, they are useful particularly when the motor 1 rotates at a high speed. However, in a low speed rotation, accuracy of the estimation is not always sufficient. In addition, it cannot be used when the rotation is stopped. As a fifth embodiment, a sensor-less control based on the dm-qm axes will be described. The control works effectively in particular at a low speed rotation or when the rotation is stopped.

Figure 24:
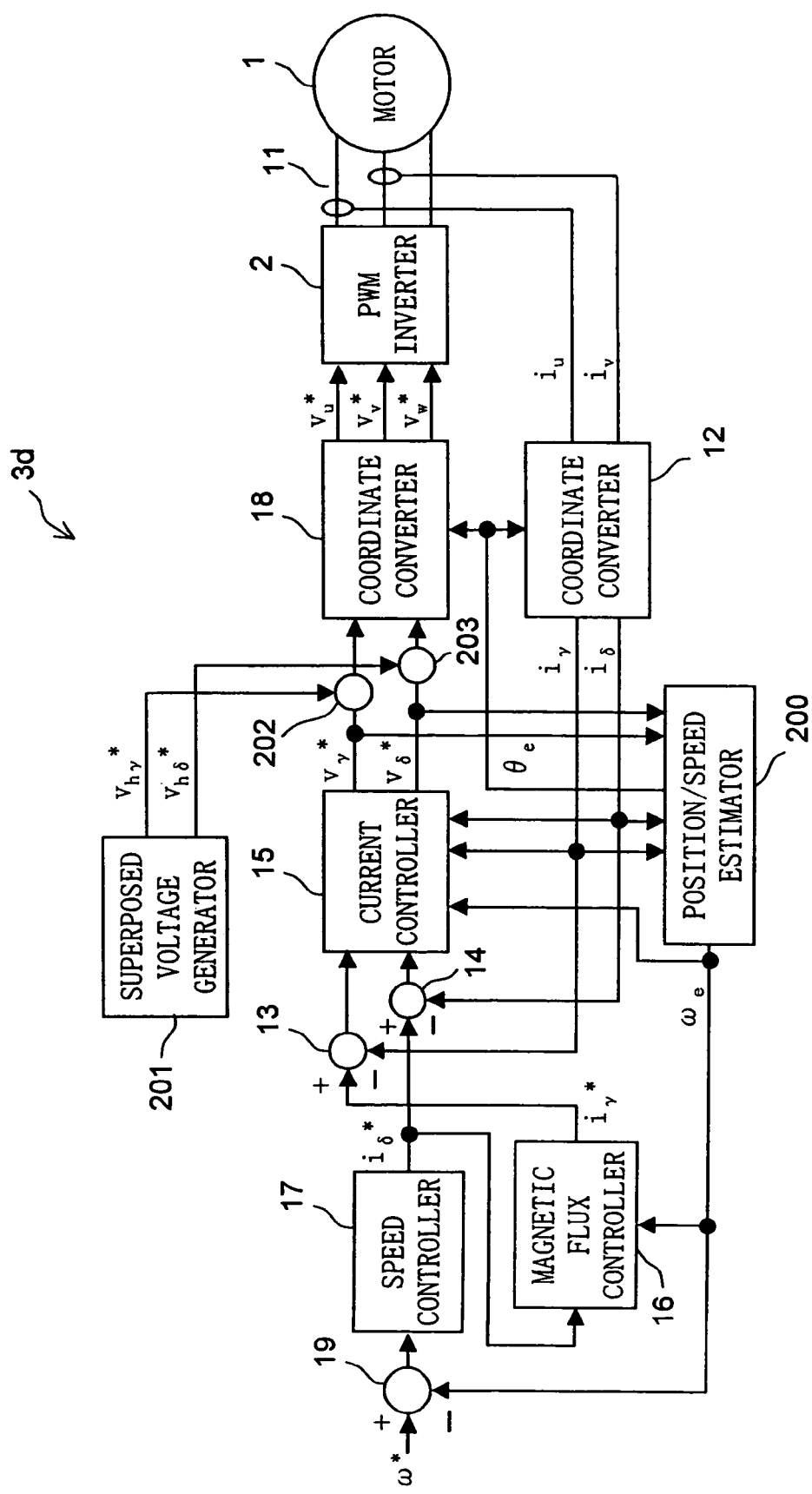
FIG. 24 is a block diagram showing a structure of a motor drive system according to a fifth and a sixth embodiments of the present invention.

FIG. 24 is a block diagram of a motor control device 3d according to the fifth embodiment. The motor control device 3d includes a current detector 11, a coordinate converter 12, a subtracter 13, a subtracter 14, a current controller 15, a magnetic flux controller 16, a speed controller 17, a coordinate converter 18, a subtracter 19, a position/speed estimator 200 (hereinafter referred to an "estimator 200" simply), a superposed voltage generator 201, an adder 202 and an adder 203. Each portion of the motor control device 3d can use every value generated in the motor control device 3d freely, if necessary.

The motor control device 3d is similar to motor control device 3a shown in FIG. 14 except that the superposed voltage generator 201 and the adders 202 and 203 are newly added and that the estimator 40 of the motor control device 3a shown in FIG. 14 is replaced with the estimator 200 in the motor control device 3d. Note that the contents described in the second embodiment are applied to this embodiment as long as there is no conflict.

The estimator 200 estimates the estimated rotor position $\theta_e$ and the estimated motor speed $\omega_e$ so as to output them. A specific estimation method performed by the estimator 200 will be described later. The coordinate converter 12 converts the U-phase current $i_u$ and the V-phase current $i_v$ detected by the current detector 11 into the γ-axis current $i_\gamma$ and the δ-axis current $i_\delta$ by using the estimated rotor position $\theta_e$ given by the estimator 200.

The subtracter 19 subtracts the estimated motor speed $\omega_e$ given by the estimator 200 from the specified motor speed value $\omega^*$, and the subtraction result (a speed error) is outputted. The speed controller 17 generates the specified δ-axis current value $i_\delta^*$ based on the subtraction result ($\omega^* - \omega_e$) of the subtracter 19. The magnetic flux controller 16 outputs the specified γ-axis current value $i_\gamma^*$. This specified γ-axis current value $i_\gamma^*$ is set similarly to the first embodiment or the like. For example, $i_\gamma^*$ is set to a predetermined value of zero or close to zero.

The subtracter 13 subtracts the γ-axis current $i_\gamma$ outputted by the coordinate converter 12 from the specified γ-axis current value $i_\gamma^*$ outputted by the magnetic flux controller 16, so as to calculate the current error ($i_\gamma^* - i_\gamma$). The subtracter 14 subtracts the δ-axis current $i_\delta$ outputted by the coordinate converter 12 from the specified δ-axis current value $i_\delta^*$ outputted by the speed controller 17, so as to calculate the current error ($i_\delta^* - i_\delta$).

The current controller 15 receives the current errors calculated by the subtracters 13 and 14, the γ-axis current $i_\gamma$ and the δ-axis current $i_\delta$ from the coordinate converter 12 and the estimated motor speed $\omega_e$ from the estimator 200. Then, the current controller 15 outputs the specified γ-axis voltage value $v_\gamma^*$ and the specified δ-axis voltage value $v_\delta^*$, so that the γ-axis current $i_\gamma$ follows the specified γ-axis current value $i_\gamma^*$, and the δ-axis current $i_\delta$ follows the specified δ-axis current value $i_\delta^*$.

The superposed voltage generator 201 generates a superposed voltage that is superposed on the specified γ-axis voltage value $v_\gamma^*$ and the specified δ-axis voltage value $v_\delta^*$. This superposed voltage consists of a γ-axis superposed voltage $v_{h\gamma}^*$ (a γ-axis component of the superposed voltage) for $v_\gamma^*$ and a δ-axis superposed voltage $v_{h\delta}^*$ (a δ-axis component of the superposed voltage) for $v_\delta^*$. Hereinafter, the γ-axis superposed voltage $v_{h\gamma}^*$ and the δ-axis superposed voltage $v_{h\delta}^*$ may be referred to as superposed voltages $v_{h\gamma}^*$ and $v_{h\delta}^*$ as a generic name.

The adder 202 adds the γ-axis superposed voltage $v_{h\gamma}^*$ to the specified γ-axis voltage value $v_\gamma^*$ outputted by the current controller 15, and the addition result ($v_\gamma^* + v_{h\gamma}^*$) is outputted to the coordinate converter 18. The adder 203 adds the δ-axis superposed voltage $v_{h\delta}^*$ to the specified δ-axis voltage value $v_\delta^*$ outputted by the current controller 15, and the addition result ($v_\delta^* + v_{h\delta}^*$) is outputted to the coordinate converter 18.

The coordinate converter 18 performs an inverse conversion of the specified γ-axis voltage value with superposed $v_{h\gamma}^*$ (i.e., $v_\gamma^* + v_{h\gamma}^*$) and the specified δ-axis voltage value with superposed $v_{h\delta}^*$ (i.e., $v_\delta^* + v_{h\delta}^*$) based on the estimated rotor position $\theta_e$ given by the estimator 200, and it generates the specified three-phase voltage values ($v_u^*$, $v_v^*$ and $v_w^*$) so as to output them to the PWM inverter 2. This inverse conversion is performed by using the equation in which $v_\gamma^*$ and $v_\delta^*$ in the above equation (4) are replaced with ($v_\gamma^* + v_{h\gamma}^*$) and ($v_\delta^* + v_{h\delta}^*$), respectively. The PWM inverter 2 supplies the motor 1 with the motor current $I_a$ corresponding to the specified three-phase voltage values so as to drive the motor 1.

In this way, a superposed voltage is added to a drive voltage for driving the motor 1 that is represented by $v_\gamma^*$ and $v_\delta^*$ (in other words, the superposed voltage is superposed on the drive voltage). According to this addition of the superposed voltage, superposed current corresponding to the superposed voltage is added to the drive current for driving the motor 1 that is represented by the specified γ-axis current value $i_\gamma^*$ and the specified δ-axis current value $i_\delta^*$.

The superposed voltage generated by the superposed voltage generator 201 is, for example, a high frequency rotation voltage. Here, the "high frequency" means that a frequency of the superposed voltage is sufficiently higher than a frequency of the drive voltage. Therefore, a frequency of the superposed current that is added in accordance with the superposed voltage is sufficiently higher than a frequency of the drive current. In addition, the "rotation voltage" means a voltage such that the voltage vector locus of the superposed voltage describes a circle on the fixed coordinate axes.

Figure 25:
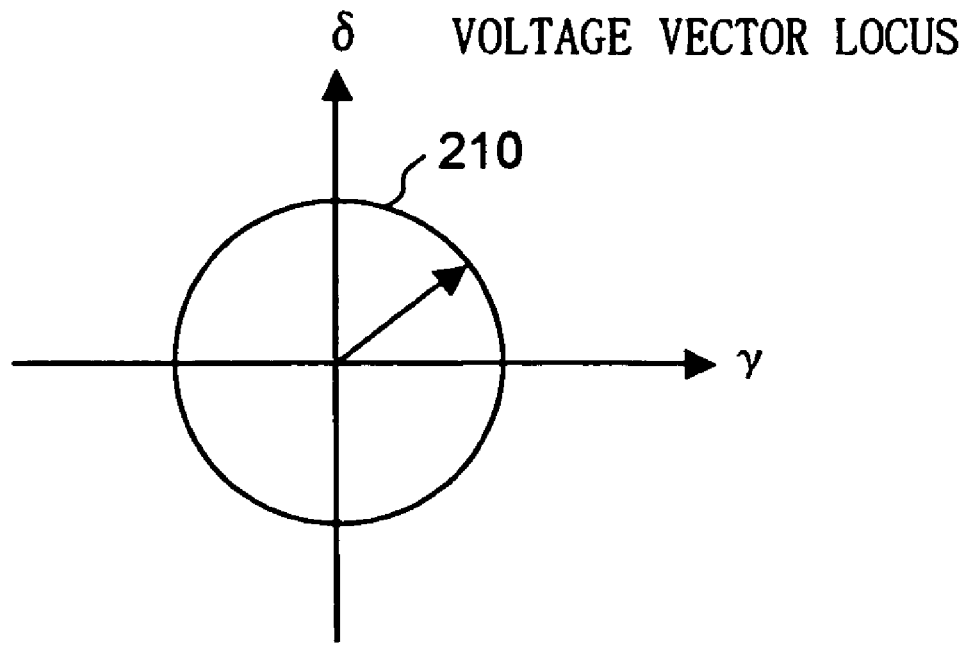
FIG. 25 is a diagram showing an example of a voltage vector locus of a superposed voltage generated by a superposed voltage generator shown in FIG. 24.

Considering on the rotating coordinate axes such as the d-q axes or the γ-δ axes too, the voltage vector locus of the superposed voltage generated by the superposed voltage generator 201 describes a circle like a voltage vector locus 210 shown in FIG. 25, for example. If the superposed voltage is three-phase balanced voltages, the voltage vector locus describes a perfect circle around the origin on the rotating coordinate axes like the voltage vector locus 210. This rotation voltage (the superposed voltage) is a high frequency voltage that is not synchronous with the motor 1, so an application of the rotation voltage does not cause rotation of the motor 1.

Figure 26:
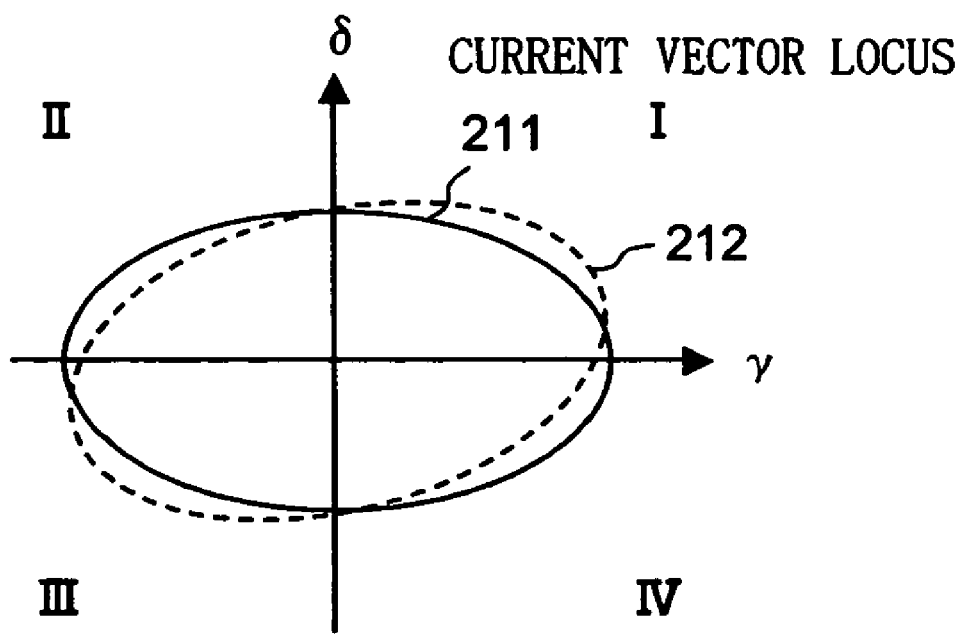
FIG. 26 is a diagram showing a current vector locus of a superposed current that flows in the motor due to the superposed voltage as shown in FIG. 25.

In addition, if the motor 1 is an interior permanent magnet synchronous motor or the like and $L_d<L_q$ holds, the current vector locus of the superposed current that flows in the motor 1 by the superposed voltage that describes the voltage vector locus 210 describes an ellipse having the major axis in the γ-axis direction and the minor axis in the δ-axis with the center on the origin of the γ-δ axes as shown by the current vector locus 211 in FIG. 26. Here, the current vector locus 211 is a current vector locus in the case where an axial error Δθ between the d-axis and the γ-axis is zero. If the axial error Δθ is not zero, the current vector locus of the superposed current becomes an ellipse as shown by the current vector locus 212, which has the major axis that does not match the γ-axis direction. More specifically, if the axial error Δθ is not zero, the current vector locus 211 is inclined with the center at the origin of the γ-δ axes so that the current vector locus 212 is described.

The γ-axis component and the δ-axis component of the superposed current are referred to as a γ-axis superposed current $i_{hγ}$ and a δ-axis superposed current $i_{hδ}$, respectively. Then, the product of them $(i_{hγ} \times i_{hδ})$ includes a direct current component depending on a gradient of the ellipse expressed in the current vector locus 212. The product $(i_{hγ} \times i_{hδ})$ has a positive value in the first and third quadrants of the current vector locus, while it has a negative value in the second and fourth quadrants thereof Therefore, although the direct current component is not included if the ellipse is not inclined (in the case of the current vector locus 211), the direct current component is included if the ellipse is inclined (in the case of the current vector locus 212). Note that I, II, III and IV shown in FIG. 26 represent the first, second, third and fourth quadrants on the γ-δ axes.

Figure 27:
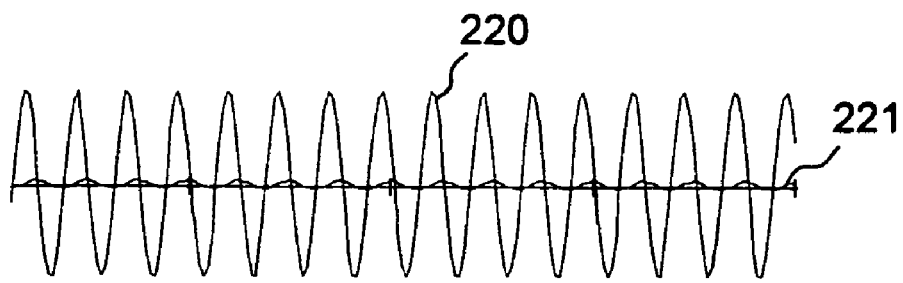
FIG. 27 is a diagram showing a product of a γ-axis component and a δ-axis component of the superposed current that flows in the motor due to the superposed voltage as shown in FIG. 25 and a direct current component of the product.
Figure 28:
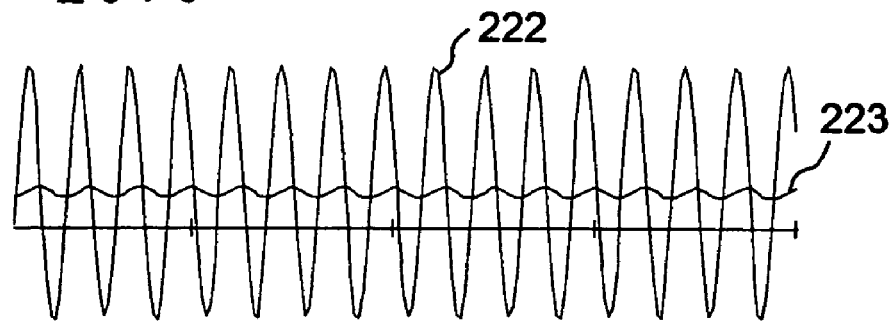
FIG. 28 is a diagram showing a product of the γ-axis component and the δ-axis component of the superposed current that flows in the motor due to the superposed voltage as shown in FIG. 25 and a direct current component of the product.

FIG. 27 shows a product $(i_{hγ} \times i_{hδ})$ in the case where the axial error Δθ is zero and the direct current component of the product by curves 220 and 221, respectively, in which the horizontal axis represents time. FIG. 28 shows a product $(i_{hγ} \times i_{hδ})$ in the case where the axial error Δθ is not zero and the direct current component of the product by curves 222 and 223, respectively, in which the horizontal axis represents time. As understood from FIGS. 27 and 28, the direct current component of the product $(i_{hγ} \times i_{hδ})$ becomes zero if Δθ=0°, while it does not become zero if Δθ≠0°. In addition, this direct current component increases as a value of the axial error Δθ increases (i.e., it is approximately proportional to the axial error Δθ). Therefore, if this direct current component is controlled to converge to zero, the axial error Δθ converges to zero.

The estimator 200 shown in FIG. 24 performs an estimation operation noting this point. However, the estimation operation is performed so that not the axial error Δθ between the d-axis and the γ-axis but the axial error $Δθ_m$ between the dm-axis and the γ-axis converges to zero for estimating the dm-qm axes.

Figure 29:
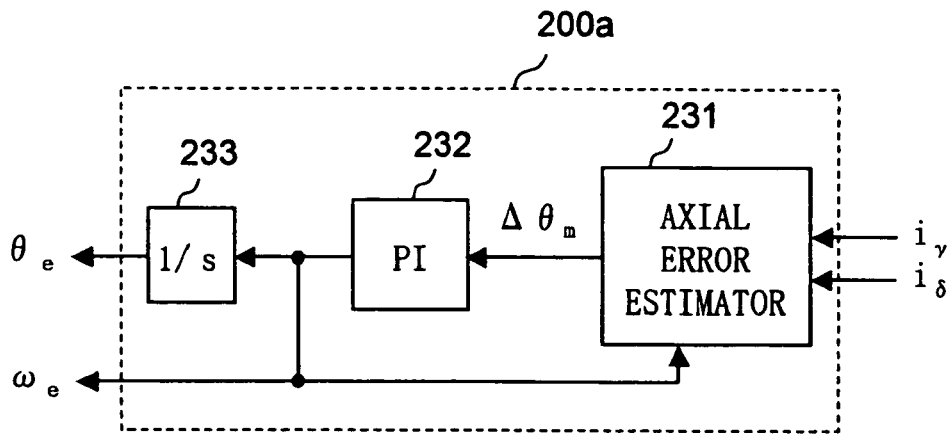
FIG. 29 is a block diagram showing an inside structure of the estimator that can be used as the position/speed estimator shown in FIG. 24.

FIG. 29 shows a block diagram of the inside structure of the estimator (the position/speed estimator) 200*a* as an example of the estimator 200. The estimator 200*a* includes an axial error estimator 231, a proportional-plus-integral calculator 232 and an integrator 233. The proportional-plus-integral calculator 232 and the integrator 233 are similar to the proportional-plus-integral calculator 31 and the integrator 32 shown in FIG. 4, respectively.

The axial error estimator 231 calculates the axial error $Δθ_m$ by using $i_γ$ and $i_δ$. The proportional-plus-integral calculator 232 performs the proportional plus integral control in cooperation with each portion of the motor control device 3*d* so as to realize a PLL (Phase Locked Loop). Then, the proportional-plus-integral calculator 232 calculates the estimated motor speed $ω_e$ so that the axial error $Δθ_m$ calculated by the axial error estimator 231 converge to zero. The integrator 233 integrates the estimated motor speed $ω_e$ outputted by the proportional-plus-integral calculator 232 so as to calculate the estimated rotor position $θ_e$. The estimated motor speed $ω_e$ outputted by the proportional-plus-integral calculator 232 and the estimated rotor position $θ_e$ outputted by the integrator 233 are both imparted to each part of the motor control device 3*d* that needs the values as output values of the estimator 200*a*. In addition, the estimated motor speed $ω_e$ is also imparted to the axial error estimator 231.

Figure 30:
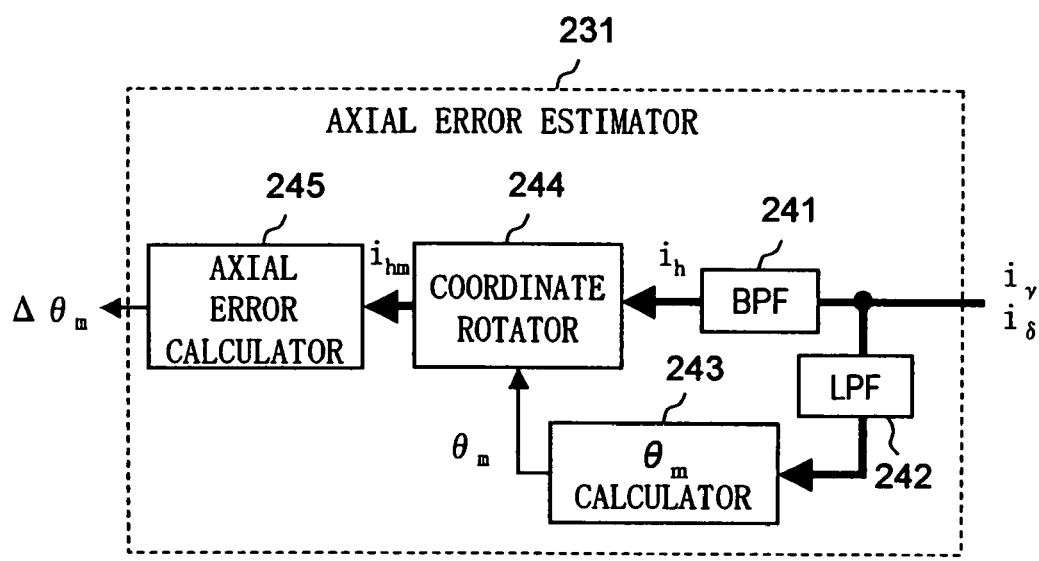
FIG. 30 is a block diagram showing an inside structure of the axial error estimator shown in FIG. 29.
Figure 31:
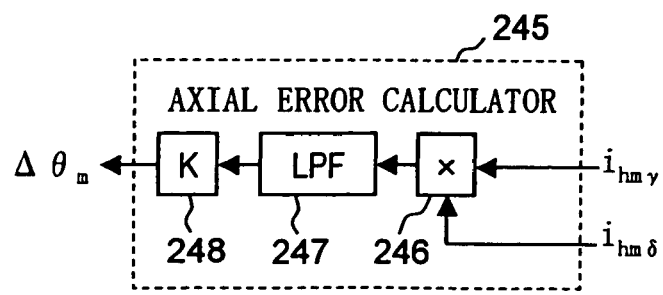
FIG. 31 is a block diagram showing an inside structure of an axial error calculator shown in FIG. 30.

An example of the inside structure of the axial error estimator 231 shown in FIG. 29 is shown in FIG. 30. As shown in FIG. 30, the axial error estimator 231 includes a BPF (band pass filter) 241, a LPF (low pass filter) 242, a $θ_m$ calculator 243, a coordinate rotator 244 and an axial error calculator 245. In addition, as shown in FIG. 31, the axial error calculator 245 includes a multiplier 246, a LPF 247 and a coefficient multiplier 248. Here, a frequency (an electrical angle speed on the γ-δ coordinate axes) of the superposed voltages $v_{hγ}^*$ and $v_{hδ}^*$ generated by the superposed voltage generator 201 is represented by $ω_h$.

The BPF 241 extracts a frequency component of $ω_h$ from the γ-axis current $i_γ$ and the δ-axis current $i_δ$ outputted by the coordinate converter 12 shown in FIG. 24, and it outputs the γ-axis superposed current $i_{hγ}$ and the δ-axis superposed current $i_{hδ}$. The BPF 241 is a band pass filter having a pass band including the frequency of $ω_h$, which receives the $i_γ$ and $i_δ$ as input signals. Typically, the center frequency of the pass band is $ω_h$. In addition, the BPF 241 removes frequency components of the drive current.

The LPF 242 removes a frequency component of $ω_h$ that is a high frequency component from the γ-axis current $i_γ$ and the δ-axis current $i_δ$ outputted by the coordinate converter 12 shown in FIG. 24, and the result is sent to the $θ_m$ calculator 243. In other words, the LPF 242 removes the component of the superposed current ($i_{hγ}$ and $i_{hδ}$) from the γ-axis current $i_γ$ and the δ-axis current $i_δ$.

The $θ_m$ calculator 243 calculates a phase $θ_m$ based on values of the γ-axis current $i_γ$ and the δ-axis current $i_δ$ from which the frequency component of $ω_h$ is removed (see FIG. 11). Specifically, a value of the δ-axis current $i_δ$ from which the frequency component of $ω_h$ is removed is used as $i_δ$ in the above equation (40), while $θ_m$ is calculated by using the above equation (40). In this case, it is possible to prepare values of $θ_m$ corresponding to $i_δ$ as table data in advance, so that a value of $θ_m$ is obtained by referring to the table data.

The coordinate rotator 244 uses the following equation (64) and performs the coordinate rotation of the current vector $i_h$ formed by the superposed current $i_{hγ}$ and $i_{hδ}$ to the extent corresponding to the phase represented by $θ_m$ for calculating the current vector $i_{hm}$. In this case, the value of $θ_m$ calculated by the $θ_m$ calculator 243 is used. The current vectors $i_h$ and $i_{hm}$ are expressed in the following equation (65a) and (65b). The current $i_{hγ}$ and $i_{hδ}$ are orthogonal two-axes components that form the current vector $i_h$, which are the γ-axis component and the δ-axis component of the current vector $i_h$. The current vectors $i_{hmγ}$ and $i_{hmδ}$ are orthogonal two-axes components that form the current vector $i_{hm}$. The current vectors $i_{hmγ\ and\ ihmδ}$ calculated by the coordinate rotator 244 are sent to the axial error calculator 245.

$$\begin{bmatrix} i_{hmγ} \\ i_{hmδ} \end{bmatrix} = \begin{bmatrix} \cosθ_m & \sinθ_m \\ -\sinθ_m & \cosθ_m \end{bmatrix} \begin{bmatrix} i_{hγ} \\ i_{hδ} \end{bmatrix} \quad (64)$$

$$i_h = \begin{bmatrix} i_{hγ} \\ i_{hδ} \end{bmatrix} \quad (65a)$$

$$i_{hm} = \begin{bmatrix} i_{hmγ} \\ i_{hmδ} \end{bmatrix} \quad (65b)$$

Figure 32:
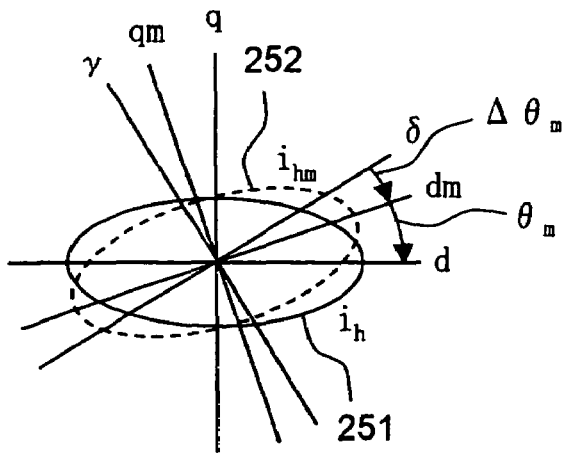
FIG. 32 is a diagram showing an example of the current vector locus before and after coordinate rotation by a coordinate rotator shown in FIG. 30 (when perfect circle rotation voltage is superposed).

With reference to FIG. 32 that shows an example of the current vector locus before and after the coordinate rotation, meaning of the coordinate rotation will be described as a supplemental explanation. It is supposed that a perfect circle rotation voltage is superposed, i.e., the case where a superposed voltage like drawing the voltage vector locus 210 shown in FIG. 25 is applied. In this case, due to the magnetic salient pole of the motor 1, the locus of the current vector $i_h$ on the rotating coordinate axes describes an ellipse that is symmetric about the d-axis (i.e., an ellipse in which the d-axis direction matches the major axis direction), similarly to the current vector locus 251. The coordinate rotator 244 multiplies the rotation matrix to the current vector $i_h$ so that this ellipse becomes symmetric about the dm-axis, so as to calculate the current vector $i_{hm}$. Thus, the locus of the current vector $i_{hm}$ becomes like the current vector locus 252.

The current vector locus 252 describes an ellipse on the rotating coordinate axes, and the major axis direction thereof matches the dm-axis direction when $Δθ_m=0°$ while it does not match the dm-axis direction when $Δθ_m≠0°$. Therefore, when the direct current component of the product $(i_{hmγ}×i_{hmδ})$ of the orthogonal two-axes components of the current vector $i_{hm}$ is expressed in $(i_{hmγ}×i_{hmδ})_{DC}$, the direct current component $(i_{hγ}×i_{hδ})_{DC}$ becomes zero when the axial error $Δθ_m$ is zero and is approximately proportional to the axial error $Δθ_m$ similarly to the relationship between the direct current component of the product $(i_{hγ}×i_{hδ})$ and the axial error $Δθ$. Therefore, when the proportional coefficient is denoted by K, the axial error $Δθ_m$ can be expressed in the following equation (66).

$$Δθ_m = K·(i_{hmγ}×i_{hmδ})_{DC} \quad (66)$$

In order to realize the calculation expressed in the equation (66), the axial error calculator 245 is structured as shown in FIG. 31. More specifically, the multiplier 246 calculates a product of $i_{hmγ}$ and $i_{hmδ}$ calculated by the coordinate rotator 244, and the LPF 247 extracts a direct current component of the product $(i_{hmγ}×i_{hmδ})$ so as to obtain $(i_{hmγ}×i_{hmδ})_{DC}$. The coefficient multiplier 248 multiplies the proportional coefficient K to the direct current component $(i_{hmγ}×i_{hmδ})_{DC}$ outputted by the LPF 247, so as to calculate the axial error $Δθ_m$ expressed in the equation (66). The axial error $Δθ_m$ outputted by the coefficient multiplier 248 is sent to the proportional-plus-integral calculator 232 as the axial error $Δθ_m$ estimated by the axial error estimator 231 shown in FIG. 29. Then, as described above, calculation of the estimated motor speed $ω_e$ and the estimated rotor position $θ_e$ is performed so that the axial error $Δθ_m$ converges to zero. In other words, the γ-δ axes follow the dm-qm axes (the dm-qm axes are estimated).

As described above, a high frequency superposed voltage is added (superposed), and a rotor position is estimated based on the superposed current component that flows responding to the superposed voltage. Thus, it is possible to estimate a rotor position appropriately in particular when the motor 1 is stopped or working at a low speed.

[Variations Concerning the Superposed Voltage]

As a most typical example, the case where the superposed voltage generated by the superposed voltage generator 201 is a perfect circle rotation voltage is described above. However, other various superposed voltages can be adopted as the superposed voltage generated by the superposed voltage generator 201. In this case, it is necessary that the voltage vector locus of the superposed voltage on the rotating coordinate axes (i.e., the d-q axes or the like) is symmetric about the d-axis. More specifically, it is necessary that the voltage vector locus of the superposed voltage on the rotating coordinate axes (i.e., the d-q axes or the like) describes a figure that encloses the origin and is symmetric about the d-axis. It is because that the current vector locus of the superposed current due to the superposed voltage should be symmetric about the d-axis as a precondition for structuring the axial error estimator 231 shown in FIG. 29, and that the precondition is satisfied by making the voltage vector locus symmetric about the d-axis.

Here, "encloses the origin" means that there is the origin of the rotating coordinate axes (i.e., the d-q axes or the like) inside the above-mentioned "figure that is symmetric". In addition, "be symmetric about d-axis" means that, of the voltage vector locus on the d-q axes, the part lying in the first and second quadrants and the part lying in the third and fourth quadrants are symmetric with each other about the d-axis.

For example, the voltage vector locus of the superposed voltage on the rotating coordinate axes (i.e., the d-q axes or the like) can be an ellipse having the minor axis or the major axis in the d-axis direction, or it can be a line segment lying on the d-axis or the q-axis (i.e., the superposed voltage can be an alternating voltage) or a rectangle with the center on the origin.

Figure 33:
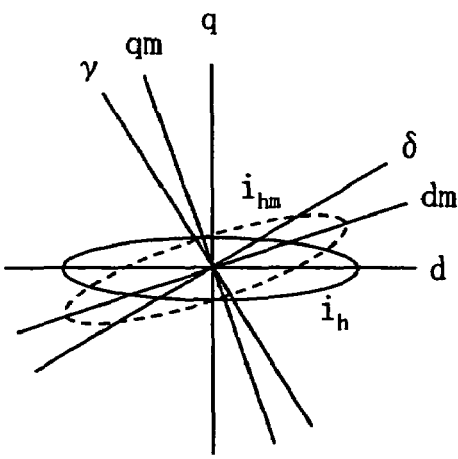
FIG. 33 is a diagram showing an example of the current vector locus before and after coordinate rotation by the coordinate rotator shown in FIG. 30 (when elliptic rotation voltage is superposed).
Figure 34:
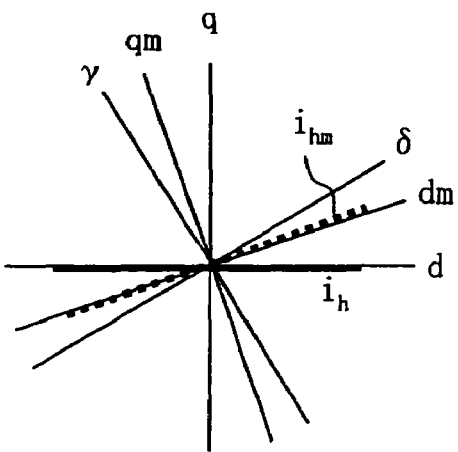
FIG. 34 is a diagram showing an example of the current vector locus before and after coordinate rotation by the coordinate rotator shown in FIG. 30 (when alternating voltage is superposed).

FIG. 33 shows a locus of the current vectors $i_h$ and $i_{hm}$ in the case where an elliptic rotation voltage is applied as the superposed voltage. FIG. 34 shows a locus of the current vectors $i_h$ and $i_{hm}$ in the case where an alternating voltage having only the d-axis component is applied as the superposed voltage.

It is necessary to give the phase $θ_m$ that is a calculation value of the $θ_m$ calculator 243 shown in FIG. 30 to the superposed voltage generator 201 shown in FIG. 24 in the case where the voltage vector locus of the applied superposed voltage is not a perfect circle. If the voltage vector locus of the superposed voltage is a perfect circle, the voltage vector locus of the superposed voltage is symmetric about the d-axis regardless of a phase of the superposed voltage. However, if it is not a perfect circle, information of the phase $θ_m$ is needed for making the voltage vector locus symmetric about the d-axis.

For example, if the superposed voltage is a perfect circle rotation voltage, the superposed voltage generator 201 generates the superposed voltage expressed in the following equation (67). If the superposed voltage is an elliptic rotation voltage or an alternating voltage, the superposed voltage generator 201 generates the superposed voltage expressed in the following equation (68). Here, $V_{hγ}$ and $V_{hδ}$ denote respectively an amplitude of the superposed voltage in the γ-axis direction and an amplitude of the superposed voltage in the δ-axis direction. Reference letter t represents time.

$$\begin{bmatrix} v_{h\gamma}^* \\ v_{h\delta}^* \end{bmatrix} = \begin{bmatrix} V_{h\gamma}\cos(\omega_h t) \\ V_{h\delta}\sin(\omega_h t) \end{bmatrix} \quad (67)$$

$$\begin{bmatrix} v_{h\gamma}^* \\ v_{h\delta}^* \end{bmatrix} = \begin{bmatrix} V_{h\gamma}\cos(\omega_h t + \theta_m) \\ V_{h\delta}\sin(\omega_h t + \theta_m) \end{bmatrix} \quad (68)$$

[Derivation of a Theoretical Formula of an Axial Error]

The method of estimating the dm-qm axes described above utilizes the fact that the axial error $\Delta\theta_m$ is proportional to the direct current component $(i_{hm\gamma} \times i_{hm\delta})_{DC}$. Here, a theoretical formula concerning the principle of this estimation will be considered. For convenience of description, the case where the estimation of the d-q axes is performed is considered. More specifically, the theoretical formula is derived for the case where the axial error $\Delta\theta$ between the d-axis and the γ-axis is calculated.

First, the equation concerning the superposed component is expressed in the following equation (69). Here, the following equations (70a), (70b), (70c), (70d) and (70e) hold. Note that p denotes the differential operator.

$$p\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \begin{bmatrix} v_{h\gamma}^* \\ v_{h\delta}^* \end{bmatrix} \quad (69)$$

$$L_\gamma = L_0 + L_1\cos 2\Delta\theta \quad (70a)$$

$$L_\delta = L_0 - L_1\cos 2\Delta\theta \quad (70b)$$

$$L_{\gamma\delta} = L_1\sin 2\Delta\theta \quad (70c)$$

$$L_0 = \frac{L_d + L_q}{2} \quad (70d)$$

$$L_1 = \frac{L_d - L_q}{2} \quad (70e)$$

If the applied superposed voltage is expressed in the above equation (67), the orthogonal two-axes components $i_{h\gamma}$ and $i_{h\delta}$ of the superposed current that flows corresponding to the application of the superposed voltage are expressed in the following equation (71). Note that s in the equation (71) is the Laplace operator, and $\theta_h = \omega_h t$.

$$\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \frac{1}{s} \begin{bmatrix} v_{h\gamma}^* \\ v_{h\delta}^* \end{bmatrix} \quad (71)$$

$$= \frac{1}{\omega_h L_d L_q} \begin{bmatrix} L_0 - L_1\cos 2\Delta\theta & -L_1\sin 2\Delta\theta \\ -L_1\sin 2\Delta\theta & L_0 + L_1\cos 2\Delta\theta \end{bmatrix}$$

$$\begin{bmatrix} V_{h\gamma}\sin\theta_h \\ -V_{h\delta}\cos\theta_h \end{bmatrix}$$

Organizing the product of the orthogonal two-axes components of the superposed current based on the above equation (71), the following equation (72) is obtained. Here, K1-K7 are coefficients that are determined when $L_d$, $L_q$, $V_{h\gamma}$ and $V_{h\delta}$ are determined.

$$i_{h\gamma} \times i_{h\delta} = K_1\sin(2\theta_h) + K_2\sin(2\Delta\theta) + K_3\sin(4\Delta\theta) + K_4\sin(2\Delta\theta + 2\theta_h) + K_5\sin(2\Delta\theta - 2\theta_h) + K_6\sin(4\Delta\theta + 2\theta_h) + K_7\sin(4\Delta\theta - 2\theta_h) \quad (72)$$

The direct current component of the product $(i_{h\gamma} \times i_{h\delta})$ of the orthogonal two-axes components of the current vector $i_h$ is expressed in $(i_{h\gamma} \times i_{h\delta})_{DC}$. The direct current component is expressed in the equation (73) since it has no term variable to $\theta_h$.

$$(i_{h\gamma} \times i_{h\delta})_{DC} = K_2\sin(2\Delta\theta) + K_3\sin(4\Delta\theta) \quad (73)$$

If $\Delta\theta \approx 0$, the approximations "$\sin(2\Delta\theta) \approx 2\Delta\theta$" and "$\sin(4\Delta\theta) \approx 4\Delta\theta$" hold. Therefore, the axial error $\Delta\theta$ can be expressed in the following equation (74). Note that K in the equation (74) is a coefficient determined by the coefficients $K_2$ and $K_3$. If the superposed voltage is a perfect circle rotation voltage, the coefficient $K_3$ becomes zero so that the sine term of quadruple $\Delta\theta$ is eliminated from the equation (73).

$$\Delta\theta = K \cdot (i_{h\gamma} \times i_{h\delta})_{DC} \quad (74)$$

Applying the deriving method of the above equation (74) to the axial error $\Delta\theta_m$, the above equation (66) can be obtained.

[Variations Concerning the Axial Error Calculator]

The above example is the case where the axial error $\Delta\theta_m$ is calculated by using both the orthogonal two-axes components (i.e., $i_{hm\gamma}$ and $i_{hm\delta}$) of the current vector $i_{hm}$ obtained by the coordinate rotation performed by the coordinate rotator 244 shown in FIG. 30. However, it is possible to use only one-axis component (i.e., $i_{hm\gamma}$ or $i_{hm\delta}$) of the orthogonal two-axes components for calculating the axial error $\Delta\theta_m$. If only one-axis component is used for calculating the axial error $\Delta\theta_m$, it is necessary that the superposed voltage generated by the superposed voltage generator 201 shown in FIG. 24 is an alternating voltage having only the d-axis component or the q-axis component.

The method of superposing an alternating voltage and calculating the axial error $\Delta\theta$ based on one-axis component (i.e., $i_{h\gamma}$ or $i_{h\delta}$) of a vector of the superposed current that flows corresponding to the superposed alternating voltage is known for a long time (for example, see the above-mentioned third patent document). Therefore, a detailed description of the method will be omitted. If the d-q axes are replaced with the dm-qm axes when the method is applied, it is possible to calculate the axial error $\Delta\theta_m$ by using only the one-axis component (i.e., $i_{hm\gamma}$ or $i_{hm\delta}$) of the current vector $i_{hm}$.

In addition, there are many methods of superposing a high frequency voltage and estimating a rotor position and a motor speed based on current flowing corresponding to the superposed high frequency voltage (for example, see the above-mentioned fourth through sixth patent documents). It is possible to use these methods to the dm-qm axes for performing the estimation process.

Sixth Embodiment

It is possible to combine the sensor-less control corresponding to the fifth embodiment that is suitable particularly for a low speed rotation (and a stopped state) and the sensor-less control corresponding to the second or the third embodiment that is suitable particularly for a high speed rotation, so that an appropriate sensor-less control can be realized over a wide speed range including the stopped state. A sixth embodiment will be described below corresponding to this combination. The contents described in the second, the third and the fifth embodiments are also applied to the sixth embodiment as long as there is no conflict.

A general structure of the motor control device according to the sixth embodiment is the same as that shown in FIG. 24, so additional illustration will be omitted. However, in the motor control device according to the sixth embodiment, an inside structure of the estimator 200 is different from that of the estimator 200a shown in FIG. 29. Therefore, the inside structure and an operation of the estimator 200 that are different from those in the fifth embodiment will be described.

As examples of the estimator 200 that can be used in this embodiment, a first, a second and a third examples of the estimator will be described below.

[First Example of the Estimator]

Figure 35:
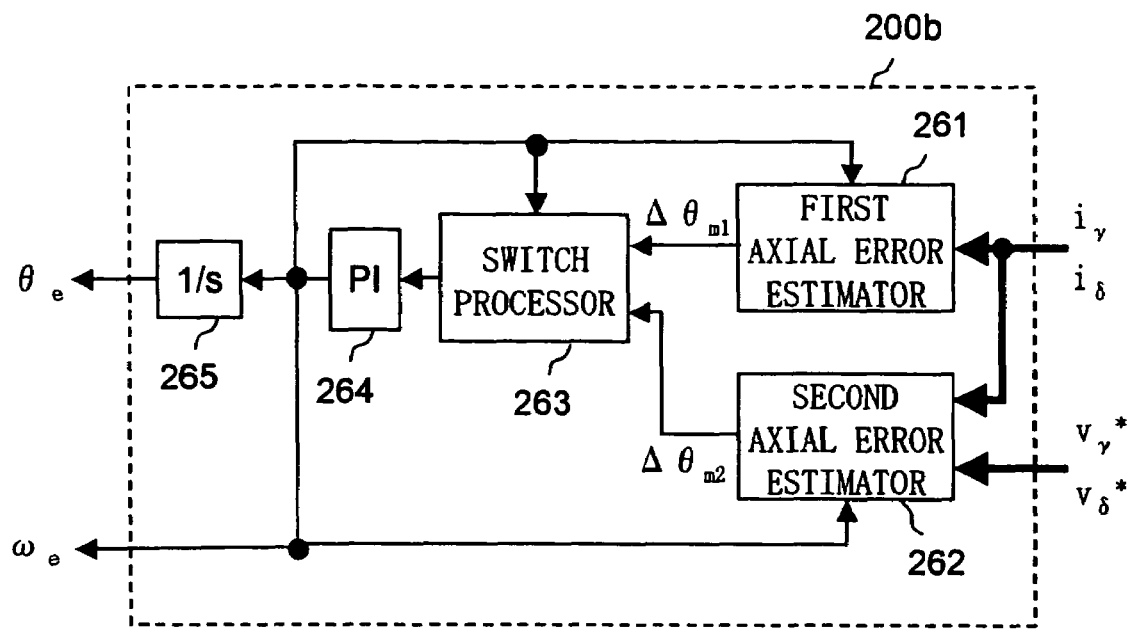
FIG. 35 is a block diagram showing an inside structure of the position/speed estimator according to the sixth embodiment of the present invention (a first example of the estimator).

To begin with, a first example of the estimator will be described. FIG. 35 shows an example of the inside structure of a position/speed estimator 200b (hereinafter referred to as an "estimator 200b" simply) according to the first example of the estimator. The estimator 200b can be used as the estimator 200 shown in FIG. 24.

The estimator 200b includes a first axial error estimator 261, a second axial error estimator 262, a switch processor 263, a proportional-plus-integral calculator 264 and an integrator 265.

The first axial error estimator 261 is similar to the axial error estimator 231 described in the fifth embodiment with reference to FIG. 29, which calculates an axial error between the qm-axis and the δ-axis based on $i_\gamma$ and $i_\delta$. Although the calculated axial error is handled as the axial error $\Delta\theta_m$ to be calculated by the estimator 200 (or 200a) in the fifth embodiment, it is a candidate of the axial error $\Delta\theta_m$ to be calculated by the estimator 200b in this embodiment. More specifically, the first axial error estimator 261 calculates the axial error between the qm-axis and the δ-axis calculated via the axial error calculator 245 or the like (see FIG. 30) that constitutes the first axial error estimator 261 itself as a candidate of the axial error $\Delta\theta_m$, and it outputs the calculation result. The output value of the first axial error estimator 261 is referred to as a first candidate axial error $\Delta\theta_{m1}$. Note that the first axial error estimator 261 uses an output value (estimated motor speed $\omega_e$) of the proportional-plus-integral calculator 264 when it calculates the first candidate axial error $\Delta\theta_{m1}$, if necessary.

The second axial error estimator 262 is similar to the axial error estimator 41 described in the second embodiment with reference to FIG. 15. The second axial error estimator 262 uses a whole or a part of values $v_\gamma^*$, $v_\delta^*$, $i_\gamma$ and $i_\delta$ for calculating and outputting an axial error between the qm-axis and the δ-axis as a candidate of the axial error $\Delta\theta_m$ based on the first through the fifth calculation methods or the like described in the second embodiment. The output value of the second axial error estimator 262 is referred to as a second candidate axial error $\Delta\theta_{m2}$. Although it will be described later, values of $i_\gamma$ and $i_\delta$ that are used for calculating the second candidate axial error $\Delta\theta_{m2}$ should not include a component of the superposed current ($i_{h\gamma}$ and $i_{h\delta}$) that is resulted from the superposed voltage. In addition, the second axial error estimator 262 utilizes an output value (an estimated motor speed $\omega_e$) of the proportional-plus-integral calculator 264, if necessary, when the second candidate axial error $\Delta\theta_{m2}$ is calculated.

The switch processor 263 receives the first candidate axial error $\Delta\theta_{m1}$ as a first input value and the second candidate axial error $\Delta\theta_{m2}$ as a second input value, calculates an output value from the first input value and the second input value so as to output the same in accordance with speed information indicating a rotation speed of a rotor of the motor 1. The estimator 200b uses the estimated motor speed $\omega_e$ calculated by the proportional-plus-integral calculator 264 as the speed information. However, it is possible to use the specified motor speed value $\omega^*$ as the speed information.

Figure 36:
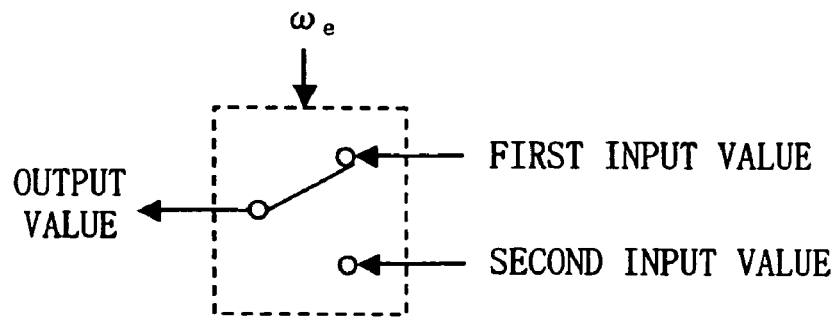
FIG. 36 is a diagram showing a function of a switch processor shown in FIG. 35.

The switch processor 263 outputs one of the first and the second input values as it is as the output value in accordance with the speed information as shown in FIG. 36, for example. In this case, the switch processor 263 outputs the first input value as the output value when the rotation speed indicated in the speed information is lower than a predetermined threshold speed $V_{TH}$ while it outputs the second input value as the output value when the rotation speed is higher than the threshold speed $V_{TH}$.

In addition, it is possible to perform a weighted average process in the switch processor 263. In this case, the switch processor 263 outputs the first input value as the output value when the rotation speed indicated in the speed information is lower than a predetermined first threshold speed $V_{TH1}$ while it outputs the second input value as the output value when the rotation speed is higher than a predetermined second threshold speed $V_{TH2}$. In addition, if the rotation speed indicated in the speed information is within the range from the first threshold speed $V_{TH1}$ to the second threshold speed $V_{TH2}$, it calculates and outputs a weighted average value of the first input value and the second input value as the output value. Here, $V_{TH1} < V_{TH2}$ holds.

Figure 37:
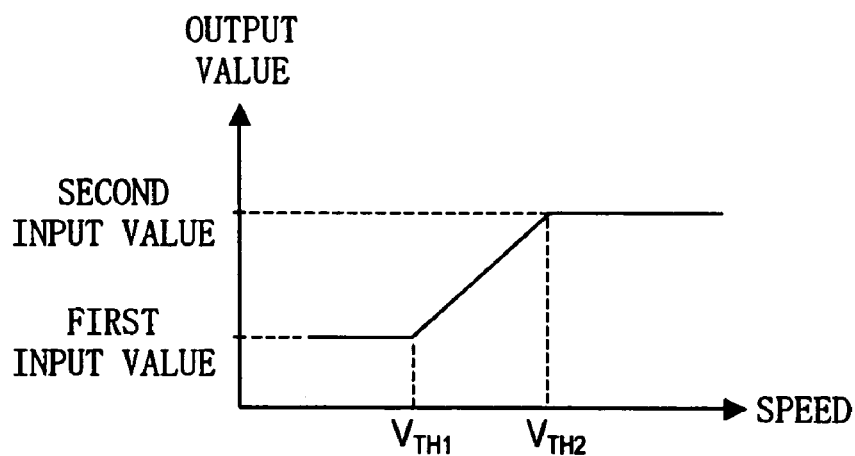
FIG. 37 is a diagram showing a weighted average process performed by the switch processor shown in FIG. 35.

The weighted average process is, for example, performed in accordance with the rotation speed indicated in the speed information. More specifically, as shown in the schematic diagram of FIG. 37, when the rotation speed indicated in the speed information is within the range from the first threshold speed $V_{TH1}$ to the second threshold speed $V_{TH2}$, the weighted average of the first input value and the second input value is calculated so that the second input value contributes the output value more than the first input value as the rotation speed increases while the first input value contributes the output value more than the second input value as the rotation speed decreases.

Figure 38:
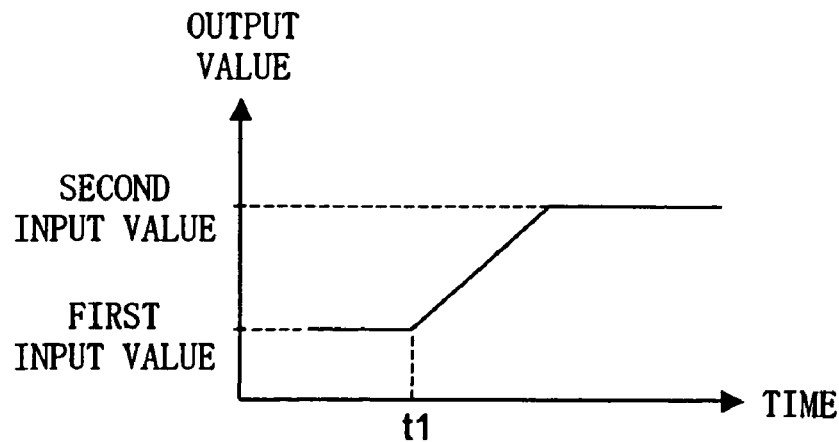
FIG. 38 is a diagram showing the weighted average process performed by the switch processor shown in FIG. 35.

In addition, for example, the weighted average process is performed in accordance with an elapsed time from a start of the switching. More specifically, for example, as shown in the schematic diagram of FIG. 38, the switching of the output value from the first input value to the second input value is started at the timing t1 as a reference when the rotation speed indicated in the speed information changes from a value lower than the first threshold speed $V_{TH1}$ to a value higher than the first threshold speed $V_{TH1}$. At the timing t1, the output value is the first input value, for example. Then, the weighted average of the first input value and the second input value is calculated so that the contribution of the second input value to the output value increases as the elapsed time from the timing t1 increases. When a predetermined time has passed from the timing t1 of the start of switching, the output value is made match the second input value so that the switching is finished. It is controlled similarly in the case where the rotation speed indicated in the speed information changes from a value higher than second threshold speed $V_{TH2}$ to a value lower than the second threshold speed $V_{TH2}$. Note that the first threshold speed $V_{TH1}$ may be the same as the second threshold speed $V_{TH2}$ when the weighted average process is performed in accordance with an elapsed time from a start of the switching.

Note that the threshold speed $V_{TH}$ is, for example, a rotation speed within the range of 10-30 rps (rotation per second), the first threshold speed $V_{TH1}$ is, for example, a rotation speed within the range of 10-20 rps, and the second threshold speed $V_{TH2}$ is, for example, a rotation speed within the range of 20-30 rps.

In the estimator 200b shown in FIG. 35, an output value of the switch processor 263 is given to the proportional-plus-integral calculator 264 that works as a speed estimator. The proportional-plus-integral calculator 264 performs the proportional plus integral control in cooperation with each part of the motor control device 3d for realizing the PLL, and it calculates the estimated motor speed $\omega_e$ so that the output value of the switch processor 263 converges to zero. The integrator 265 integrates the estimated motor speed $\omega_e$ outputted by the proportional-plus-integral calculator 264 so as to calculate the estimated rotor position $\theta_e$. The estimated motor speed $\omega_e$ outputted by the proportional-plus-integral calculator 264 and the estimated rotor position $\theta_e$ outputted by the integrator 265 are both imparted to each part of the motor control device 3d that needs the values as the output value of the estimator 200b.

[Second Example of the Estimator]

Figure 39:
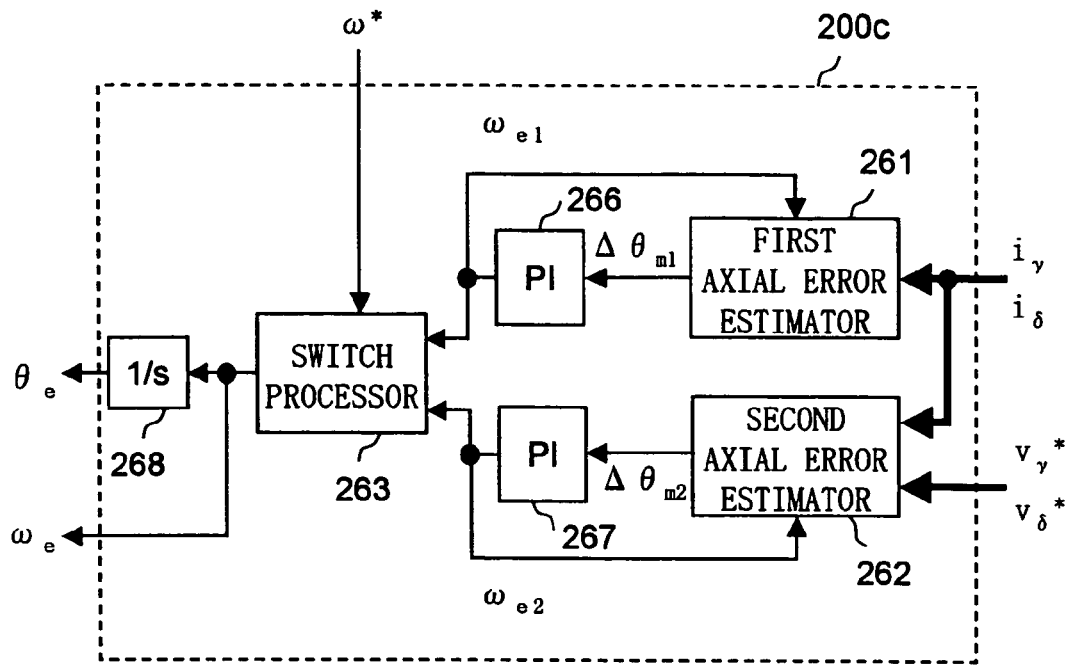
FIG. 39 is a block diagram showing an inside structure of the position/speed estimator according to the sixth embodiment of the present invention (a second example of the estimator).

Next, a second example of the estimator will be described. FIG. 39 is an example of an inside structure of a position/speed estimator 200c (hereinafter referred to as an "estimator 200c" simply) according to the second example of the estimator. The estimator 200c can be used as the estimator 200 shown in FIG. 24.

The estimator 200c includes a first axial error estimator 261, a second axial error estimator 262, a switch processor 263, proportional-plus-integral calculators 266 and 267, and an integrator 268. The estimator 200c performs a switching process at a stage of an estimated speed.

The first axial error estimator 261 and the second axial error estimator 262 of the estimator 200c are similar to those of the estimator 200b shown in FIG. 35. However, the first axial error estimator 261 handles and utilizes an output value of the proportional-plus-integral calculator 266 (i.e., a first candidate speed $\omega_{e1}$ that will be described later) as the estimated motor speed $\omega_e$, if necessary, when the first candidate axial error $\Delta\theta_{m1}$ is calculated. Similarly, the second axial error estimator 262 handles and utilizes an output value of the proportional-plus-integral calculator 267 (i.e., a second candidate speed $\omega_{e2}$ that will be described later) as the estimated motor speed $\omega_e$, if necessary, when the second candidate axial error $\Delta\theta_{m2}$ is calculated.

The proportional-plus-integral calculator 266 performs the proportional plus integral control in cooperation with each part of the motor control device 3d for realizing the PLL, and it calculates the estimated motor speed so that the first candidate axial error $\Delta\theta_{m1}$ converges to zero. The estimated motor speed calculated by the proportional-plus-integral calculator 266 is outputted as the first candidate speed $\omega_{e1}$.

The proportional-plus-integral calculator 267 performs the proportional plus integral control in cooperation with each part of the motor control device 3d for realizing the PLL, and it calculates the estimated motor speed so that the second candidate axial error $\Delta\theta_{m2}$ converges to zero. The estimated motor speed calculated by the proportional-plus-integral calculator 267 is outputted as the second candidate speed $\omega_{e2}$.

The switch processor 263 of the estimator 200c is similar to that of the estimator 200b shown in FIG. 35. In the estimator 200c, however, the first input value and the second input value of the switch processor 263 are the first candidate speed $\omega_{e1}$ and the second candidate speed $\omega_{e2}$, respectively. Therefore, the switch processor 263 of the estimator 200c outputs the first candidate speed $\omega_{e1}$, the second candidate speed $\omega_{e2}$ or a weighted average value thereof in accordance with speed information indicating a rotation speed of a rotor of the motor 1. Note that the specified motor speed value $\omega^*$ can be used as the speed information. An output value of the switch processor 263 becomes the estimated motor speed $\omega_e$ adapted to the rotation speed.

The integrator 268 integrates the estimated motor speed $\omega_e$ outputted by the switch processor 263 so as to calculate the estimated rotor position $\theta_e$. The estimated motor speed $\omega_e$ outputted by the switch processor 263 and the estimated rotor position $\theta_e$ outputted by the integrator 268 are both imparted to each part of the motor control device 3d that needs the values as the output value of the estimator 200c.

[Third Example of the Estimator]

Figure 40:
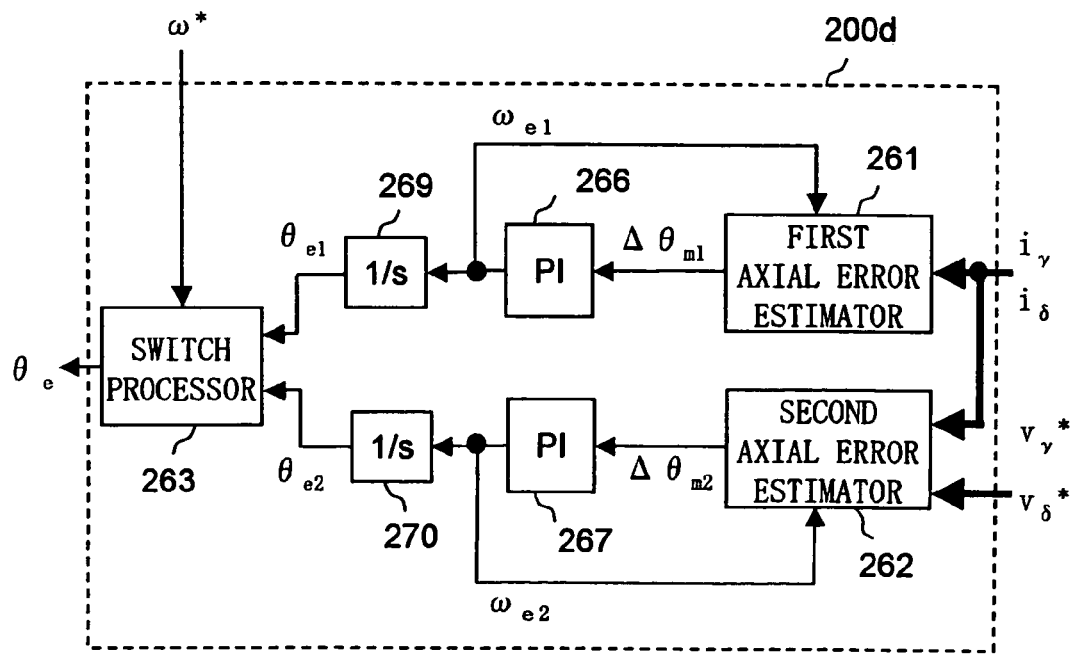
FIG. 40 is a block diagram showing an inside structure of the position/speed estimator according to the sixth embodiment of the present invention (a third example of the estimator).

Next, a third example of the estimator will be described. FIG. 40 is an example of an inside structure of a position/speed estimator 200d (hereinafter referred to as an "estimator 200d" simply) according to the third example of the estimator. The estimator 200d can be used as the estimator 200 shown in FIG. 24.

The estimator 200d includes a first axial error estimator 261, a second axial error estimator 262, a switch processor 263, proportional-plus-integral calculators 266 and 267, integrators 269 and 270. The estimator 200d performs a switching process at a stage of an estimated position.

The first axial error estimator 261, the second axial error estimator 262 and the proportional-plus-integral calculators 266 and 267 of the estimator 200d are similar to those of the estimator 200c shown in FIG. 39. The integrator 269 integrates the first candidate speed $\omega_{e1}$ outputted by the proportional-plus-integral calculator 266 so as to calculate a first candidate position $\theta_{e1}$. The integrator 270 integrates the second candidate speed $\omega_{e2}$ outputted by the proportional-plus-integral calculator 267 so as to calculate a second candidate position $\theta_{e2}$.

The switch processor 263 of the estimator 200d is similar to that of the estimator 200b shown in FIG. 35. In the estimator 200d, however, the first input value and the second input value of the switch processor 263 are the first candidate position $\theta_{e1}$ and the second candidate position $\theta_{e2}$, respectively. Therefore, the switch processor 263 of the estimator 200d outputs the first candidate position $\theta_{e1}$, the second candidate position $\theta_{e2}$ or a weighted average value thereof in accordance with speed information indicating a rotation speed of a rotor of the motor 1. Note that the specified motor speed value $\omega^*$ can be used as the speed information. An output value of the switch processor 263 becomes the estimated rotor position $\theta_e$ adapted to the rotation speed.

The estimated rotor position $\theta_e$ outputted by the switch processor 263 is imparted to each part of the motor control device 3d that needs the values as the output value of the estimator 200d. If it is necessary, the estimated rotor position $\theta_e$ outputted by the switch processor 263 may be differentiated so as to calculate the estimated motor speed $\omega_e$.

Note that the contents described as explanations applied to the estimator 200b can be also applied to the estimator 200c and the estimator 200d as long as there is no conflict.

Although the generation of the superposed voltage by the superposed voltage generator 201 is essential at the timing when the first candidate axial error $\Delta\theta_{m1}$ calculated by the first axial error estimator 261 is necessary like the case of low speed rotation, the generation of the superposed voltage by the superposed voltage generator 201 may be paused at the timing when the first candidate axial error $\Delta\theta_{m1}$ calculated by the first axial error estimator 261 is not necessary like the case of a high speed rotation. What is necessary for calculating the second candidate axial error $\Delta\theta_{m2}$ is a drive current component that flows corresponding to the drive voltage ($v_\gamma^*$ and $v_\delta^*$), and the superposed current component becomes a noise for calculation of the second candidate axial error $\Delta\theta_{m2}$.

In the case of performing the weighted average process, however, it is necessary to calculate the second candidate axial error $\Delta\theta_{m2}$ while adding the superposed voltage. In this case, it is preferable to perform a high frequency cut-off process on the $\gamma$-axis current $i_\gamma$ and the $\delta$-axis current $i_\delta$ from the coordinate converter 12 so as to remove the superposed current ($i_{h\gamma}$ and $i_{h\delta}$) component. Then, the result that is values of the γ-axis current $i_\gamma$ and the δ-axis current $i_\delta$ may be utilized for calculating the second candidate axial error $\Delta\theta_{m2}$.

In this way, forming the estimator (200b, 200c or 200d), the estimation process for a low speed is performed by using the value ($\Delta\theta_{m1}$, $\omega_{e1}$ or $\theta_{e1}$) calculated based on the superposed current component in the state where the motor 1 is stopped or rotates at a low speed, while the estimation process for a high speed is performed by using the value ($\Delta\theta_{m2}$, $\omega_{e2}$ or $\theta_{e2}$) calculated based on the drive current component in the state where the motor 1 rotates at a high speed. Therefore, an appropriate sensor-less control can be realized over a wide speed range.

If it is attempted to switch between a low speed sensor-less control for estimating the d-q axes like the conventional structure and a high speed sensor-less control for estimating the dm-qm axes corresponding to the second or the third embodiment in accordance with a rotation speed, switching between different coordinates is necessary, which causes a problem for realizing a smooth switching. In addition, for realizing the maximum torque control, the d-axis current (γ-axis current) corresponding to the q-axis current (δ-axis current) is necessary under the control based on the d-q axes. In contrast, under the control based on the dm-qm axes, the dm-axis current (γ-axis current) is set to zero or nearly zero, resulting in a discontinuity of the specified γ-axis current value $i_\gamma^*$ along with the switching. On the other hand, if the switching is performed under the control based on the dm-qm axes as shown in this embodiment, these problems can be solved.

In addition, if the switching between the estimation process for a low speed and the estimation process for a high speed is performed gradually by using the weighted average process, continuities of the estimated values of the rotor position and the motor speed can be secured, so that the switching of the estimation process can be performed smoothly. However, if the switching is performed at the stage of the axial error estimation like the estimator 200b shown in FIG. 35, the estimated values of the rotor position and the motor speed can alter not faster than a response speed depending on characteristics of the PLL. Therefore, even if the weighted average process is not performed, the continuities of those estimated values can be secured.

Variations

The contents described in each embodiment can also be applied to the other embodiments as long as there is no conflict. For example, the contents (the equations and the like) described in the second embodiment can be applied to all the third through the sixth embodiments. In addition, the specific values in the above description are merely exemplified values, so they can be naturally modified to various values.

It is described above that the magnetic flux controller 16 outputs $i_\gamma^*$ or $i_{dm}^*$ of zero or a value close to zero in the first through the sixth embodiments. But, in the case where a rotor rotates at a rotation speed that needs a flux-weakening control, it is possible of course to output $i_\gamma^*$ or $i_{dm}^*$ having a value corresponding to the rotation speed.

In addition, the current detector 11 may have a structure for detecting the motor current directly as shown in FIG. 3. Instead, the current detector 11 may have a structure for reproducing the motor current from an instantaneous current of the DC current on the power supply side so as to detect the motor current.

In addition, a part or a whole of the functions of the motor control device in each embodiment is realized by using software (a program) incorporated in a versatile microcomputer or the like, for example. If the motor control device is realized by software, the block diagram showing structures of portions in the motor control device should be interpreted to show a functional block diagram. It is possible, of course, to constitute the motor control device by only hardware without software (a program).

[Selection of the qm-Axis]

Although it is described above in the second through the sixth embodiments that realizing the maximum torque control (or a control similar to the same) is the precondition, it is possible to realize a desired vector control different from the maximum torque control by utilizing the contents described above. In this case too, of course, the effect of facilitating the adjustment of the parameter or the like can be obtained.

In the second through the sixth embodiments, for example, a rotation axis whose phase further leads that of the rotation axis that, when the maximum torque control is realized, matches the direction of the current vector to be supplied to the motor 1 may be adopted as the qm-axis. Thus, an iron loss can be reduced so that a motor efficiency can be improved. It is also possible to realize the maximum efficiency control by setting the leading phase of the qm-axis appropriately.

For realizing the maximum torque control, a value of $L_m$ is calculated by using the above equation (42). In this case, a motor efficiency can be improved by adopting a value smaller than the value calculated by using the above equation (42) as the value of $L_m$.

In the first embodiment (FIG. 3), a part of the motor control device 3 except for the estimator 20 constitutes the controller. In the second embodiment (FIG. 14), a part of the motor control device 3a except for the estimator 40 constitutes the controller. In the third embodiment (FIG. 19), a part of the motor control device 3b except for the estimator 45, the $\theta_m$ calculator 46 and the computing unit 47 constitutes the controller.

In the fourth embodiment (FIG. 20), the position detector 50, the $\theta_m$ calculator 52 and the computing unit 53 constitute the $\theta_{dm}$ calculator, and a part of the motor control device 3c except for the $\theta_{dm}$ calculator constitutes the controller.

In the fifth and the sixth embodiments (FIG. 24), a part of the motor control device 3d except for the estimator 200 and superposed voltage generator 201 constitutes the controller.

In the estimator 200b of the sixth embodiment shown in FIG. 35, the first axial error estimator 261 and the second axial error estimator 262 work as the first candidate axial error calculator and the second candidate axial error calculator, respectively. In the estimator 200c of the sixth embodiment shown in FIG. 39, a part including the first axial error estimator 261 and the proportional-plus-integral calculator 266 works as the first candidate speed calculator, and a part including the second axial error estimator 262 and the proportional-plus-integral calculator 267 works as the second candidate speed calculator. In the estimator 200d of the sixth embodiment shown in FIG. 40, a part including the first axial error estimator 261, the proportional-plus-integral calculator 266 and the integrator 269 works as the first candidate position calculator, a part including the second axial error estimator 262, the proportional-plus-integral calculator 267 and the integrator 270 works as the second candidate position calculator.

In each embodiment, the coordinate converters 12 and 18, the subtracters 13 and 14 and the current controller 15 constitute a specified voltage calculator. In each embodiment, the magnetic flux controller 16, the speed controller 17 and the subtracter 19 constitute the specified current calculator.

Furthermore, in this specification, for simplification of description, a symbol (such as $i_\gamma$) may indicate quantity of state or the like corresponding to the symbol only by itself. In other words, "$i_\gamma$" and "γ-axis current $i_\gamma$", for example, mean the same matter in this specification.

The present invention can be applied to any electric equipment that uses a motor. For example, an electric automobile that is driven by a motor and a compressor that is used for an air conditioner or the like are preferable applications of the present invention.

What is claimed is:

1. A motor control device comprising:
an estimator for estimating a rotor position of a motor having a salient pole by using a value corresponding to a q-axis inductance of the motor as an operation parameter; and
a controller for controlling the motor based on the estimated rotor position, wherein
the estimator generates a deviation between a d-axis and a γ-axis by performing the estimation of the rotor position based on a value between a real q-axis inductance and a real d-axis inductance of the motor adopted as the operation parameter, where
the d-axis is an axis parallel to a magnetic flux generated by a permanent magnet that constitutes the rotor, the γ-axis is an estimated axis for the control corresponding to the d-axis, and the q-axis is an axis leading the d-axis by 90 degrees in electrical angle.

2. The motor control device according to claim 1, wherein the controller controls the motor so that a γ-axis component of a motor current supplied to the motor is maintained to be a predetermined value of zero or close to zero.

3. The motor control device according to claim 2, wherein
the estimator also estimates a rotation speed of the rotor corresponding to the estimation of the rotor position,
the controller includes a specified current calculator that generates a specified γ-axis current value and a specified δ-axis current value to be followed by the γ-axis component and a δ-axis component of the motor current so that the estimated rotation speed follows a specified motor speed value given externally, where the δ-axis is an axis leading the γ-axis by 90 degrees in electrical angle, and
the specified current calculator maintains the specified γ-axis current value at the predetermined value regardless of a value of the specified δ-axis current value, so that the γ-axis component of the motor current is maintained at the predetermined value regardless of a value of the δ-axis component of the motor current.

4. The motor control device according to claim 1, wherein the estimator performs the estimation of the rotor position by using a q-axis inductance L as the operation parameter that satisfies the following expression, $L_d \leq L < (L_d + L_q)/2$, where $L_q$ and $L_d$ are respectively the real q-axis inductance and the real d-axis inductance of the motor.

5. A motor control device for controlling a motor, wherein the motor control device controls the motor by decomposing a motor current that flows in the motor into a qm-axis component parallel to a qm-axis and a dm-axis component parallel to a dm-axis, where the qm-axis is a rotation axis having the same direction as a current vector for realizing a maximum torque control or a rotation axis leading said rotation axis in phase and the dm-axis is a rotation axis that is orthogonal to the qm-axis, the motor control device comprising an estimator for estimating a rotor position of the motor and a controller for controlling the motor based on the estimated rotor position, wherein
the controller controls the motor so that a γ-axis and a δ-axis follow the dm-axis and the qm-axis, respectively, where the d-axis is an axis parallel to a magnetic flux generated by a permanent magnet that constitutes a rotor, the γ-axis is an estimated axis for the control corresponding to the d-axis, and the δ-axis is an axis leading the γ-axis by 90 degrees in electrical angle.

6. The motor control device according to claim 5, wherein the controller controls the motor so that a γ-axis component of the motor current is maintained to be a predetermined value of zero or close to zero.

7. The motor control device according to claim 5, wherein the estimator estimates the rotor position by using an axial error between the qm-axis and the δ-axis.

8. The motor control device according to claim 5, wherein the estimator estimates the rotor position by using an induction voltage vector on the qm-axis in the case where a vector of an induction voltage on a q-axis generated in the motor is decomposed into the induction voltage vector on the qm-axis and an induction voltage vector on the dm-axis, where the q-axis is an axis leading the d-axis by 90 degrees in electrical angle.

9. The motor control device according to claim 5, wherein the estimator estimates the rotor position by using a flux linkage vector on the dm-axis in the case where a vector of a flux linkage on the d-axis of the motor is decomposed into a flux linkage vector on the qm-axis and the flux linkage vector on the dm-axis.

10. The motor control device according to claim 5, wherein
the controller includes a coordinate converter for converting a predetermined fixed axis component of the motor current into a γ-axis component and a δ-axis component by using the rotor position estimated by the estimator,
the estimator estimates a dm-axis component and a qm-axis component of the motor current based on the γ-axis component and the δ-axis component of the motor current obtained by the coordinate converter, and
the rotor position is estimated by using an error current between the dm-axis component of the motor current obtained by the estimation and the γ-axis component of the motor current obtained by the coordinate converter and also using an error current between the qm-axis component of the motor current obtained by the estimation and the δ-axis component of the motor current obtained by the coordinate converter.

11. The motor control device according to claim 5, further comprising a superposer for adding a superposed voltage to a drive voltage for driving the motor, the superposed voltage having a frequency different from the drive voltage, wherein the estimator is capable of performing a first estimation process for estimating the rotor position based on a superposed current that flows in the motor corresponding to the superposed voltage.

12. The motor control device according to claim 11, wherein the estimator is further capable of performing a second estimation process for estimating the rotor position based on a drive current corresponding to the drive voltage included in the motor current, and a estimation process that is performed actually is switched between the first estimation process and the second estimation process in accordance with speed information indicating a rotation speed of the rotor.

13. The motor control device according to claim 12, wherein the estimator switches the estimation process that is performed actually from one of the first and the second estimation processes to the other via an estimation process in which the estimation results of both the estimation processes are considered in accordance with the speed information or an elapsed time from a start of the switching.

14. The motor control device according to claim 11, wherein a voltage vector locus of the superposed voltage on a rotating coordinate axes describes a figure symmetric about the d-axis.

15. A motor drive system comprising:
a motor;
an inverter for driving the motor; and
a motor control device according to claim 1, which controls the motor by controlling the inverter.

16. A motor drive system comprising:
a motor;
an inverter for driving the motor; and
a motor control device according to claim 5, which controls the motor by controlling the inverter.

* * * * *